(12) United States Patent
Lim et al.

(10) Patent No.: US 10,692,499 B2
(45) Date of Patent: Jun. 23, 2020

(54) ARTIFICIAL INTELLIGENCE VOICE RECOGNITION APPARATUS AND VOICE RECOGNITION METHOD

(71) Applicant: LG ELECTRONICS INC., Seoul (KR)

(72) Inventors: Suhee Lim, Seoul (KR); Joongeon Park, Seoul (KR); Yeonho Park, Seoul (KR); Sukyoung Lyu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/959,961

(22) Filed: Apr. 23, 2018

(65) Prior Publication Data

US 2018/0308490 A1    Oct. 25, 2018

(30) Foreign Application Priority Data

Apr. 21, 2017 (KR) .......................... 10-2017-0051835

(51) Int. Cl.
*G10L 15/30* (2013.01)
*G10L 15/22* (2006.01)
(Continued)

(52) U.S. Cl.
CPC .............. *G10L 15/30* (2013.01); *G10L 15/18* (2013.01); *G10L 15/22* (2013.01); *G10L 15/265* (2013.01);
(Continued)

(58) Field of Classification Search
None
See application file for complete search history.

(56) References Cited

U.S. PATENT DOCUMENTS 5,916,302 A * 6/1999 Dunn ...................... H04L 29/06
709/204
9,070,367 B1 * 6/2015 Hoffmeister .......... G10L 15/187
(Continued)

FOREIGN PATENT DOCUMENTS

EP    2557565 A1    2/2013
EP    2713366 A1    4/2014
(Continued)

*Primary Examiner* — Thuykhanh Le
(74) *Attorney, Agent, or Firm* — Birch, Stewart, Kolasch & Birch, LLP

(57) ABSTRACT

Disclosed is an artificial intelligence voice recognition apparatus including: an audio input unit configured to receive a voice; a communication module configured to transmit voice data received from the audio input unit to a server system, which performs voice recognition processing, and receive recognition result data on the voice data from the server system; and a controller configured to control the audio input unit and the communication module, wherein, when a voice command in the voice data corresponds to a pre-stored keyword command, the controller performs control to perform an operation corresponding to the keyword command, and wherein when the voice command in the voice data does not correspond to the pre-stored keyword command, the controller performs control to transmit the voice data including the voice command to the server system. Accordingly, voice recognition may be performed efficiently.

17 Claims, 68 Drawing Sheets

(51) Int. Cl.
*G10L 15/26* (2006.01)
*G10L 15/18* (2013.01)
*G10L 15/08* (2006.01)

(52) U.S. Cl.
CPC .. *G10L 2015/088* (2013.01); *G10L 2015/225* (2013.01)

(56) References Cited

U.S. PATENT DOCUMENTS

| | | | | |
|---|---|---|---|---|
| 10,186,269 | B2* | 1/2019 | Yuan | G10L 15/30 |
| 2002/0072905 | A1* | 6/2002 | White | G10L 15/30 704/231 |
| 2003/0135362 | A1* | 7/2003 | Feng | G10L 15/30 704/205 |
| 2005/0091057 | A1* | 4/2005 | Phillips | G10L 15/22 704/270.1 |
| 2006/0259938 | A1* | 11/2006 | Kinoshita | H04N 21/4622 725/118 |
| 2006/0285535 | A1* | 12/2006 | Metcalf | H04L 29/06027 370/352 |
| 2008/0013703 | A1* | 1/2008 | Montvay | G08B 25/08 379/106.01 |
| 2009/0234651 | A1* | 9/2009 | Basir | G10L 15/02 704/254 |
| 2010/0057450 | A1* | 3/2010 | Koll | G10L 15/32 704/231 |
| 2010/0157450 | A1* | 6/2010 | Im | G02B 7/08 359/823 |
| 2011/0184730 | A1* | 7/2011 | LeBeau | G10L 15/30 704/201 |
| 2012/0253823 | A1* | 10/2012 | Schalk | G01C 21/3608 704/270.1 |
| 2013/0085753 | A1* | 4/2013 | Bringert | G10L 15/32 704/233 |
| 2013/0132089 | A1* | 5/2013 | Fanty | G10L 21/00 704/270 |
| 2013/0144610 | A1* | 6/2013 | Gordon | H04W 4/00 704/201 |
| 2013/0151250 | A1* | 6/2013 | VanBlon | G10L 15/32 704/235 |
| 2013/0179154 | A1* | 7/2013 | Okuno | G10L 15/22 704/10 |
| 2013/0339028 | A1* | 12/2013 | Rosner | G10L 15/222 704/275 |
| 2014/0163977 | A1* | 6/2014 | Hoffmeister | G10L 15/32 704/232 |
| 2014/0163978 | A1* | 6/2014 | Basye | G10L 15/28 704/233 |
| 2015/0006176 | A1* | 1/2015 | Pogue | G10L 15/22 704/249 |
| 2015/0053781 | A1* | 2/2015 | Nelson | F24F 11/30 236/1 C |
| 2015/0120296 | A1* | 4/2015 | Stern | G10L 15/30 704/236 |
| 2015/0154976 | A1* | 6/2015 | Mutagi | H04L 12/281 704/275 |
| 2015/0235642 | A1* | 8/2015 | Nishikawa | G10L 17/00 704/249 |
| 2015/0243287 | A1* | 8/2015 | Nakano | G10L 15/30 704/246 |
| 2015/0256545 | A1* | 9/2015 | Dotterer, III | H04L 63/10 726/1 |
| 2015/0279387 | A1* | 10/2015 | List | H04R 1/345 704/226 |
| 2016/0042748 | A1* | 2/2016 | Jain | G10L 25/48 704/9 |
| 2016/0162469 | A1* | 6/2016 | Santos | G10L 15/22 704/10 |
| 2016/0182938 | A1* | 6/2016 | James | H04N 21/42203 704/275 |
| 2016/0267913 | A1* | 9/2016 | Kim | G10L 15/30 |
| 2017/0053672 | A1* | 2/2017 | James | G11B 27/034 |
| 2018/0062996 | A1* | 3/2018 | Lei | H04W 4/40 |
| 2018/0190279 | A1* | 7/2018 | Anderson | G10L 15/22 |
| 2018/0233150 | A1* | 8/2018 | Gruenstein | G10L 15/32 |

FOREIGN PATENT DOCUMENTS

| | | |
|---|---|---|
| JP | 2004-61576 A | 2/2004 |
| KR | 10-2006-0031357 A | 4/2006 |
| KR | 10-2013-0017352 A | 2/2013 |
| KR | 10-2014-0068752 A | 6/2014 |
| KR | 10-2016-0110085 A | 9/2016 |
| WO | WO 2014/171144 A1 | 10/2014 |

* cited by examiner

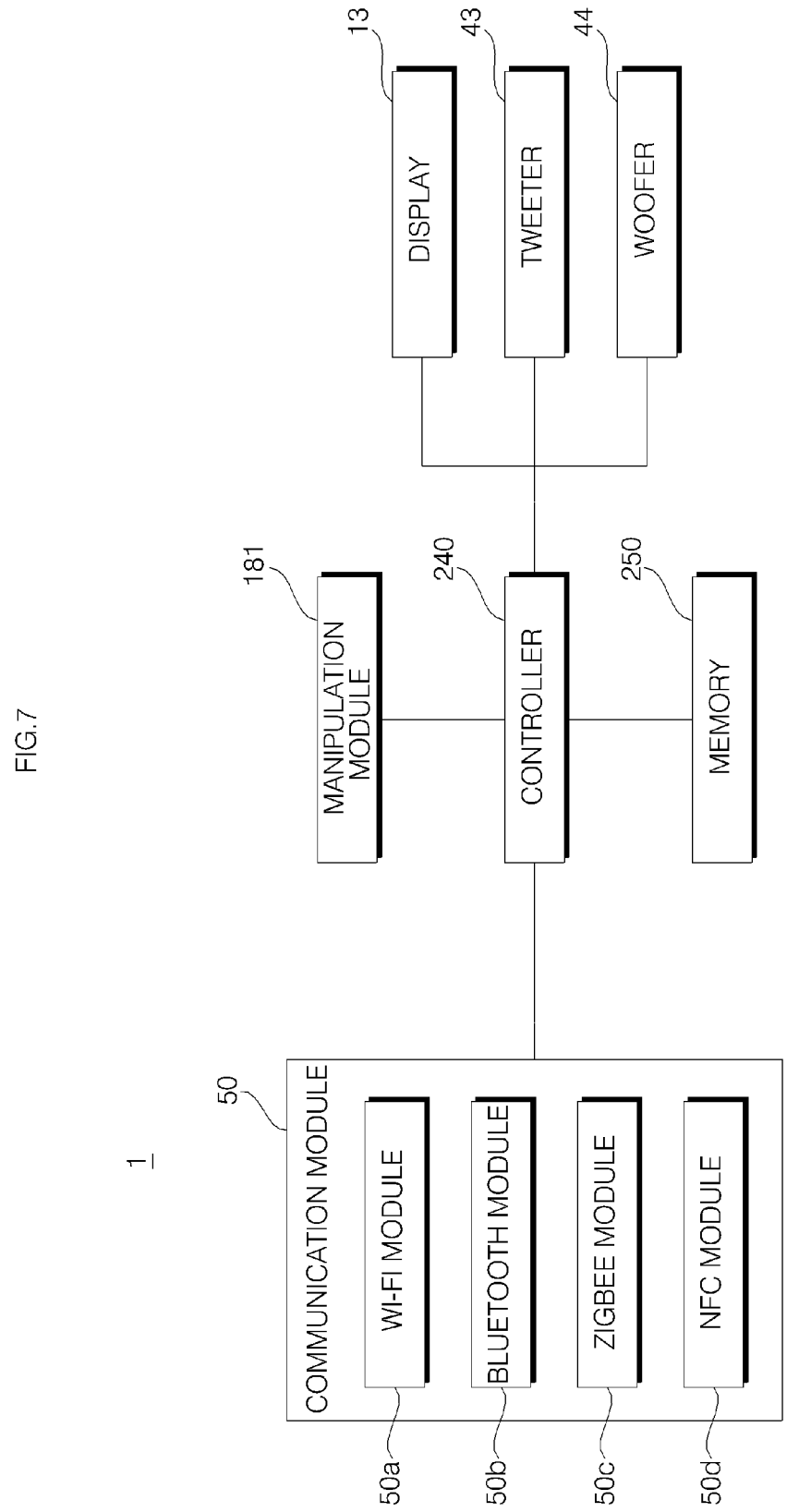

A3

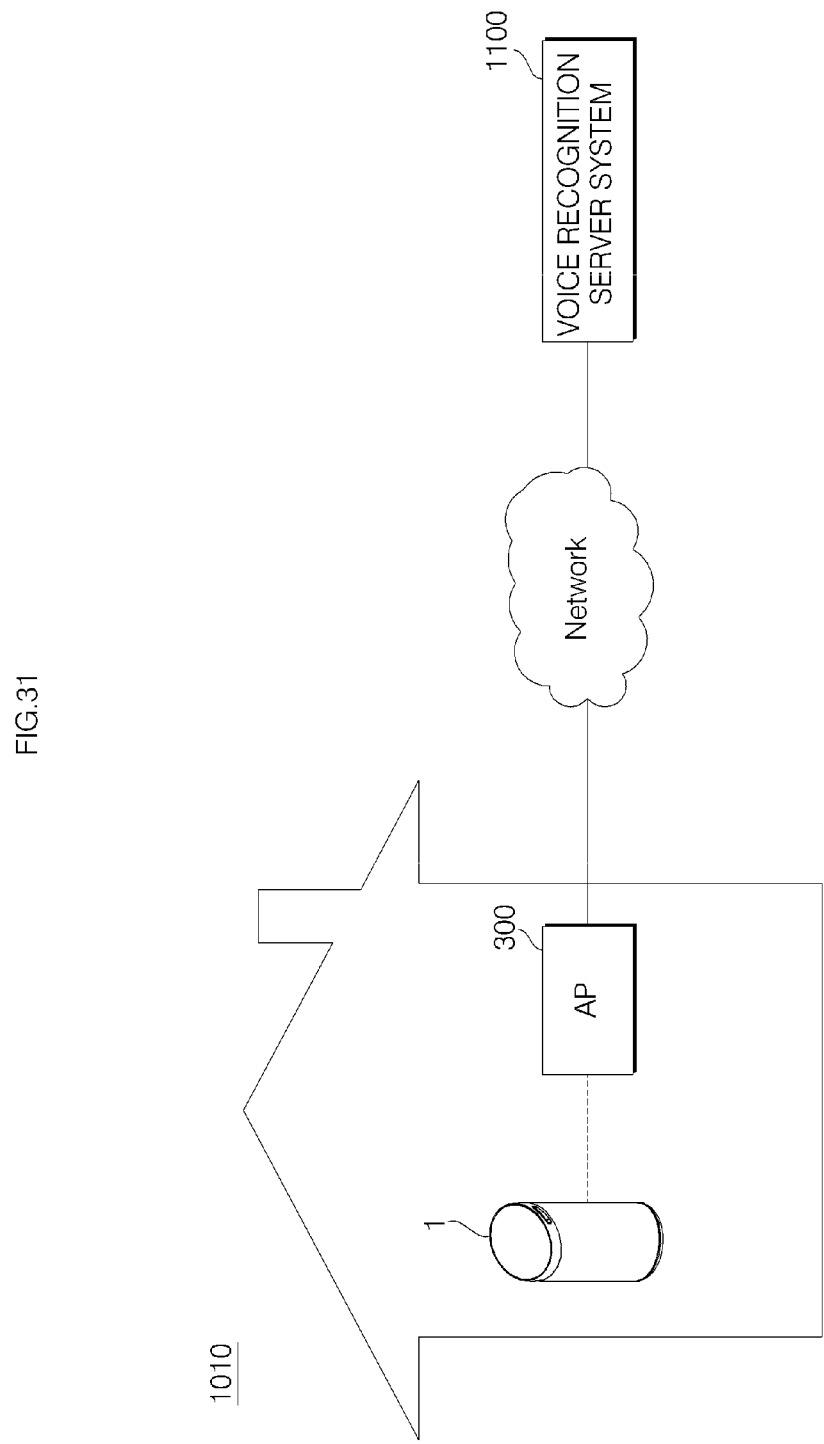

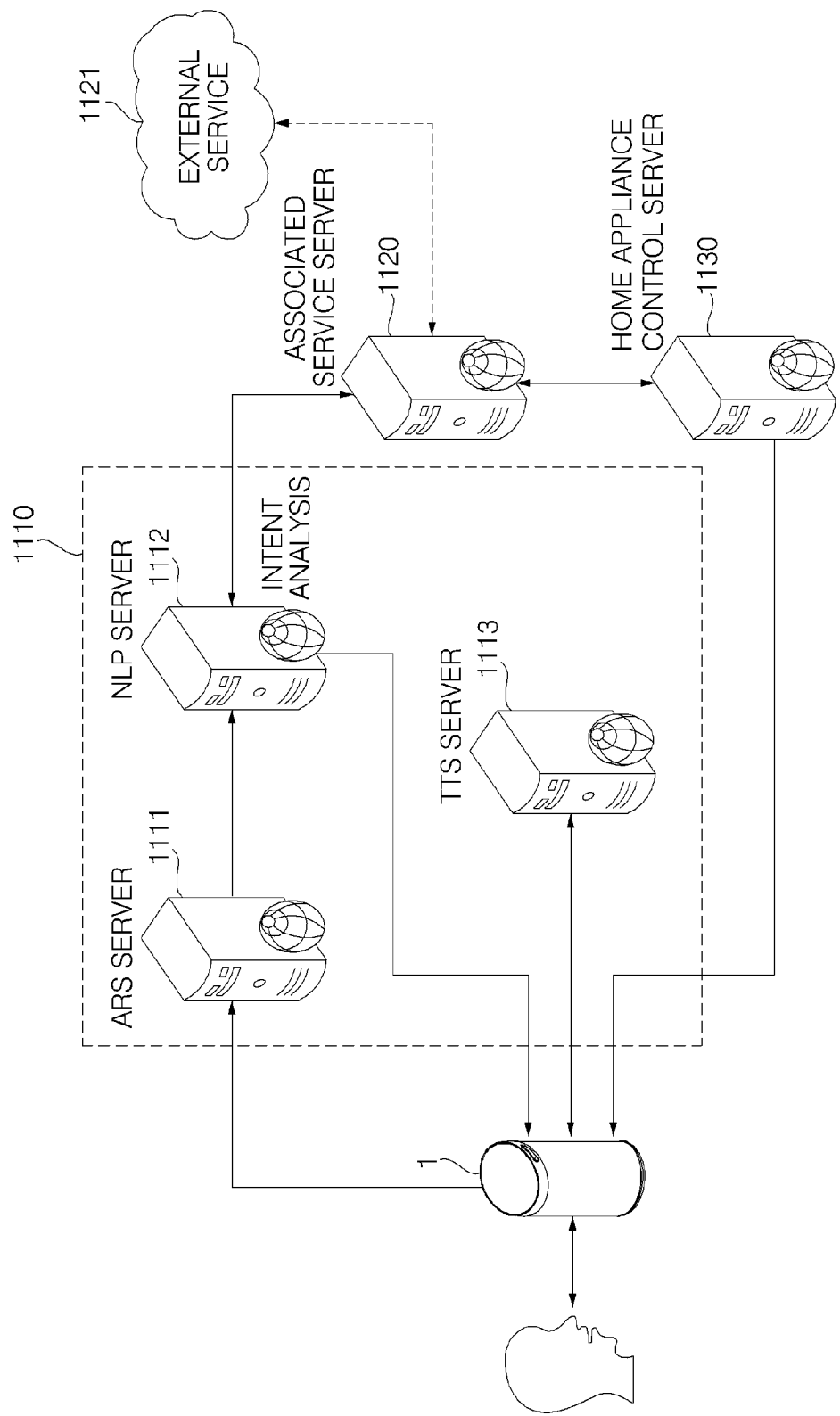

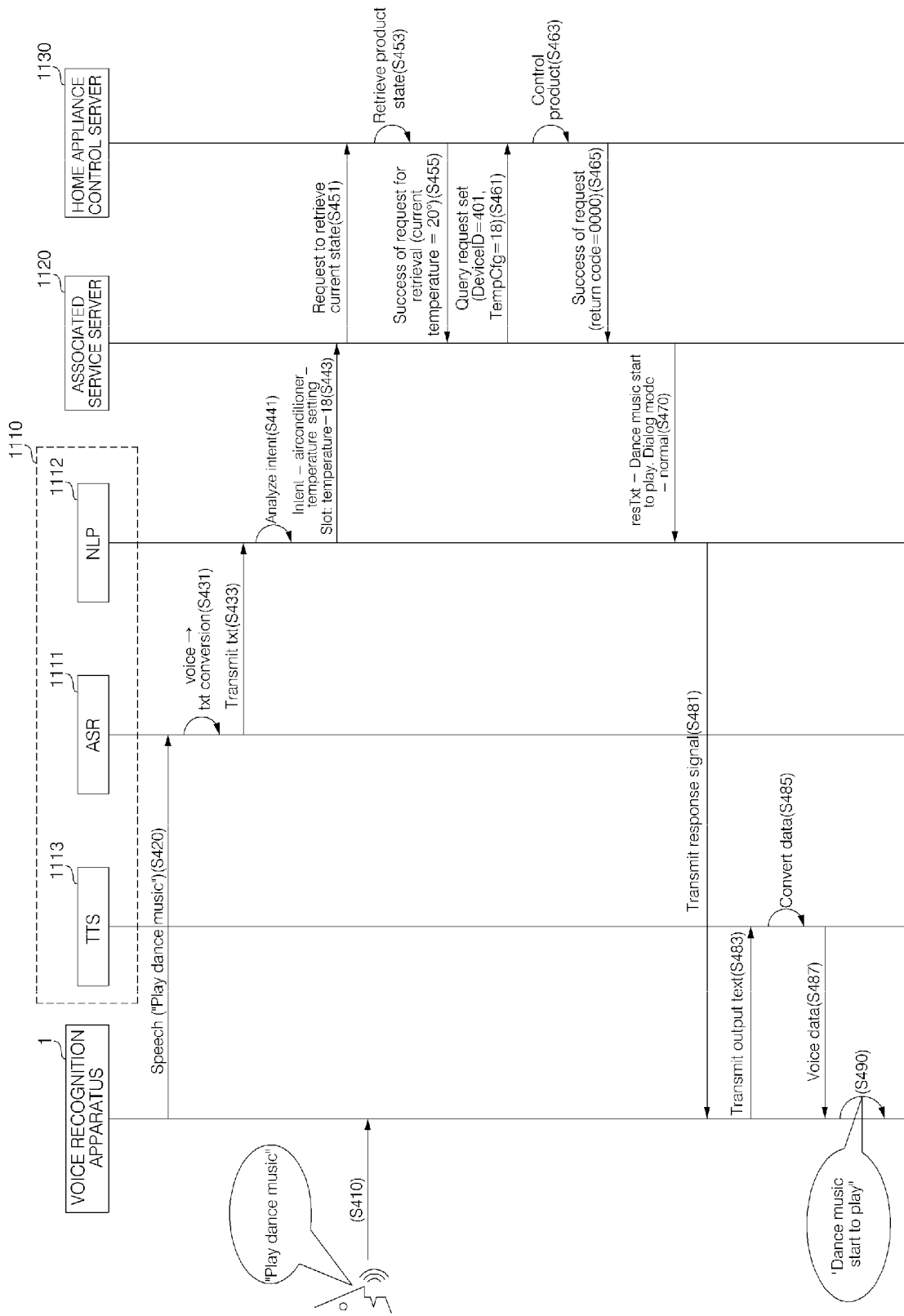

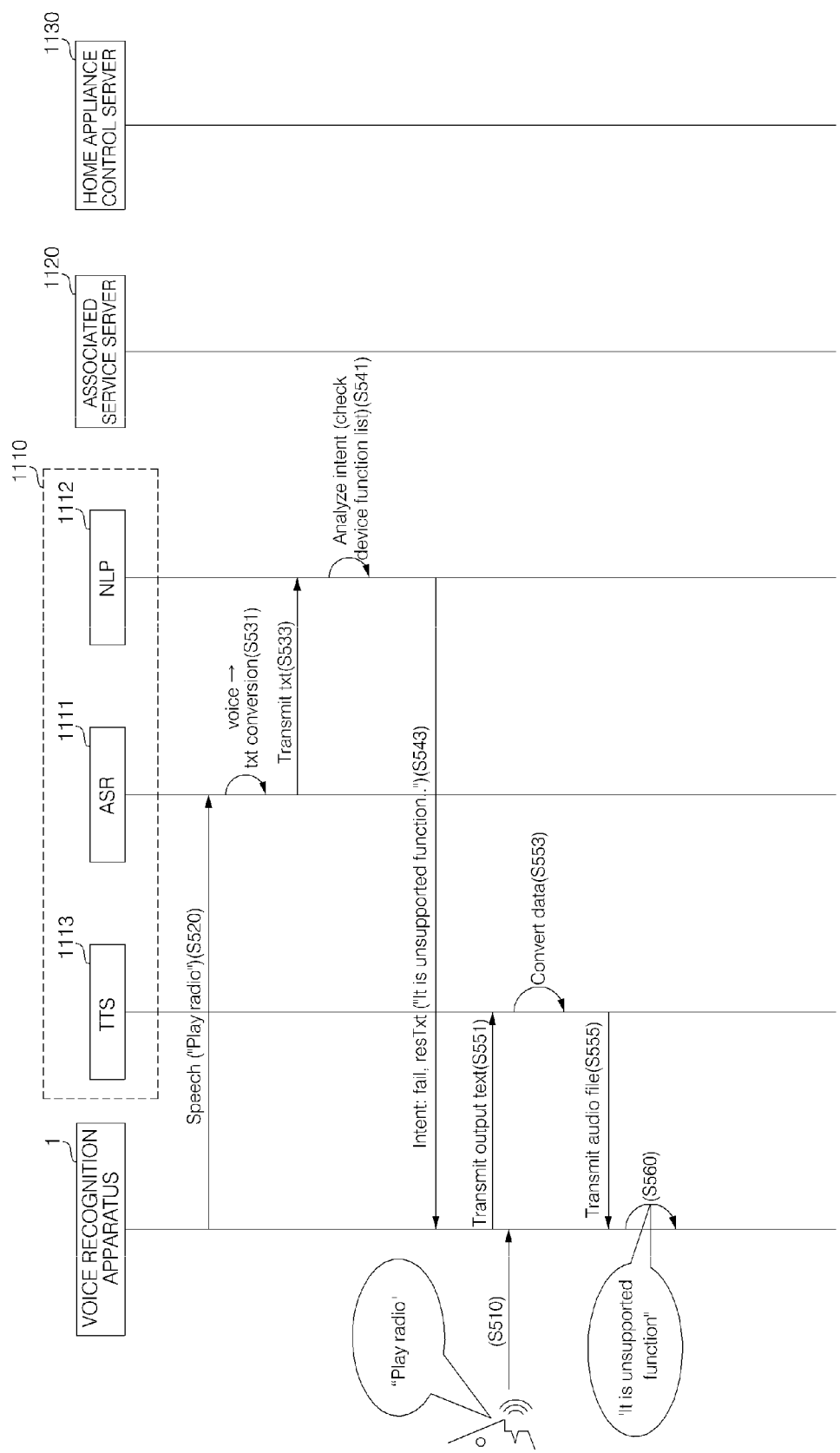

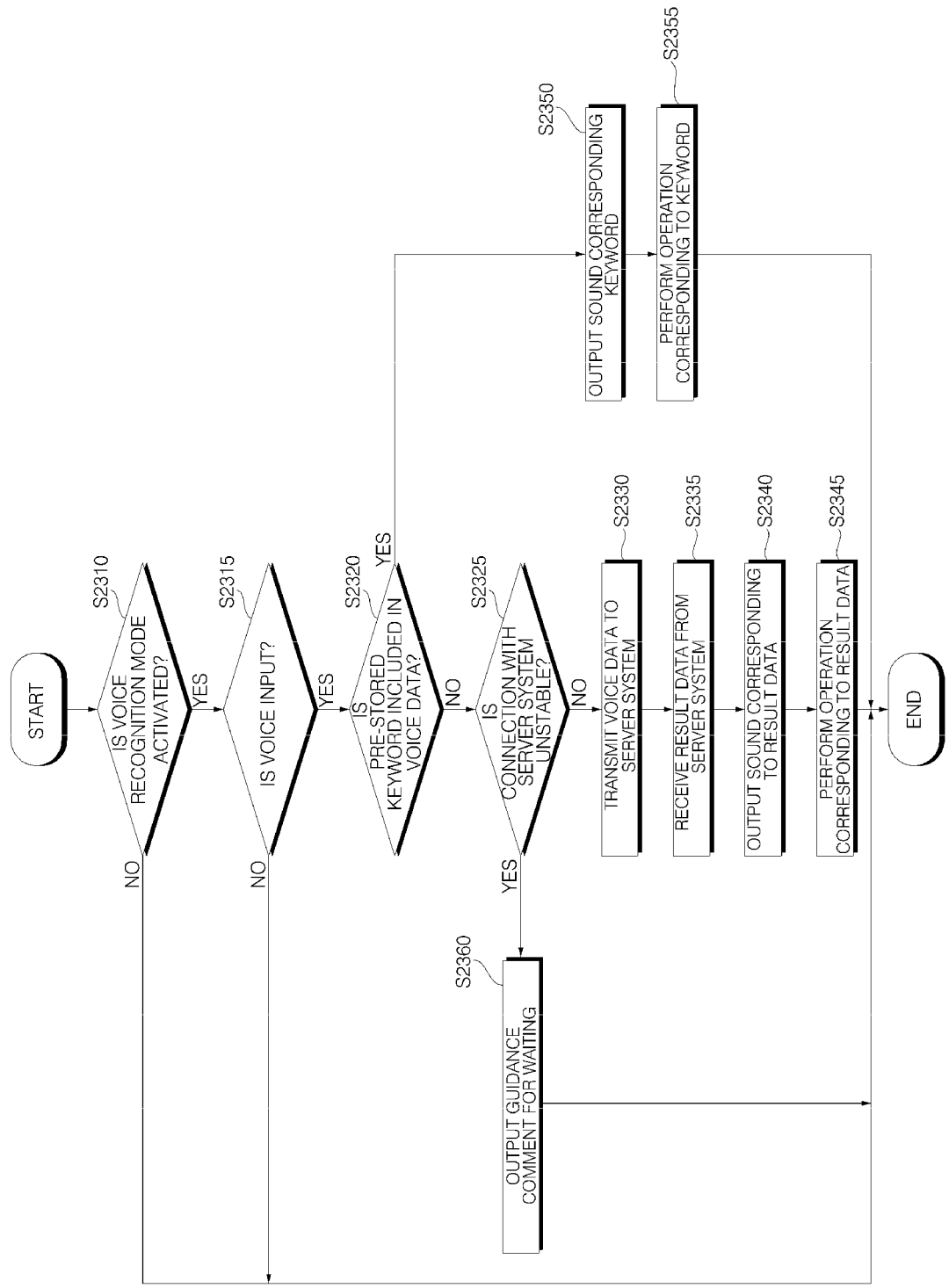

ARTIFICIAL INTELLIGENCE VOICE RECOGNITION APPARATUS AND VOICE RECOGNITION METHOD

CROSS-REFERENCE TO RELATED APPLICATION

This application claims the priority benefit of Korean Patent Application No. 10-2017-0051835, filed on, 21 Apr. 2017 in the Korean Intellectual Property Office, the disclosure of which is incorporated herein by reference.

BACKGROUND OF THE INVENTION

1. Field of the Invention

The present invention relates to a voice recognition apparatus and a voice recognition method, and more particularly to a voice recognition apparatus and a voice recognition method by which voice recognition is able to be performed efficiently.

2. Description of the Related Art

A voice recognition apparatus is an apparatus for performing a voice recognition function.

Meanwhile, air conditioners, washing machines, cleaners, and other home appliances used in a specific space, for examples, at home or at an office, perform distinct functions and operations upon a user's manipulation.

To operate a home appliance, such as the air conditioner, a user needs to manipulate buttons provided in a main body of the home appliance or use a remote control device, such as a remote controller.

However, even when using a remote controller, the user needs to select and push a key of a desired function. Thus, if the user is in a dark indoor space, additional lighting is necessary for the user to see the remote controller and its keys.

Under this background, there are increasing efforts to study and investigate the way of controlling a home appliance based on voice recognition.

In Related Art 1 (Korean Patent Application Publication No. 10-1999-00069703), a remote controller for an air conditioner includes a voice input unit and a signal processing unit to generate and transmit a manipulation signal in response to voice recognition.

Related art 2 (Korean Patent Application Publication No. 10-2006-0015092) discloses: converting an input voice signal into a digital signal and a text; checking if a coinciding control command is stored in a database; if the coinciding control command is stored, controlling each device of an air conditioner; and, if the coinciding control command is not stored, extracting a keyword and controlling each device of the air conditioner in accordance with a control command associated with the keyword.

However, there are limitations in system resources that each apparatus, such as a remote controller and an air conditioner, is able to provide. In particular, in order to recognize a natural language, not just few simple words, a great amount of computation is required, which cannot be implemented by a module embedded in an individual apparatus.

Voice recognition techniques disclosed in Related art 1 and Related art 2 have limitations in recognizing and processing voice commands which are input in the form of various natural languages by users across the world.

Thus, there is need of a method for recognizing a natural language, without a limitation to system resources of an individual apparatus, and for controlling a home appliance conveniently.

SUMMARY OF THE INVENTION

The present invention provides a voice recognition apparatus and a voice recognition method by which voice recognition is able to be performed efficiently.

The present invention provides a voice recognition apparatus and a voice recognition method, by which natural-language voice recognition is able to be performed through communication with a server system.

In one general aspect of the present invention, there is provided a voice recognition apparatus including: an audio input unit configured to receive a voice; a communication module configured to transmit voice data received from the audio input unit to a server system, which performs voice recognition processing, and receive recognition result data on the voice data from the server system; and a controller configured to control the audio input unit and the communication module, wherein, when a voice command in the voice data corresponds to a pre-stored keyword command, the controller performs control to perform an operation corresponding to the keyword command, and wherein when the voice command in the voice data does not correspond to the pre-stored keyword command, the controller performs control to transmit the voice data including the voice command to the server system.

In another general aspect of the present invention, there is provided a voice recognition method including: receiving a voice command through a microphone; when the received voice command corresponds to a pre-stored keyword command, performing an operation corresponding to the keyword command; and when the received voice command does not correspond to the pre-stored keyword command, transmitting voice data including the voice command to a voice server.

The voice recognition apparatus according to the present invention includes: an audio input unit configured to receive a voice; a communication module configured to transmit voice data received from the audio input unit to a server system, which performs voice recognition processing, and receive recognition result data on the voice data from the server system; and a controller configured to control the audio input unit and the communication module, wherein, when a voice command in the voice data corresponds to a pre-stored keyword command, the controller performs control to perform an operation corresponding to the keyword command, and wherein when the voice command in the voice data does not correspond to the pre-stored keyword command, the controller performs control to transmit the voice data including the voice command to the server system. Accordingly, the voice recognition apparatus may perform voice recognition efficiently. In particular, a user does not needs to manipulate a remote controller, and therefore, user convenience may improve. In addition, it is possible to recognize and process a keyword command and a natural-language command.

In particular, a simple keyword is pre-stored and, when the keyword is included in voice data, a corresponding operation may be performed without communication with the server system, and therefore, it is possible to perform an operation corresponding to a keyword voice.

Meanwhile, when a natural language, not a keyword, is included in voice data, natural language recognition is performed using the server system, and therefore, accuracy of the natural language recognition may improve.

Meanwhile, if transmission of voice data including a voice command to the voice server fails, an operation corresponding to a keyword command most similar to the voice command may be performed, thereby improving user convenience.

Meanwhile, if result data is not received from the server system, the controller may perform control to output a message for requesting re-inputting a command, thereby improving user convenience.

Meanwhile, if there is an error in any one of the ASR server, the NLP server, and the association service server in the server system, the controller may perform to output a corresponding waiting guidance message, thereby notifying a user of which server in the server system has an error.

Meanwhile, the voice recognition method according to an embodiment of the present invention includes: receiving a voice command through a microphone; when the received voice command corresponds to a pre-stored keyword command, performing an operation corresponding to the keyword command; and when the received voice command does not correspond to the pre-stored keyword command, transmitting voice data including the voice command to a voice server. In particular, a user does not needs to manipulate a remote controller, and therefore, user convenience may improve.

BRIEF DESCRIPTION OF THE DRAWINGS

The embodiments will be described in detail with reference to the following drawings in which like reference numerals refer to like elements wherein:

FIG. 7 is a block diagram illustrating control relationship between major components of a voice recognition apparatus;

FIG. 31 is a diagram schematically illustrating a smart home system including a voice recognition server system and a voice recognition apparatus according to an embodiment of the present invention;

FIG. 32A shows an example of a voice recognition server system according to an embodiment of the present invention;

FIGS. 33 to 35 are diagrams illustrating a signal flow in a voice recognition server system according to an embodiment of the present invention;

FIG. 49 is a flowchart illustrating an operation method of a voice recognition apparatus according to another embodiment of the present invention.

DETAILED DESCRIPTION OF THE EMBODIMENTS

Figure 1:
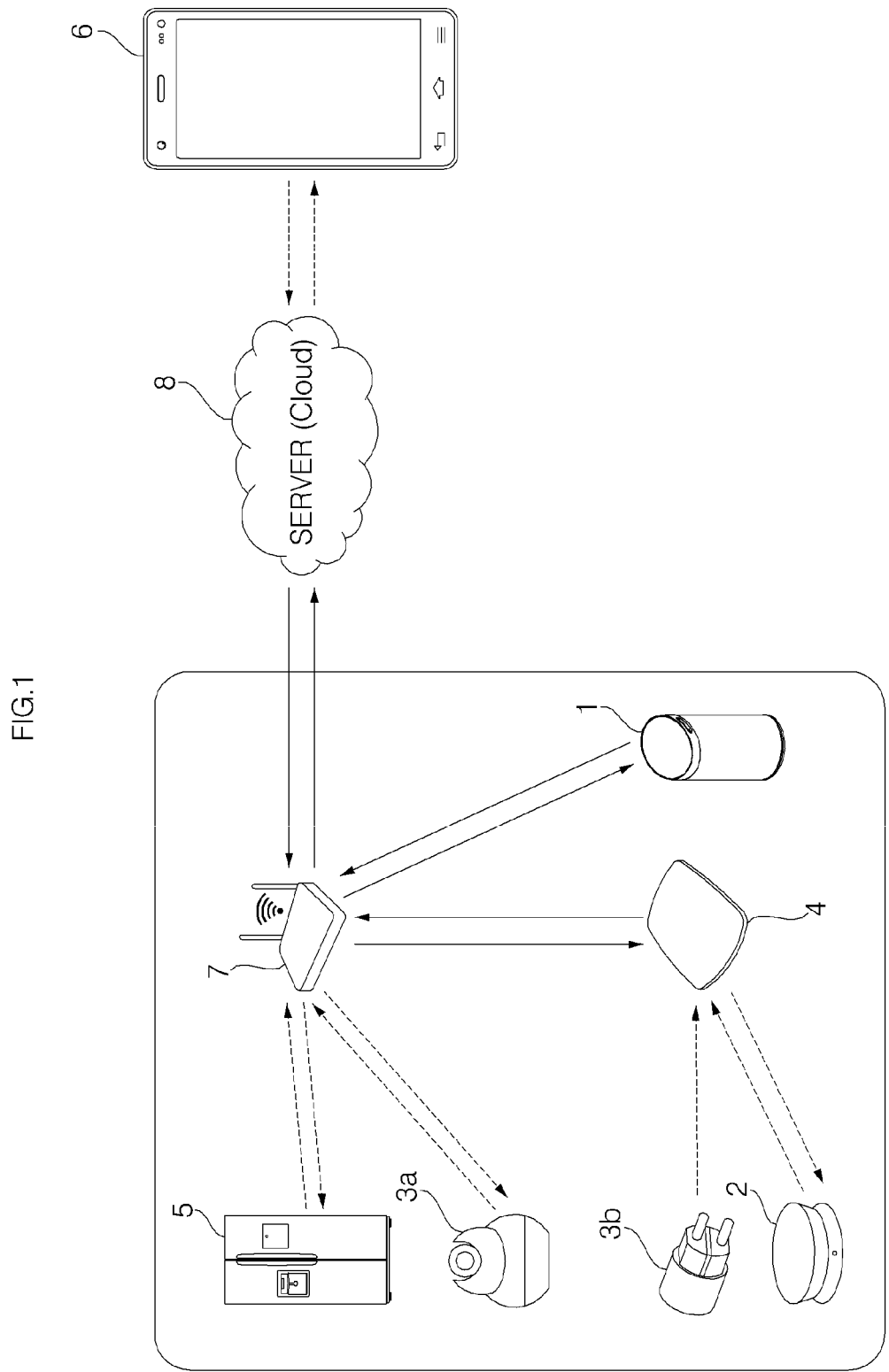
FIG. 1 is a diagram illustrating a network system according to an embodiment of the present invention.

Hereinafter, embodiments of the present invention will be described in detail with reference to the accompanying drawings. While the invention will be described in conjunction with exemplary embodiments, it will be understood that the present description is not intended to limit the invention to the exemplary embodiments.

In the drawings, in order to clearly and briefly describe the invention, parts which are not related to the description will be omitted and, like reference numerals refer to like elements throughout.

In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other.

FIG. 1 is a diagram illustrating a network system according to an embodiment of the present invention.

The network system is a group of devices communicating in a specific space, such as a house or an office, to thereby construct a network. As an example of the network system, FIG. 1 shows a home network system established at home.

Hereinafter, an apparatus 1 is described as a voice recognition apparatus (Hub) 1 for a communication network with a sound outputting function, but aspects of the present invention are not limited thereto. Depending on a perspective, the apparatus 1 may refer to a sound outputting apparatus.

Referring to FIG. 1, the network system according to an embodiment of the present invention may include accessories 2, 3a, and 3b, a gateway 4, an Access Point (AP) 7, and the voice recognition apparatus 1 or a sound outputting apparatus.

The accessories 2, 3a, and 3b, the gateway 4, the AP 7, and/or the voice recognition apparatus 1 are enabled to communicate with each other according to a preset protocol, and such communication may be performed based on technologies such as Wi-Fi, Ethernet, Zigbee, Z-wave, Bluetooth, etc.

Wi-Fi is originally the brand name of Wi-Fi Alliance, but now it is commonly used to refer to a wireless communication technology. Wi-Fi refers to a series of technologies that supports WLAN connection between devices, WLAN connection between device connections (Wi-Fi P2P), and PAN/LAN/WAN configuration according to a standard defined in IEEE 802.11. Hereinafter a "Wi-Fi module" will be defined as a device performing wireless communication based on the Wi-Fi technology.

Ethernet is a networking technology according to IEEE 802.3 standard, and it is the most representative standard for LAN hardware, protocol, cable. Ethernet employs the carrier sense multiple access with collision detection (CSMA/CD) technique to transmit data. Hereinafter, an "Ethernet module" will be defined as a device performing communication based on the Ethernet technology.

Zigbee is a wireless network technology for performing communication by configuring a private network using a small-sized low-power digital radio. Zigbee is a communication technology defined by IEEE 802.15. Zigbee is small-sized and inexpensive and consume relatively less power, so it is drawing attentions as a solution of establishing Ubiquitous such as a home network, and is used in short-range communication for a home network and a building and in industrial facilities automation, logistics, human interface, telematics, environment monitoring, military, etc.

A Zigbee protocol consists of a physical layer, a Medial Access Control (MAC) layer, a network layer, and an application layer. The physical layer and the MAC layer of Zigbee are defined by the IEEE 802.15.4 standard.

The Zigbee network layer supports routing and addressing for a tree structure and a mesh structure, and ZigBee Home Automation Public Profile and ZigBee Smart Energy Profile are typically used as an application profile. In addition, the new Zigbee specification RF4CE defines a simple network stack for solution of home appliance remote control and start topology. RF4CE uses 2.4 GHz frequency band and provides encryption using AES-128.

Zigbee is generally used in fields where a long battery life and encryption are required despite a low transmission speed. Zigbee is appropriate for data transmission which is periodic or intermittent data transmission or simple signal transmission of a sensor and an input device. Zigbee is applied to a wireless lighting switch, a home electronic power system, a traffic management system, and any other private or industrial device which requires short-range low-speed communication. Zigbee is more simple and inexpensive than other WPAN technologies, such as Bluetooth and Wi-Fi. Hereinafter, a "Zigbee module" will be defined as a device performing wireless communication based on the Zigbee technology.

Z-wave is a wireless transmission technology designed for a device which requires low power and a low bandwidth, such as home automation and sensor network. Z-wave primarily aims to provide reliable communication between one or more nodes and a control unit on a wireless network. Z-wave consists of a physical layer, an MAC layer, a transmission layer, a routing layer, and an application layer, and uses 2.4 GHz bandwidth while providing speed of 9.6 kbps, 40 kbps, and 200 kbps. Hereinafter, a "Z-wave module" will be defined as a device performing wireless communication based on the Z-wave technology.

The accessary 2 may be installed at any position desired by a user, and ma be provided with a variety of sensors, such as a temperature sensor, a humidity sensor, a vibration sensor, a proximity sensor, an Infrared (IR) sensor, etc. Information acquired by the sensors may be transmitted to the voice recognition apparatus 1 via a network, and, inversely, a signal for controlling the sensors may be transmitted from the voice recognition apparatus 1 to the accessary 2.

In addition, the accessary 2 may be enabled to perform remote control of a nearby home appliance. For example, the accessary 2 may include a transmitting device that transmits an infrared signal in accordance with a control signal transmitted via a network.

Meanwhile, the IR sensor may include a transmitter which emits an infrared ray, and a receiver which receives a reflected IR ray as a result of reflection of the IR ray emitted from the transmitter by an object.

The AP 7 is a device which plays a relay role so that a wireless device is connected to a network, and the AP 7 connects a home network to the Internet. The home appliance 5, the voice recognition apparatus 1, the accessary 3b, etc. may be connected to the AP 7 in a wired manner (e.g., Ethernet) or in a wireless manner (e.g., Wi-Fi).

The gateway 4 is a device connecting different protocol-based networks so as to exchange information with each other. For example, by converting a Zigbee (or Z-wave) signal received from the accessary 2 or 3b into a Wi-Fi signal, the gateway 4 may relay the accessary 2 or 3b and the AP 7.

Meanwhile, the home network system may access the Internet via the AP 7, thereby accessing a server 8 which provides a service via the Internet. The server (or Cloud) 8 may be managed by a manufacturer of the accessary 2, 3a, or 3b and/or the voice recognition apparatus 1, a seller, or a service provider in contract with the manufacturer or the seller. The server 8 may store software and data, and the data may be received from a home network. In response to a request from the voice recognition apparatus 1, the server 8 may transmit the stored software or data to the home network via the Internet.

The server 8 may exchange information even with a personal computer (PC) accessing the Internet and a mobile terminal, such as a smart phone. Information transmitted from the voice recognition apparatus 1 or the accessary 2, 3a, or 3b may be stored in the server 8, and the information may be transmitted to a mobile terminal 6 connected with the server 8. In addition, even information transmitted from the mobile terminal 6 may be transmitted to the voice recognition apparatus 1 or the accessary 2, 31, or 3b via the server 8, and therefore, the voice recognition apparatus 1 or the accessary 2, 31, or 3b may be controlled using the mobile terminal 6.

A smart phone, which is a kind of the mobile terminal 6 and recently widely used, provides graphic-based convenient UI, so it is possible to control the accessary 2, 3a, or 3b through the UI or process and display information received from the accessary 2, 3a, or 3b. In addition, by updating an application embedded in the smart phone, a function able to be implemented using the accessary 2, 3a, or 3b may be expanded or changed. However, controlling the accessary 2, 3a, or 3b or processing and displaying information received from the accessary 2, 3a, or 3b are possible simply by the voice recognition apparatus, even without using the mobile terminal 6.

The voice recognition apparatus 1 and the accessories 2, 3a, and 3b may communicate with each other via the gate way 4 and the AP 7. Specifically, a signal output from the accessary 2 or 3b may transmitted to the voice recognition apparatus 1 after passing through the gate way 4 and the AP 7 in order. On the contrary, information output from the voice recognition apparatus 1 may be transmitted to the accessary 2 or 3b after passing through the AP 7 and the gateway 4 in order. In some implementations, communication between the accessories 2, 3a, and 3b and the voice recognition apparatus 1 may be possible even when a network is disconnected from the Internet.

Apart from the aforementioned accessories 2, 3a, and 3b, various kinds of accessories may be provided. For example, accessories may be an air quality sensor sensing an air quality, a smart plug, a CT sensor, a nest temperature adjusting device, a sleep sensor, etc.

An accessary may be attached to a home appliance 5. For example, an accessary having a vibration sensor may be attached to a washing machine to sense vibration during operation of the washing machine, and a signal output from the vibration sensor due to sensed vibration may be transmitted to a network.

In addition, an accessary may be attached in a space other than the home appliance 5. For example, to sense opening and closing of a door at home, an accessary having a movement sensing sensor (e.g., an IR sensor) may be attached to a wall to sense opening and closing of the door. If opening and closing of the door at home has not been sensed for a long time, there may be a problem with a resident, and such information may be transmitted to a preset mobile terminal 6.

Furthermore, an accessary having the movement sensing sensor is attached to sense opening and closing of a refrigerant door, and, if opening and closing of the refrigerant door has not been sensed for a long time, there may be a problem with a resident, and such information may be transmitted to a preset mobile terminal 6.

In the above various embodiments, a signal transmitted from an accessary via a network may be received by the mobile terminal 6, and an application embedded in the mobile terminal 6 may analyze the received signal and identify operation state (e.g., unbalancing of a washing machine) or door opening/closing information of the home appliance 5. Then, the information or a result obtained by processing the information (e.g., an alarm notifying abnormal operation of the washing machine, or a notification of the need of checking safety of a resident as a door has not been opened for a long time) may be output through a display or speaker of the mobile terminal 6.

Meanwhile, the voice recognition apparatus 1 may include a microphone (not shown), extract a command from a voice, input through the microphone, based on the embedded voice recognition program, and performs control in accordance with the command.

Figure 2:
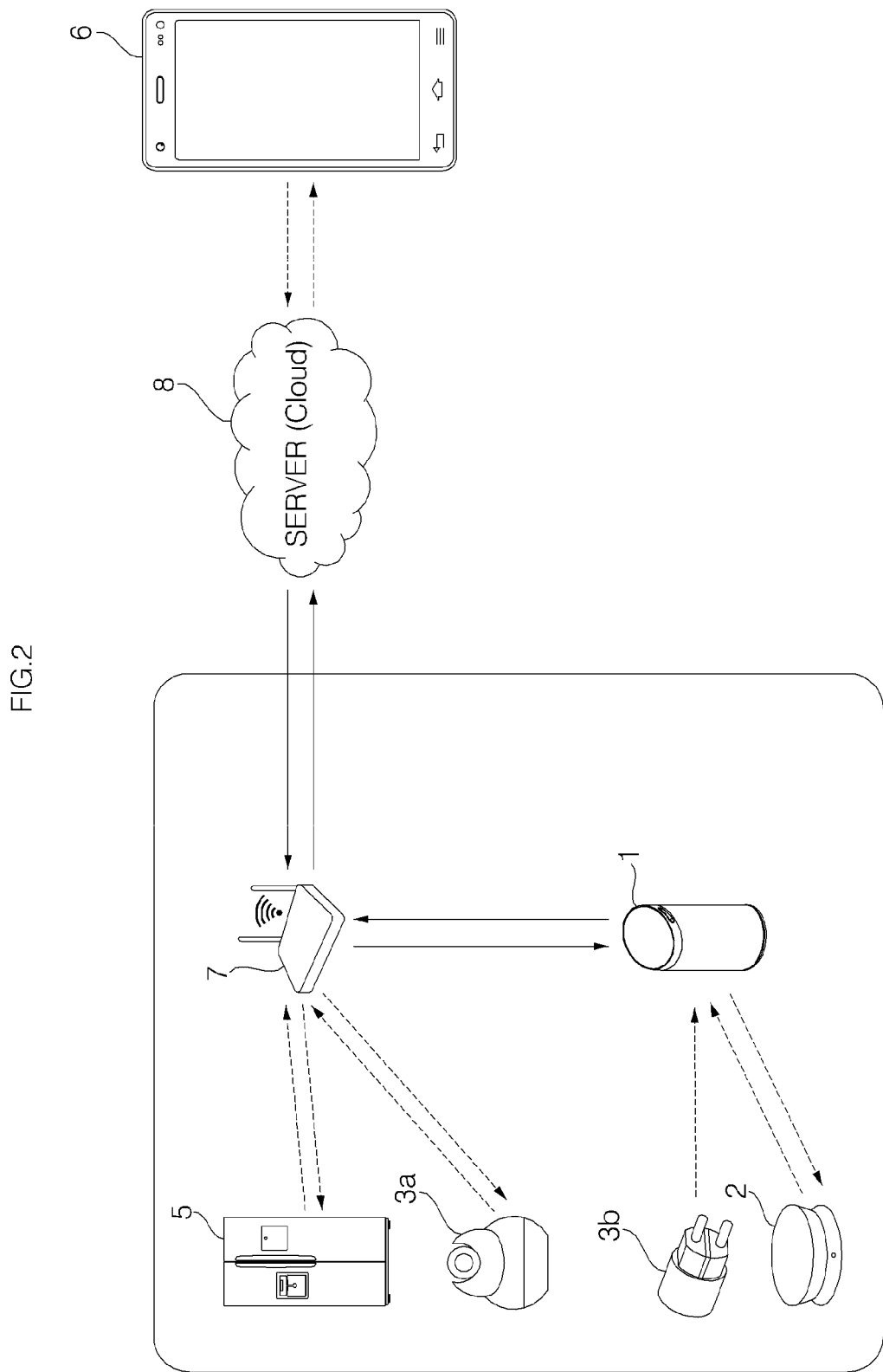
FIG. 2 is a diagram illustrating a home network system according to another embodiment of the present invention.

FIG. 2 is a diagram illustrating a home network system according to another embodiment of the present invention.

The home network system according to another embodiment of the present invention is different from the above-described embodiment in that the gate way is not provide 4 and the function of the gateway 4 is performed by the voice recognition apparatus 1, and other features are substantially identical to those of the above-described embodiment.

Accessories 2 and 3 may communicate directly with the voice recognition apparatus 2 without bypassing the gateway (see FIG. 1). The accessories 2 and 3b may communicate with the voice recognition apparatus 1 based on the Zigbee technology, and, in this case, the accessories 2 and 3b and the voice recognition apparatus 1 may be respectively provided with Zigbee modules.

Figure 3:
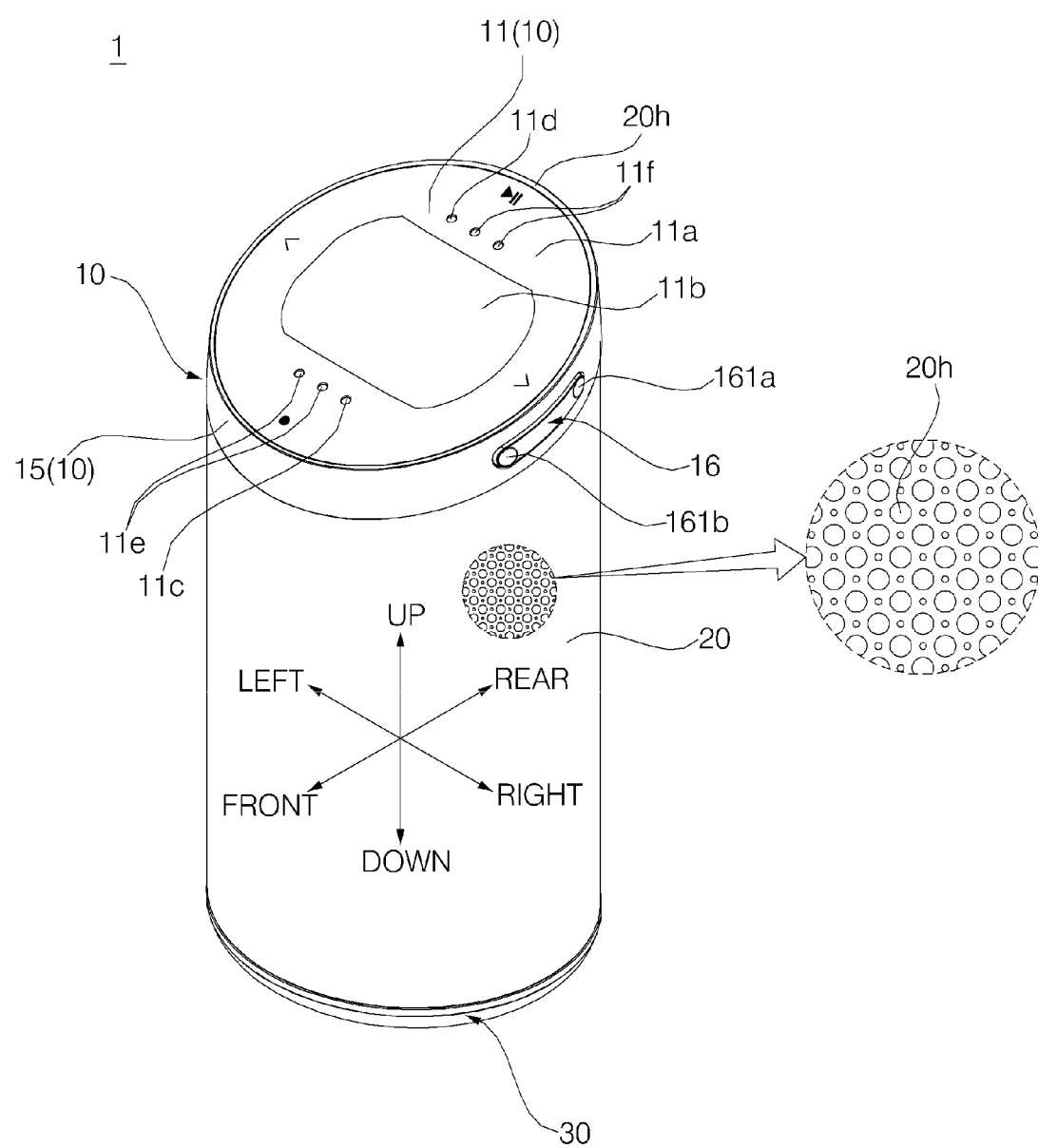
FIG. 3 is a perspective view of a voice recognition apparatus according to an embodiment of the present invention.
Figure 4:
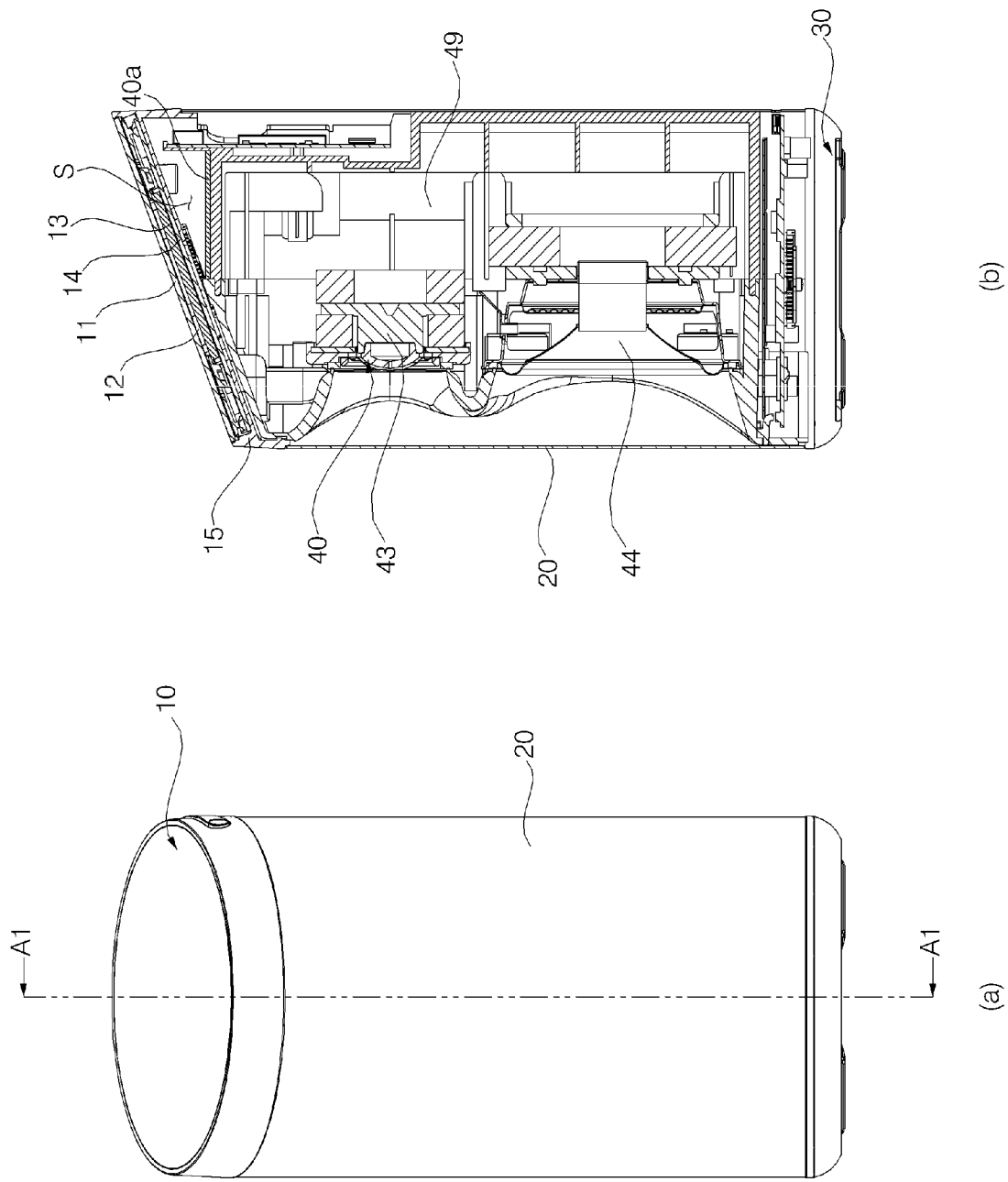
FIG. 4 shows a front view (a) of a voice recognition apparatus and a cross-sectional view (b) cut along A1-A1 shown in (a)
Figure 5:
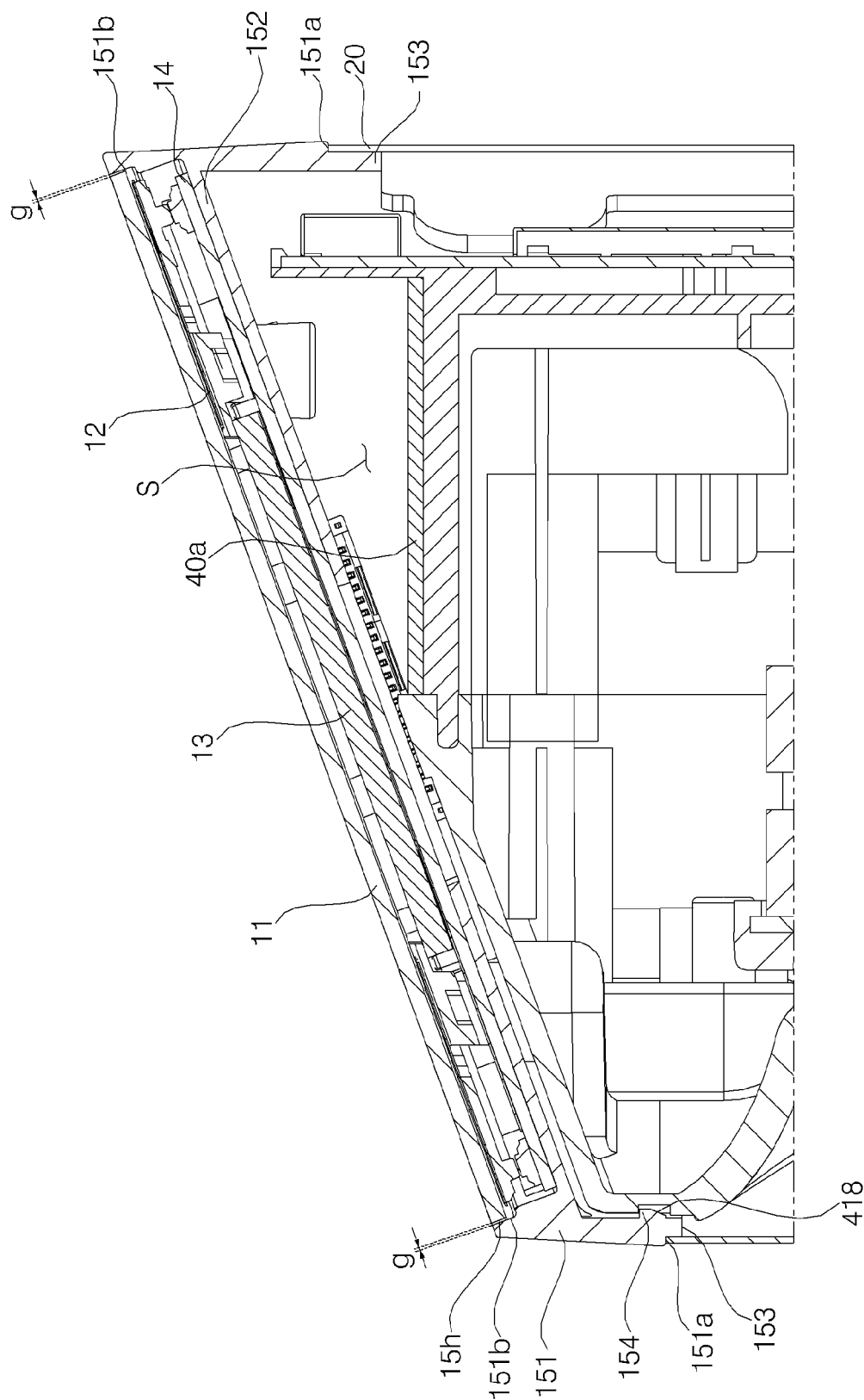
FIG. 5 is an enlarged view of one portion of FIG. 4.
Figure 6A:
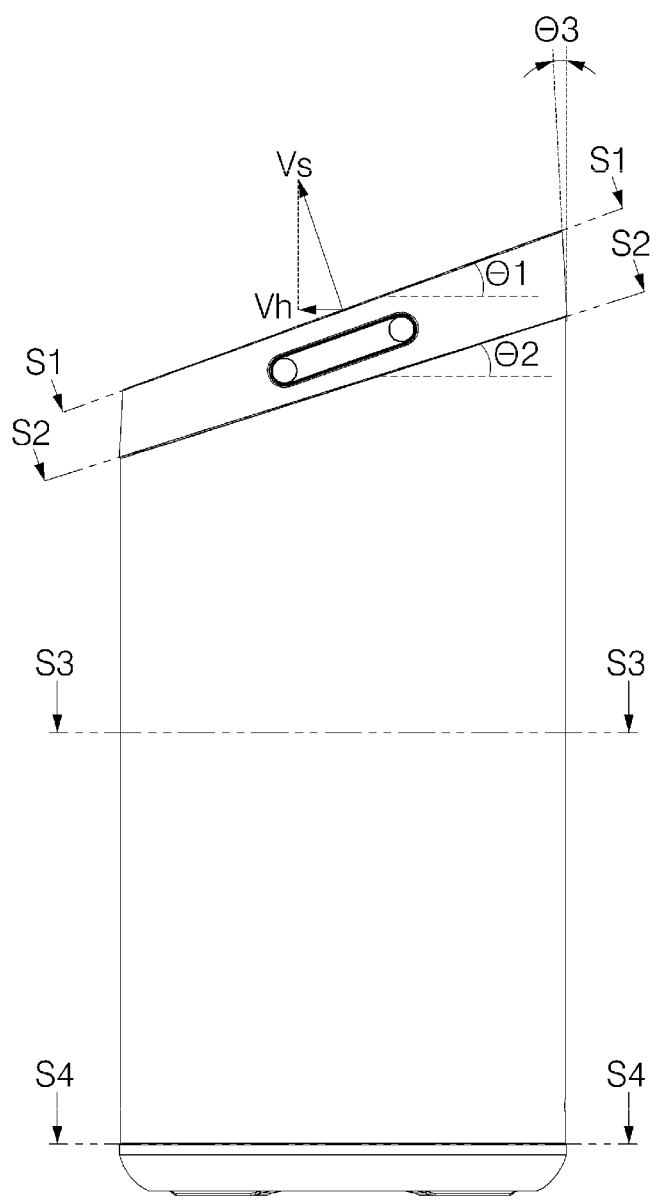
FIG. 6A is a right side view of a voice recognition apparatus.
Figure 6B:
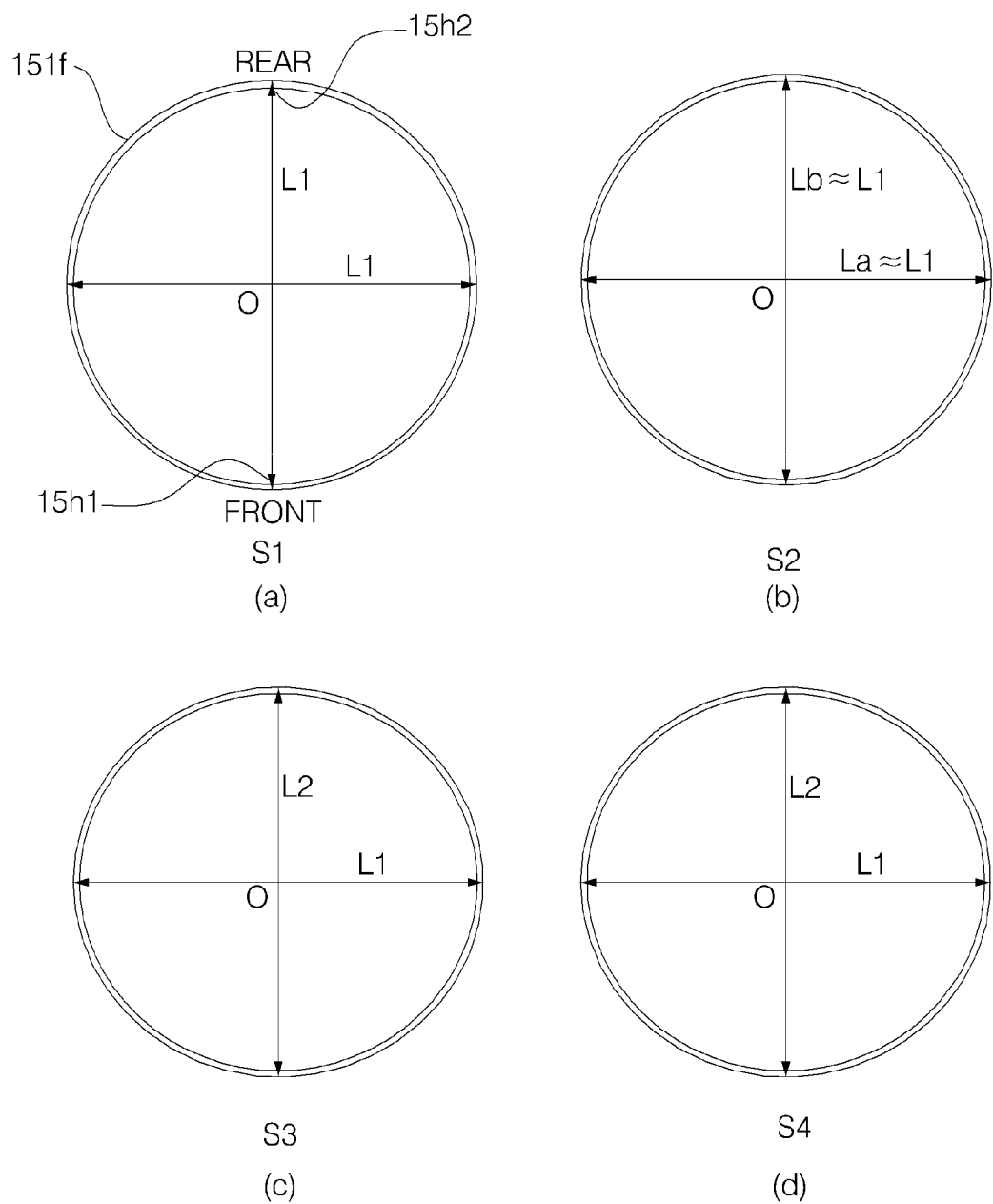
FIG. 6B are cross-sectional view of a grill viewed from each point indicated in FIG. 6A.
Figure 8:
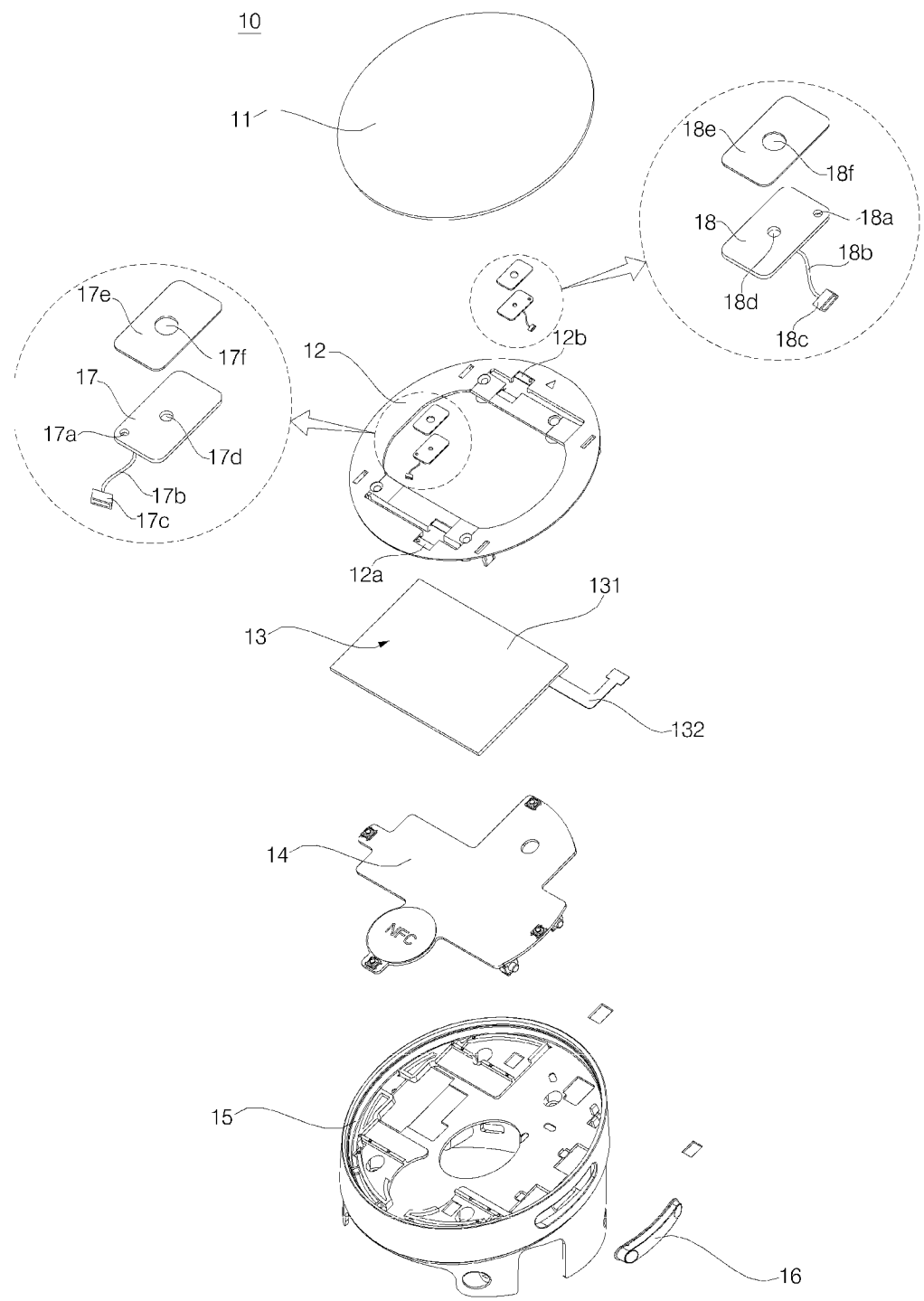
FIG. 8 is an exploded perspective view of a cover.
Figure 9:
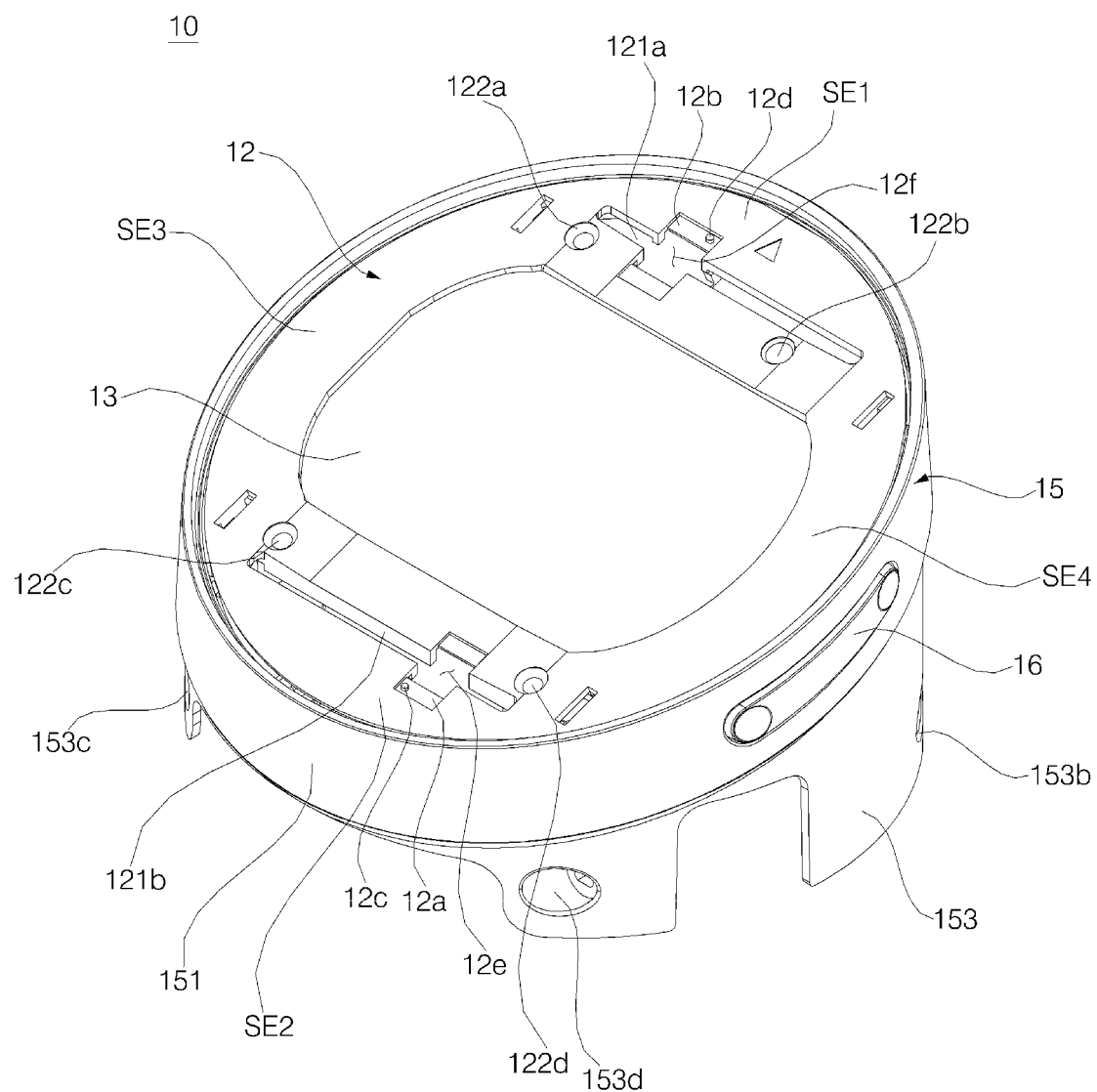
FIG. 9 shows a cover from which a window is removed.
Figure 10:
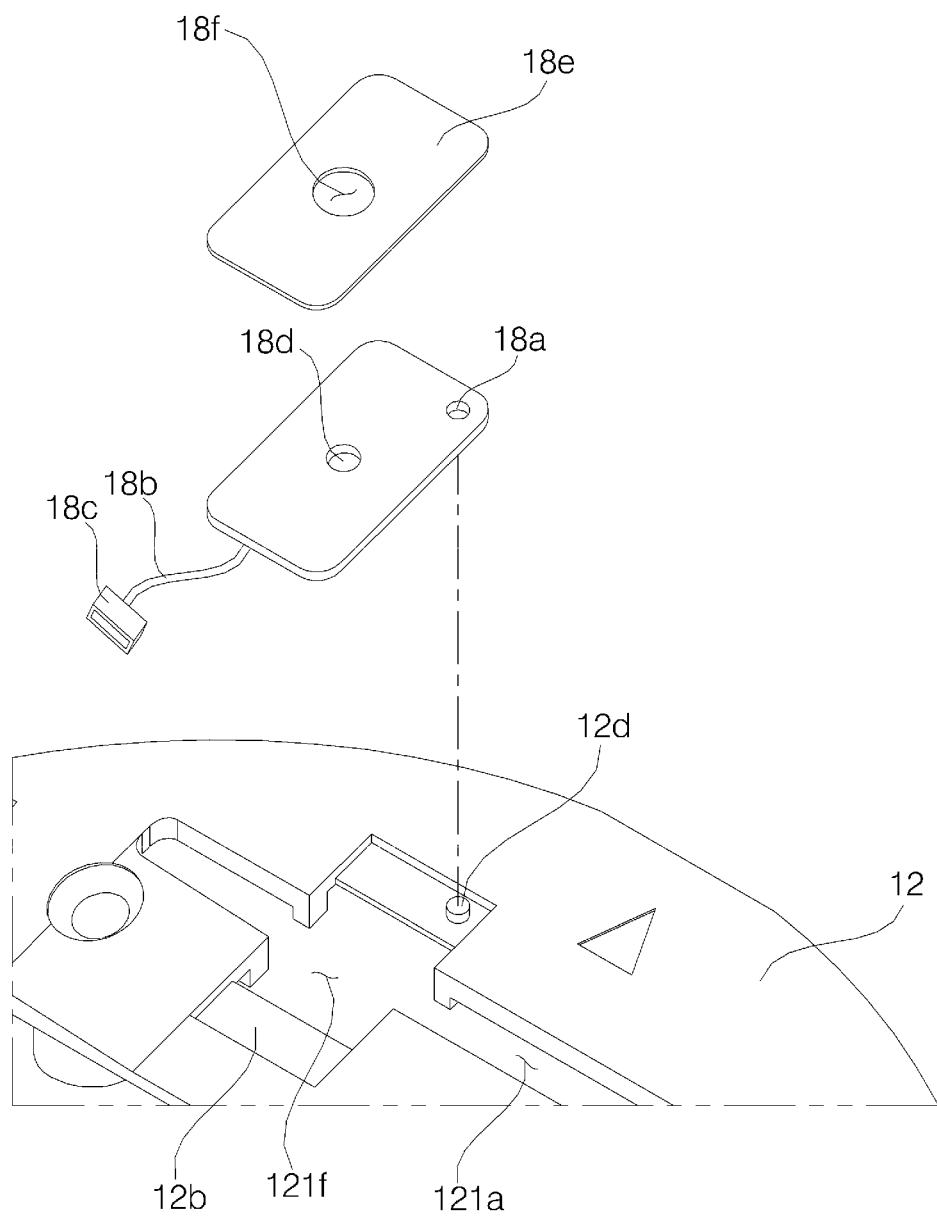
FIG. 10 is an exploded view of the case where a voice input PCB is yet to be coupled to a window support.
Figure 11:
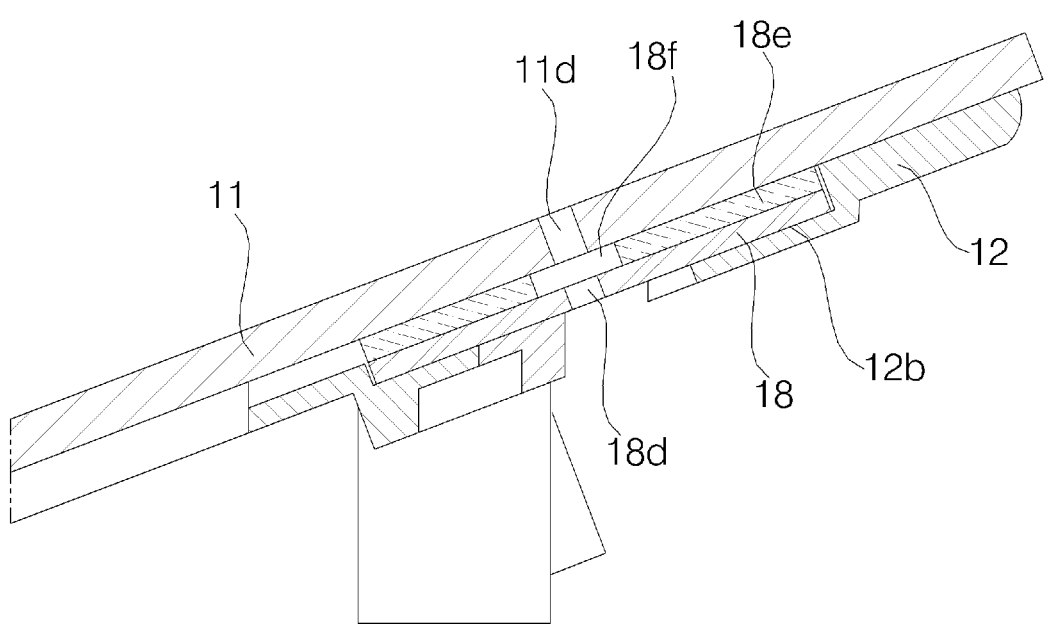
FIG. 11 is a cross-sectional view of the case where a voice input PCB is coupled to a window support.

FIG. 3 is a perspective view of a voice recognition apparatus according to an embodiment of the present invention. FIG. 4 shows a front view (a) of a voice recognition apparatus and a cross-sectional view (b) cut along A1-A1 shown in (a). FIG. 5 is an enlarged view of one portion of FIG. 4. FIG. 6A is a right side view of a voice recognition apparatus. FIG. 6B are cross-sectional view of a grill viewed from each point indicated in FIG. 6A. FIG. 7 is a block diagram illustrating control relationship between major components of a voice recognition apparatus. FIG. 8 is an exploded perspective view of a cover. FIG. 9 shows a cover from which a window is removed. FIG. 10 is an exploded view of the case where a voice input PCB is yet to be coupled to a window support. FIG. 11 is a cross-sectional view of the case where a voice input PCB is coupled to a window support.

Referring to FIGS. 3 to 11, a voice recognition apparatus (or the voice recognition apparatus 1) according to an embodiment of the present invention may include a cover 10, a main body 40, a grill 20, and a base 30. The main body may be supported by the base positioned at the bottom, and the cover 10 may be coupled to the top of the main body 40.

The main body 40 is provided inside the grill 20. The whole main body 40 is not necessarily provided inside the grill 20, and, as shown in the embodiment, a portion of the main body 40 may protrude through an upper end of the grill 20. The grill 20 is provided with a plurality of through-holes 20h, is formed in a vertically long cylindrical shape, and surrounds the main body 40.

An porous filter (not shown) may be attached to an inner side of the grill 20 so that dust is prevented from flowing into the inside of the grill 20 through the through-holes 20h. The filter may be formed of a material having tiny holes, such as mesh or non woven fabrics. The filter may be attached to an inner surface of the grill 20 by an adhesive member such as double-side tape. The filter also helps prevent components, such as speakers 43 and 44 provided inside the grill 20 and main body cases 41 and 42, from being seen from the outside through the through-holes 20h.

Meanwhile, FIG. 3 shows the case where a through-hole 20h is formed at a portion of the grill 20 and omitted in other portions, but this is merely an illustration for convenience of the drawing. The through-hole 20h may be formed in most parts of the grill 20 so that sound output from the speakers 43 and 44 which will be described later can evenly spread in the leftward, rightward, frontward, and rearward directions through the through-holes 20h.

The cover 10 may include a window 11, a window support 12, a display 13, a display Printed Circuit Board (PCB) 14, and a cover housing 15. The window 11, the window support 12, the display 13, and the display PCB 14 may be provided inside the cover housing 15.

Referring to FIGS. 4 and 5, the cover housing 15 is formed of syntactic resin and coupled to the upper side of the main body 40, and has an opening 15H formed in an upper surface of the cover housing 15. The cover housing 15 is formed in a cylindrical shape, and the upper part of the cover housing 15 may include a side wall 151 defining the opening 15h, and a partition 152 that extends from an inner surface of the side wall to partition the inside of the side wall 151 vertically. The display PCB 14, the display 13, the window support 12, and the window 11 are disposed above the partition 152 (for more detailed configuration of the cover housing 15, see FIGS. 21 and 22).

An upper end 151a of the side wall 151 is in contact with the upper end of the grill 20, but there may be a clearance between the upper end 151a of the side wall 151 and the upper end of the grill 20. As viewed from above, at least part of the lower end 151a of the side wall 151 overlaps the upper end of the grill 20. There is clearance between an outside surface of the side wall 151 and an outer surface of the grill 20, but, except the clearance, the outer surface of the side wall 151 and the outer surface of the grill 20 form one integrated appearance.

An upper end holder 153 extends downward from the lower end 151 of the side wall 151 to be thereby coupled to the grill 20. Such coupling of the upper end holder 153 and the grill 20 is achieved not by using an additional fastening member, such as a bolt, but using a structure in which the upper end holder 153 is inserted (fitted) inside an opening of the upper end of the grill 20. Preferably, coupling of the upper end holder 153 and the grill 20 is a forced fitting manner using an elastic/restoring force that the grill 20 or the upper end holder 153 has.

The upper end holder 153 is positioned inside more than the lower end of the side wall 151 (that is, the outer surface of the cover housing 15 is recessed at the lower end 151a of the side 2all 151 to form an outer surface of the upper end holder 153), so a surface 157 may be formed at the lower end of the side wall 151, the surface 157 which extends from the outer surface of the side wall 151 to the upper end holder 153 to oppose the upper end of the grill 20.

The cover housing 15 may have a protrusion 154 protruding from the inner surface of the side wall 151, and a protrusion insertion groove 418 formed at the front surface of the main body 40 and coupled to the protrusion 154. If the protrusion 154 of the main body 40 reaches the protrusion insertion groove 418 while moving along a circumferential surface in the process of assembling the cover housing 15 and the main body 40, the protrusion is inserted into the protrusion insertion groove 418 by an elastic force of the cover housing 15 made of syntactic resin.

As the outer surface of the upper holder 153 is in contact with the inner surface of the grill 20, the shape of the upper end of the grill 20 is maintained. In particular, when the grill 20 is made of a metal material, the grill 20 is deformed in response to a shape of the upper end holder 153, and thus, the upper end of the grill 20 may be maintained in a shape corresponding to the upper end holder 153.

Meanwhile, in the case where the upper end holder 153 extends in an elliptical shape along the lower end 151a of the side wall 151, a metal plate is rolled up to form the cylindrical shape of the grill 20 with a circular-shaped cross section, and, if the upper end of the grill 20 is fitted into the upper end holder 153, the shape of the grill 20 is also changed into an elliptical shape corresponding to the shape of the upper end holder 153 and maintained in the changed shape.

As in the embodiment, in the case where the window having a radius r is inclined at a predetermined angle (which is indicated as θ1 in FIG. 6A, that is, an acute angle, and which is hereinafter referred to as a "first angle") relative to a specific horizontal plane, and a vector Vh, which is obtained by orthogonally projecting a normal vector Vs of an upper surface of the window 11 onto the horizontal plane, faces the forward front, the shape of the window 11 projected onto the horizontal plane becomes an elliptical shape having a short radius r cos θ1 in the front and rear direction and a long radius r in the left and right direction. Thus, for an integrated exterior of the voice recognition apparatus 1, it is desirable that a cross section of the grill 20 is formed in a shape (the form having cos θ1:1 which is a ratio of a short radius to a long radius) corresponding to the elliptical shape. Since the upper end holder 153 is formed in a shape corresponding to the elliptical shape, it is possible to maintain the cross section of the grill 20 in a shape corresponding to the elliptical shape. The expression "shape corresponding to" is defined to indicate not just the case where two figures have a completely identical shape, but also the case where the two figures resembles each other (e.g., the case where a rate of a short radius to a long radius is the same), and the corresponding shape will be hereinafter used with the above meaning.

The angle θ1 at which the window 11 is inclined against the horizontal plane is determined in consideration of a user's gaze in a general use condition. The angle θ1 is determined to allow a gaze of an adult user to be positioned in front of the voice recognition apparatus 1 approximately forms 90° relative to the upper surface of the window 11 when the voice recognition apparatus 1 is placed in a sink, a table, or the like in a kitchen. Preferably, the angle θ1 is determined to form approximately 90° relative to the upper surface of the window 11, and it is desirable that the angle θ1 is approximately 20°, but aspects of the present invention are not limited thereto.

Meanwhile, a display panel 131 may be inclined at a specific angle relative to a horizontal plane so that a screen of the display panel 131 is directed toward an upper front side. Preferably, the display panel 131 is inclined at the same angle θ1 as the window 11. A window support plate 121 which will be described later is also inclined at the same angle as that of the display panel 131 (or the window 11).

More specifically, referring to FIGS. 6A to 6D, an upper end of the side wall 151 of the cover housing 15 is formed in a circular shape having an outer diameter L1, and an outer diameter of the lower end 151a of the side wall 151 is inclined at an angle θ2 (θ2<θ1. Hereinafter, θ2 will be described as a "second angle".) relative to a horizontal plane, and therefore, the upper end of the side wall 151 is in a shape having a diameter La in the left and right direction and a diameter Lb in the front and rear direction. In this case, since the outer surface of the side wall 151 is inclined at a predetermined angle θ3, a shape of a cross section S1 orthogonally projected onto a horizontal plane and a shape of a cross section S2 orthogonally projected onto the horizontal plane do not perfectly coincide with each other in FIG. 6. However, if a value of θ3 is sufficiently small (preferably, equal to or smaller than 5°), La and L1 has approximate values, so, it will be hereinafter assumed that La=L1. Furthermore, if a difference between θ1 and θ2 is sufficiently small, (preferably, equal to or smaller than 5°) Lb also has an approximate value of L1, so it will be hereinafter assumed that Lb=L1.

θ3 indicates an angle of an outer surface of the side wall 151 relative to a vertical line, and θ3 may have a constant value in the entire region of the outer surface of the side wall 151 but it also may vary along the circumference of the side wall 151.

Meanwhile, referring to cross sections S3 and S4 shown in FIG. 6B, an outer diameter of the grill 20 is an ellipse (L1>L2) having a long diameter L1 in the left and right direction and a short diameter L2 in the front rear direction. In this case, as assumed above, if La=L1 and Lb–L1, L2 is L1 cos θ1. That is, an exterior shape of the grill 20 orthogonally projected onto the horizontal plane is an ellipse with the diameter L2 in the front and rear direction shorter than the diameter L1 in the left and right direction. Although the window 11 is inclined, the voice recognition apparatus 1 has an elliptical shape, as viewed from above, and seemed to have an integrated exterior The side wall 151 is disposed in the upper side of the grill 20 and thus defines the exterior appearance of the voice recognition apparatus 1, but the upper end holder 153 is fully recessed inward of the grill 20 and thus hidden by the grill 20 so the upper end holder 153 is viewed at all on the exterior appearance of the voice recognition apparatus 1.

A position setting protrusion 156 (see FIG. 23) may protrude from the lower end of the side wall 151, and a position setting groove may be formed at the upper end of the grill 20 to allow the position setting protrusion inserted thereinto when the grill 20 is in right place.

The window 11 may be disposed inside the opening 15h of the cover housing 15. The window 11 is a processed transparent plate of constant thickness, and a side surface (or a circumferential surface) of the window 11 is orthogonal to an upper surface and a lower surface thereof.

An inner surface of the cover housing 15 has a specific portion 151b extending from the upper end of the cover housing 15 and being parallel to a direction (that is, a direction in which the normal vector Vs in directed in FIG. 6A) which the upper surface of the window 11 faces. The upper end inner surface 151a of the side wall 151 defines the opening 15h, and thus, the upper end inner surface 151b of the side wall 151 is referred to as an opening defining surface. The opening defining surface 151b is in the form of a cylindrical shape extending from the circumference of the opening 15h, and the window 11 is disposed the inside surrounded by the opening defining surface 151b. Preferably, the upper surface of the window 11 belongs to the same plane (or a plane to which the opening 15h belongs) as a plane to which the upper end of the cover housing 15 belongs, and therefore, the upper surface of the voice recognition apparatus 1 may seemingly have one integrated plane.

The opening defining surface 151b is composed of a surface which is parallel to the vector Vs at any position. That is, even in the case where the cover housing 15 is cut by an arbitrary plane parallel to the vector Vs, the opening defining surface 151b is parallel to the vector Vs on a cross section.

Since the opening defining surface 151b and the side surface of the window 11 are parallel to each other, the entire region of the side surface of the window 11 may be maintained with a predetermined gap g from the opening defining surface 151b when the center of the window 11 and the center of the opening defining surface 151b are aligned along the vector Vs. This means that, when the voice recognition apparatus 1 is viewed from above, the predetermined gap g is maintained between the window 11 and the upper end of the cover housing 15, and this provides impression of a high product quality. The gap g may be set to a minimum value in a condition in which the side surface is not interfered with the opening defining surface 151b when the window 11 is pressed to operate contact switches 181a, 181b, 181c, and 181d.

In the case where the cover housing 15 is cut along an arbitrary vertical plane, an outer surface of the side wall 151 may be, on the cut-off surface, parallel to the normal vector Vs or may be distal from the vector Vs at a lower end. In a process of injection molding the cover housing 15, the cover housing 15 is ejected in a vertically downward direction from a first mold defining the side wall 151. For the cover housing 15 to be easily ejected from the first mold, the outer surface of the side wall 151 needs to have the above-described shape.

On the contrary, in order to form the opening 15H in the upper surface of the cover housing 15, a second mold having a core, which is to be inserted into the opening 15h, is needed. By moving the second mold when the first mold is removed, the cover housing 15 may be separated from the second mold, and, in this case, the second mold is moved in the same direction as the normal vector Vs.

Figure 12A:
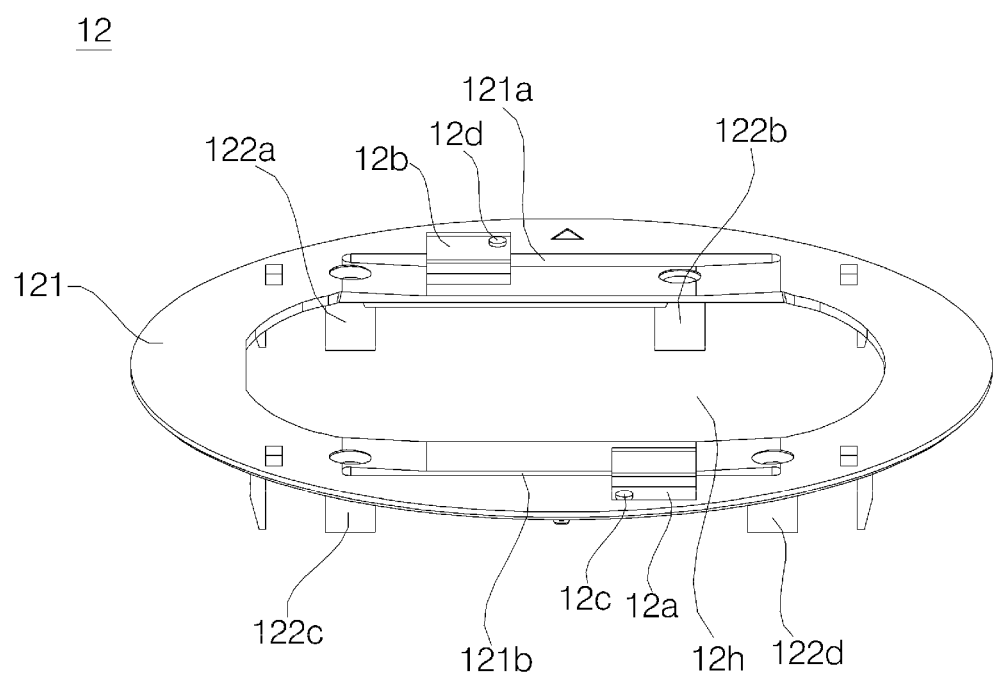
FIG. 12A is a perspective view showing an upper surface of a window support.
Figure 12B:
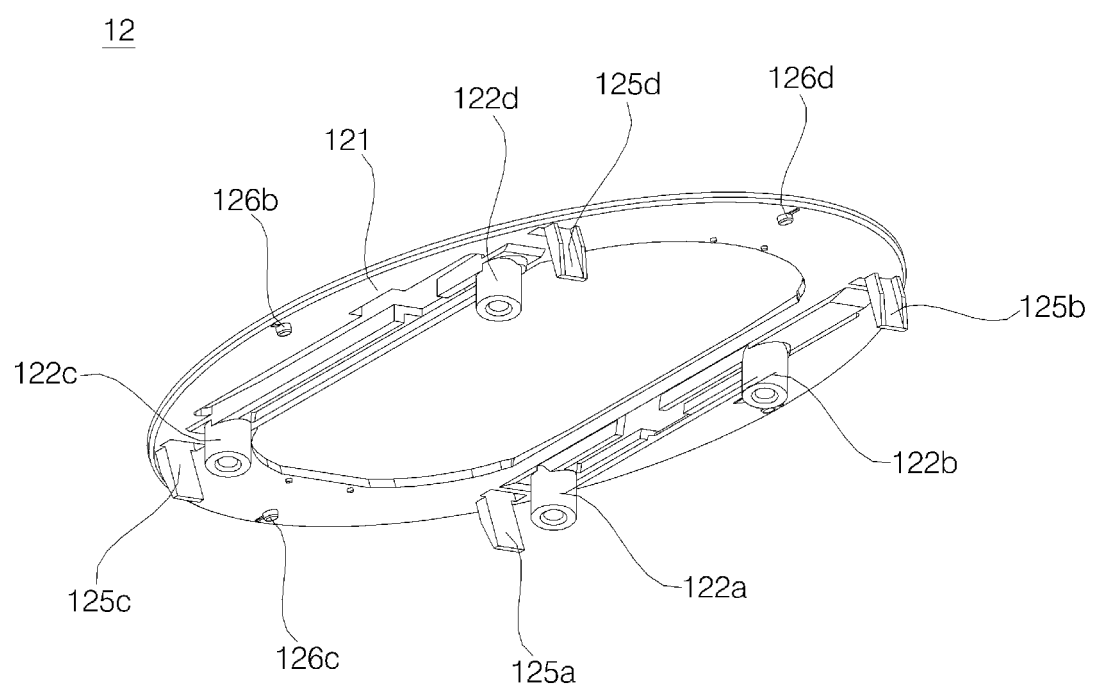
FIG. 12B is a perspective view showing a bottom surface of a window support.
Figure 12C:
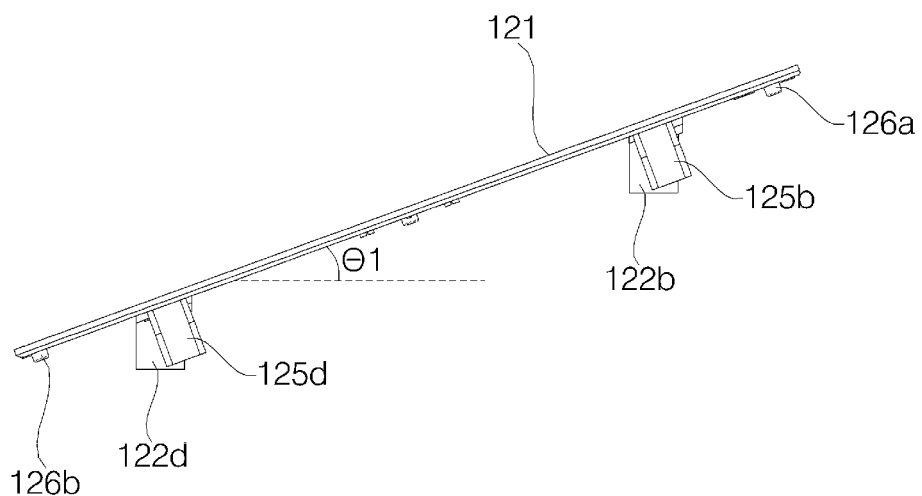
FIG. 12C is a right side view of a window support.
Figure 12D:
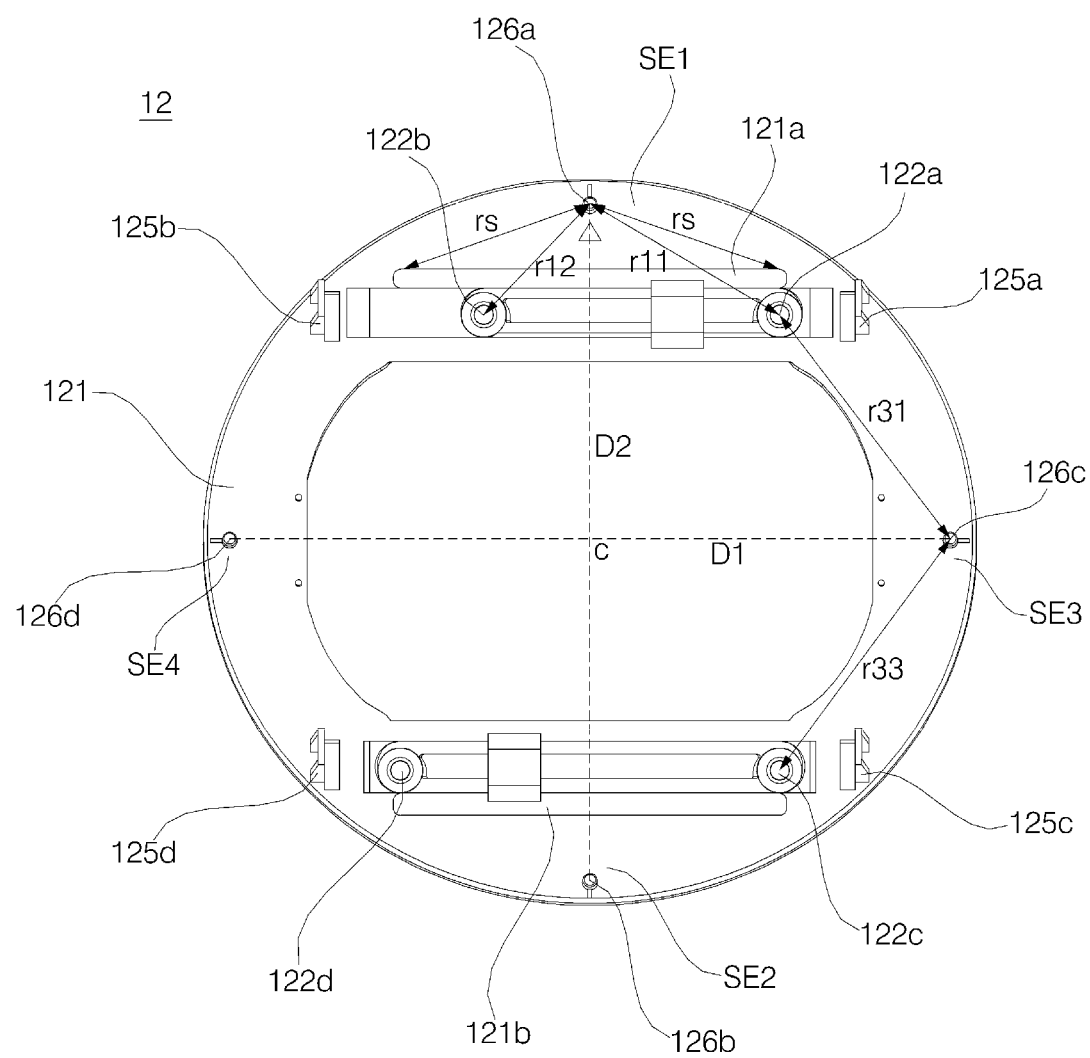
FIG. 12D is a bottom view of a window support.
Figure 13:
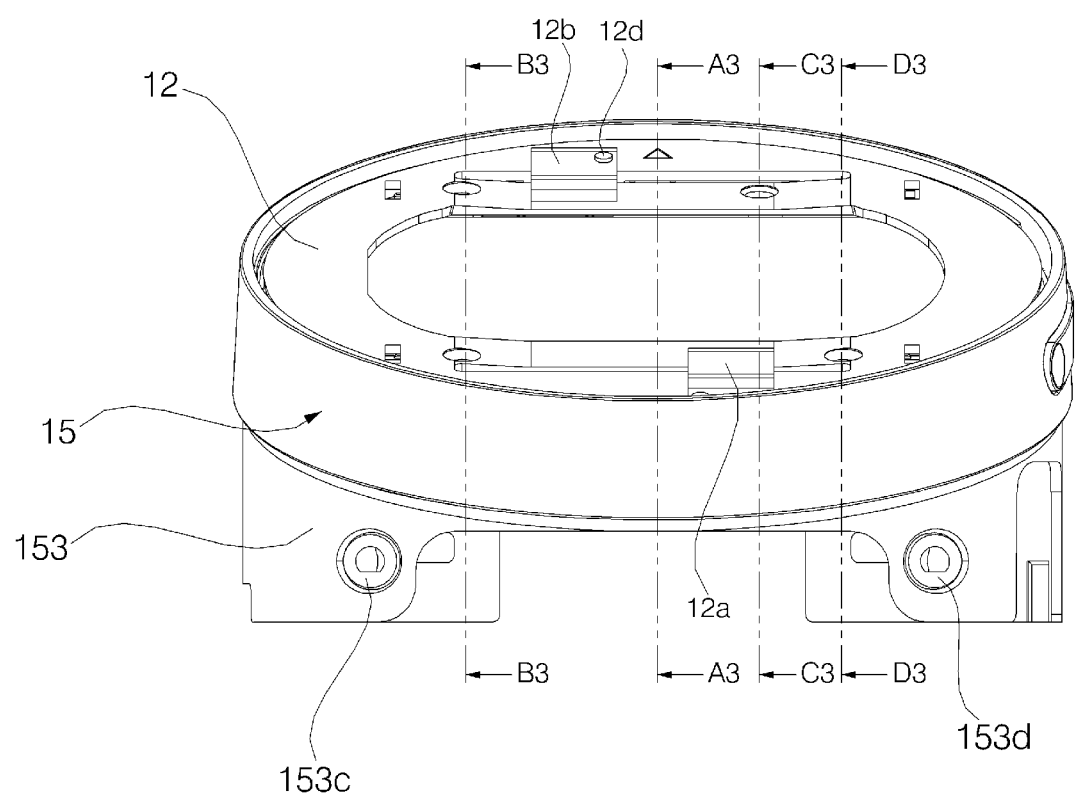
FIG. 13 shows a front side of a cover shown in FIG. 9.
Figure 14A:
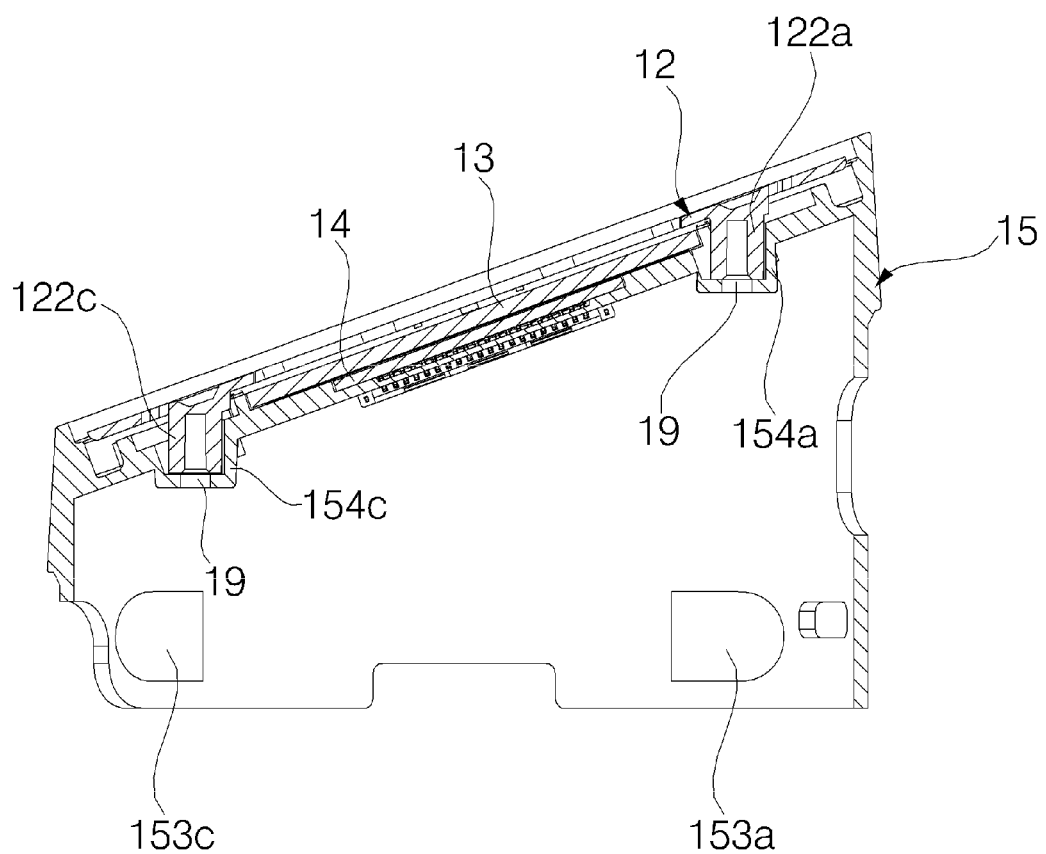
FIG. 14A is a cross-sectional view cut along B3-B3 shown in FIG. 13.
Figure 14B:
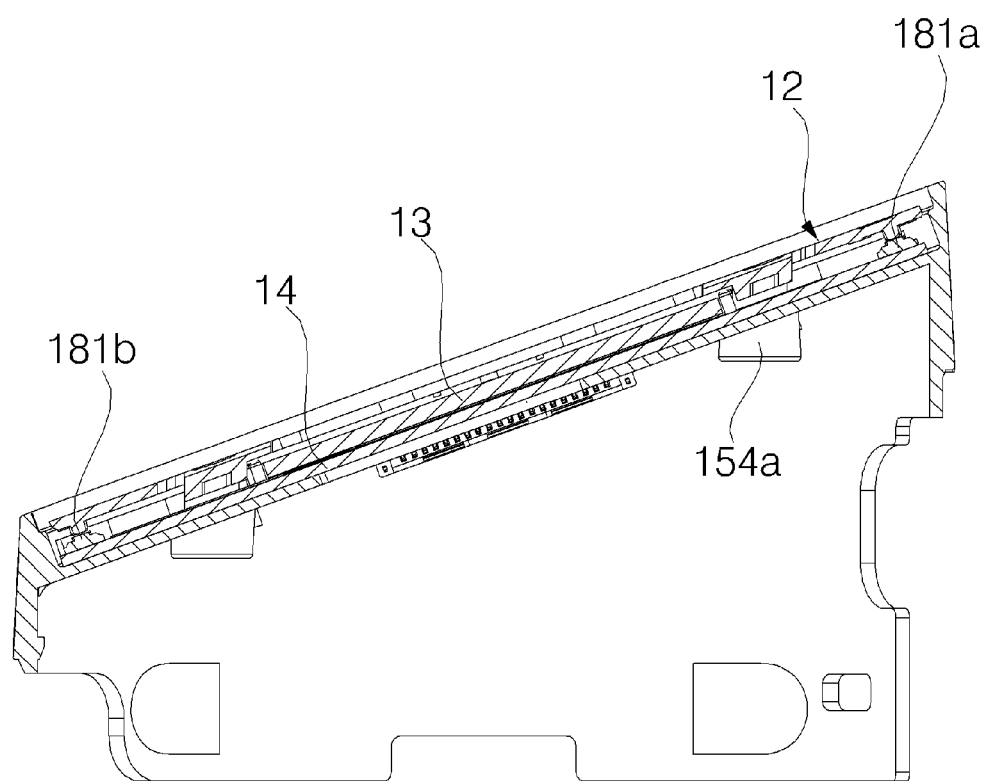
FIG. 14B is a cross-sectional view cut along A3-A3 shown in FIG. 13.
Figure 14C:
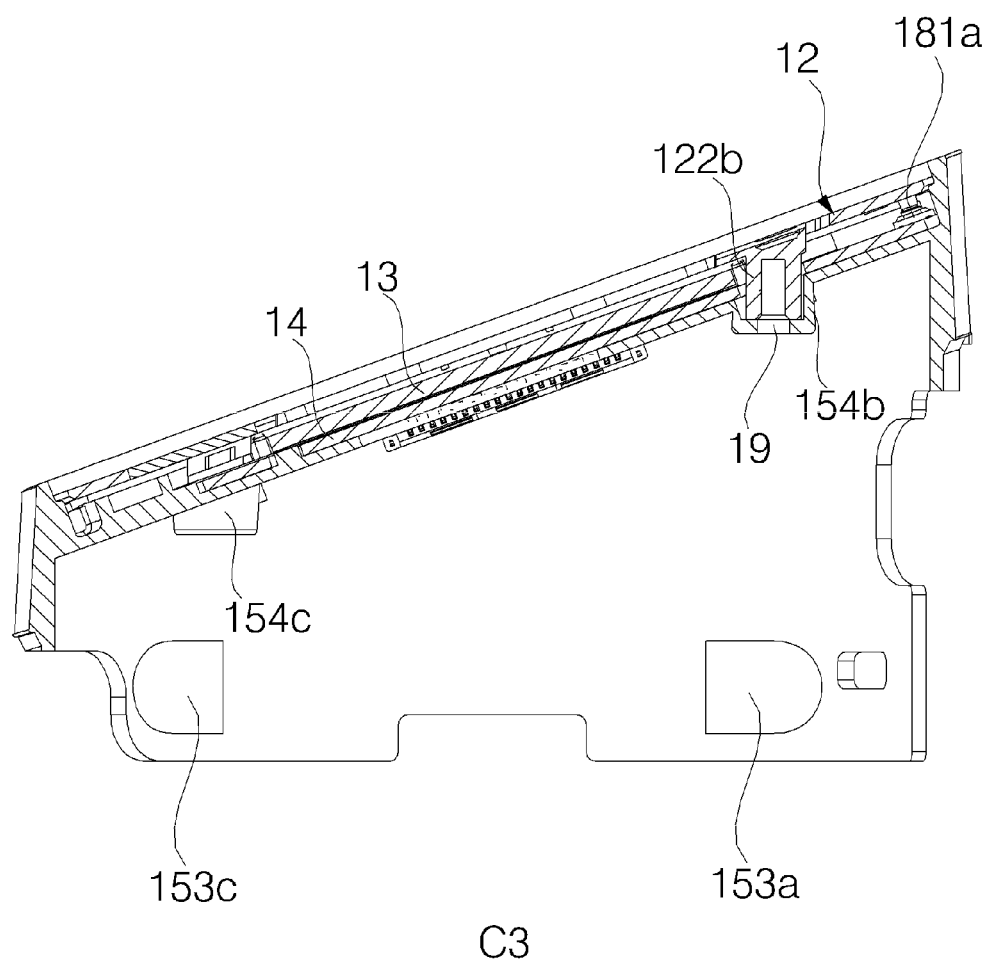
FIG. 14C is a cross-sectional view cut along C3-C3 shown in FIG. 13.
Figure 14D:
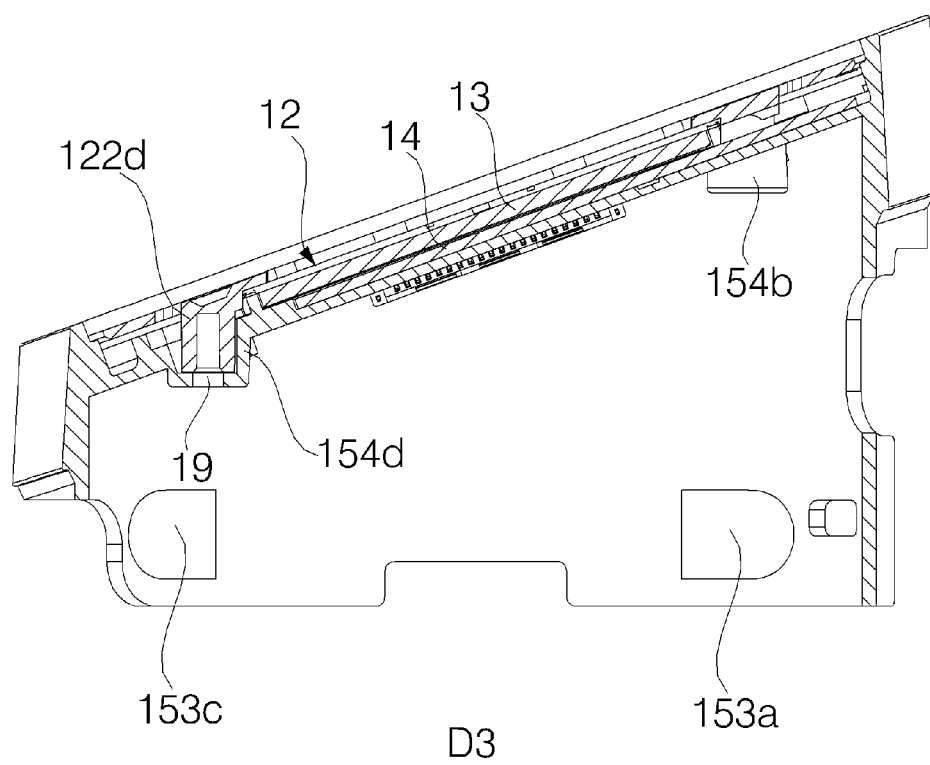
FIG. 14D is a cross-sectional view cut along D3-D3 shown in FIG. 13.
Figure 15:
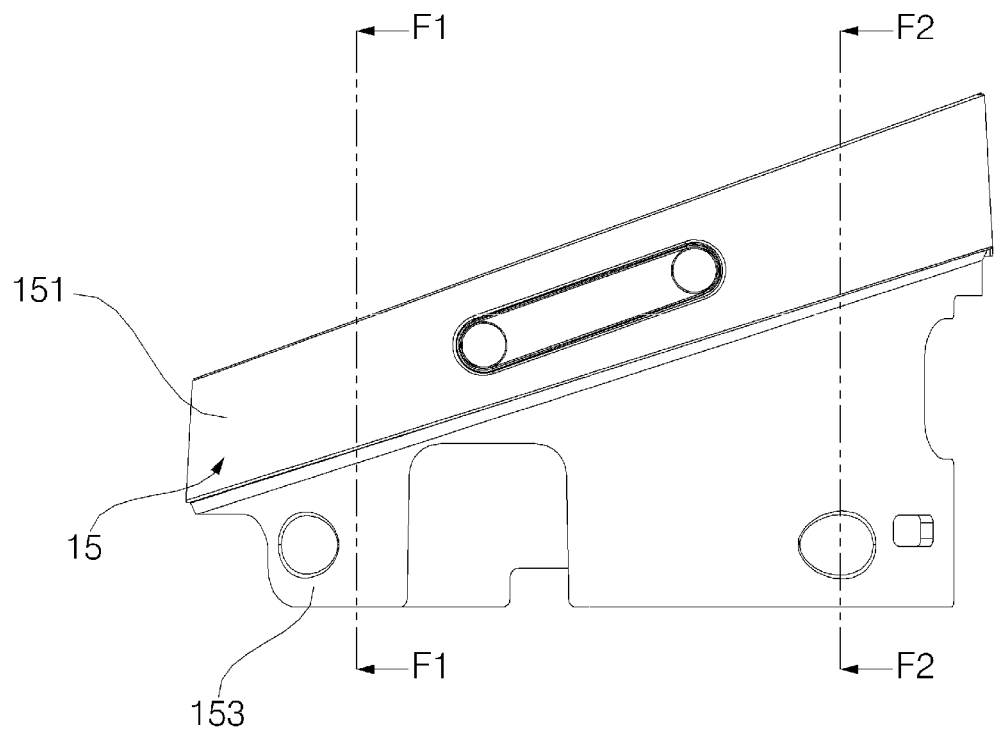
FIG. 15 is a right side view of a cover.
Figure 16A:
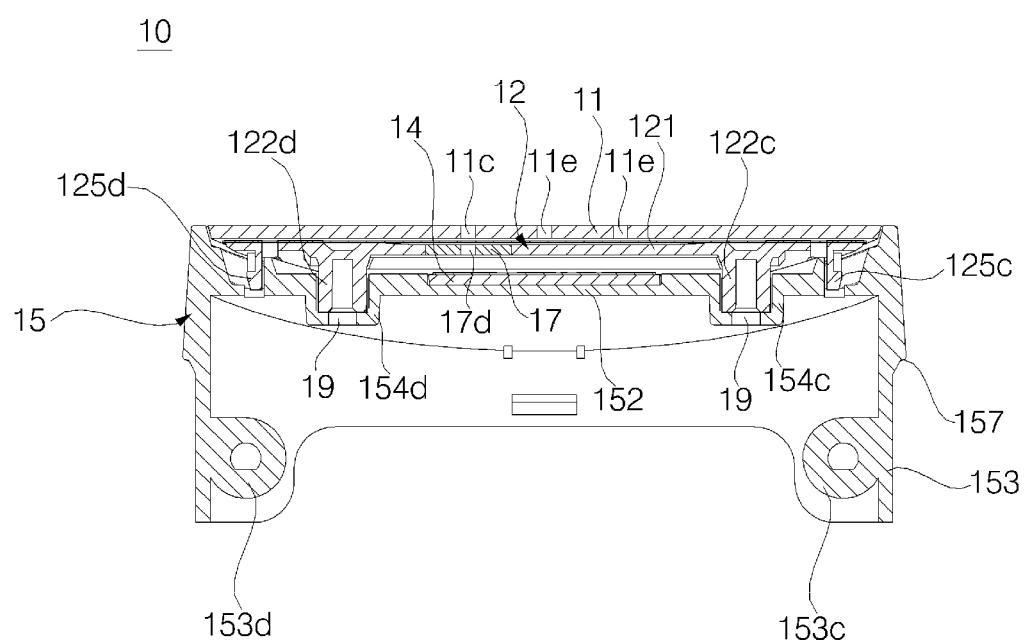
FIG. 16A is a cross-sectional view cut along F1-F1 shown in FIG. 15.
Figure 16B:
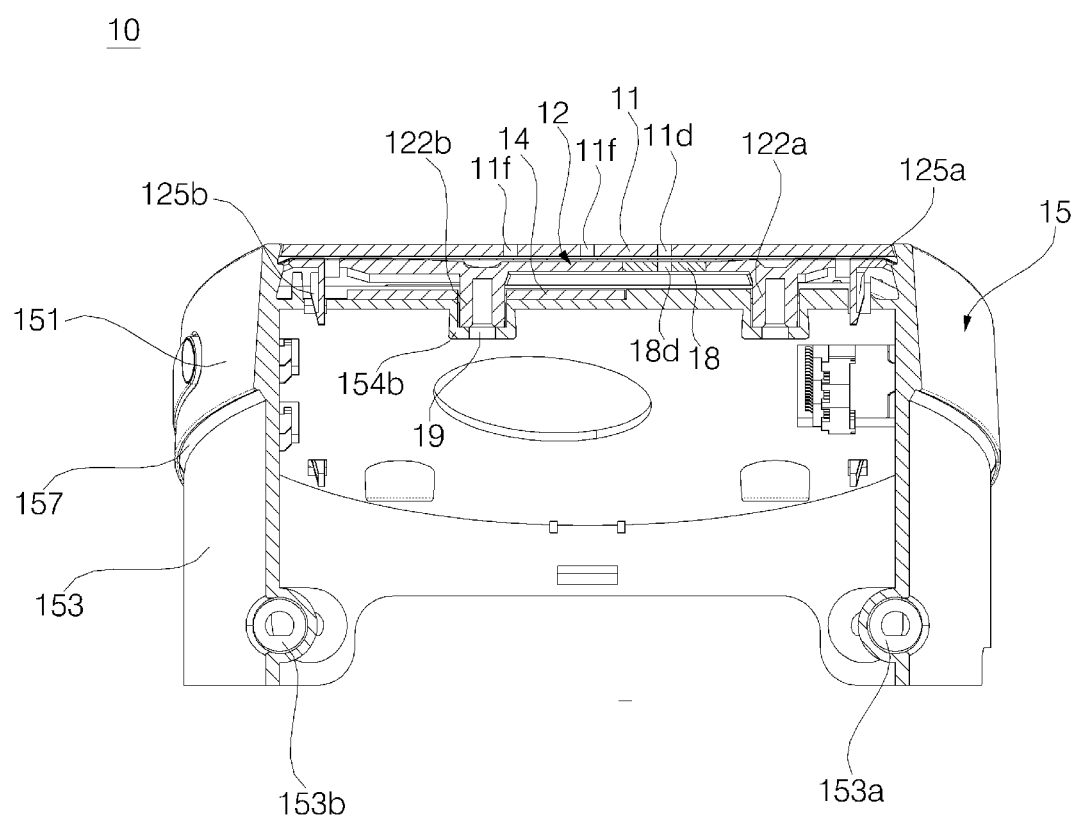
FIG. 16B is a cross-sectional view cut along F2-F2 shown in FIG. 15.
Figure 17:
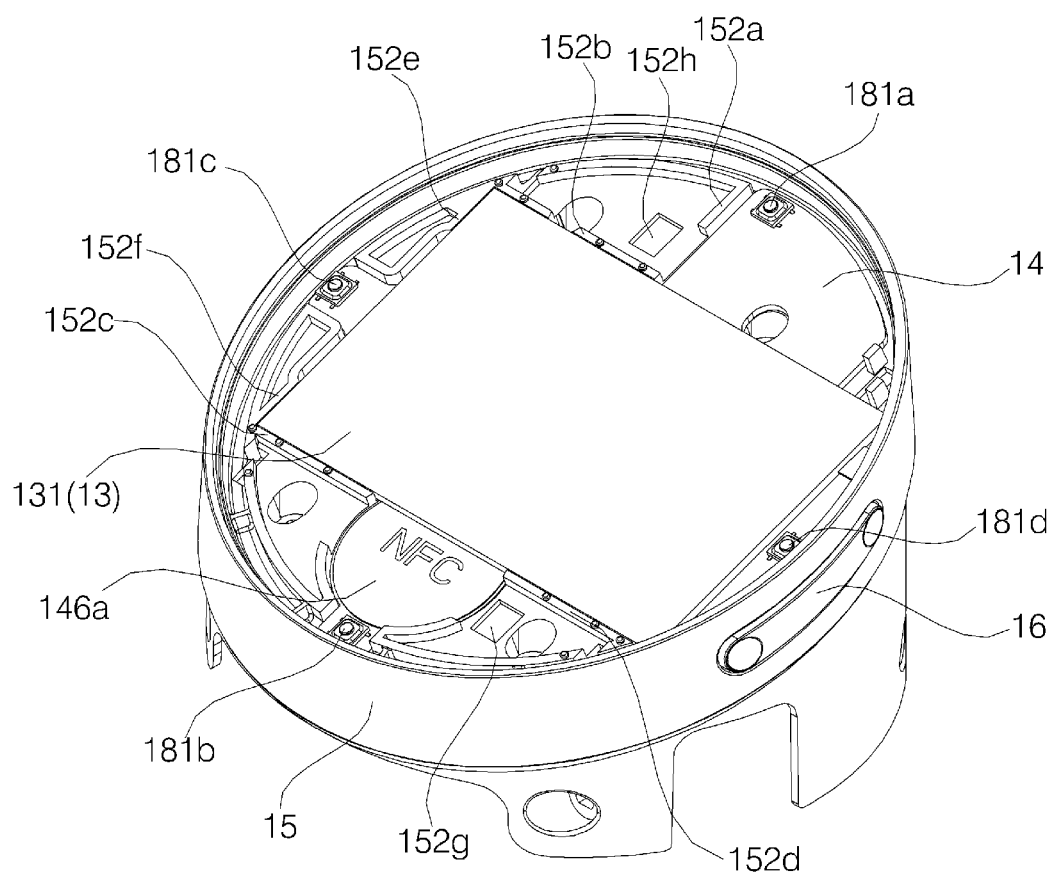
FIG. 17 shows the case where a window support is removed from an assembly shown in FIG. 9.
Figure 18:
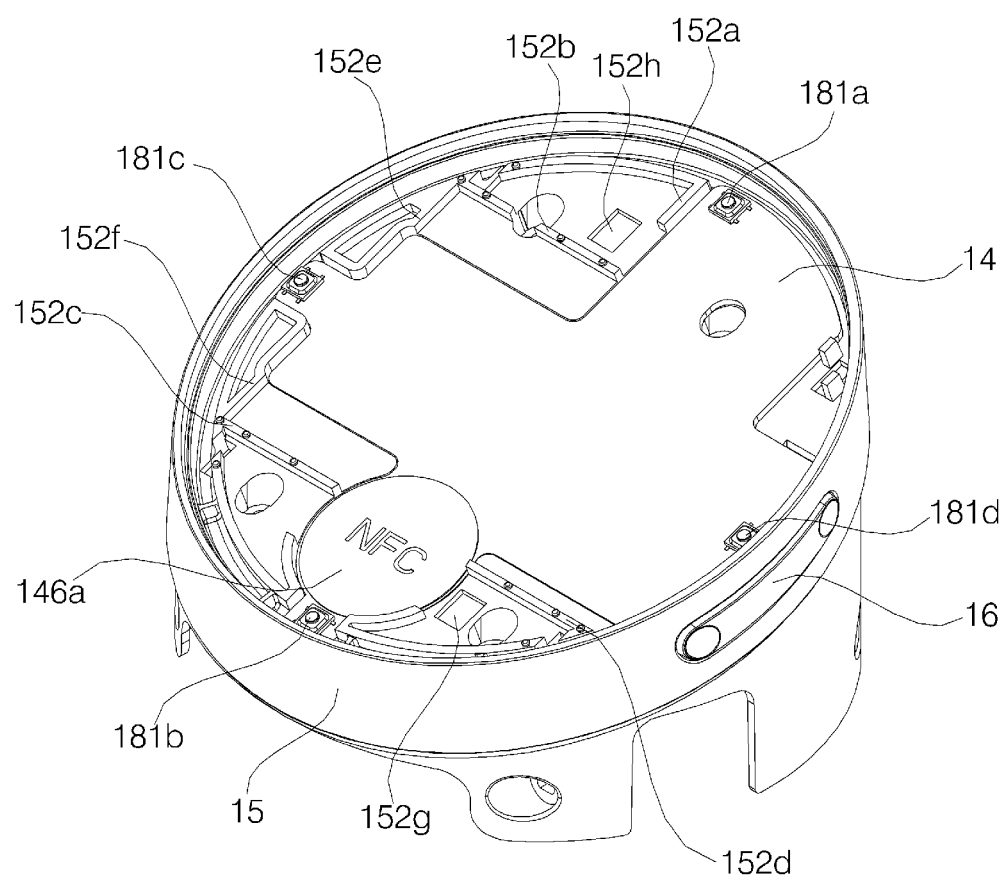
FIG. 18 shows the case where a display is removed from the assembly shown in FIG. 17.
Figure 19:
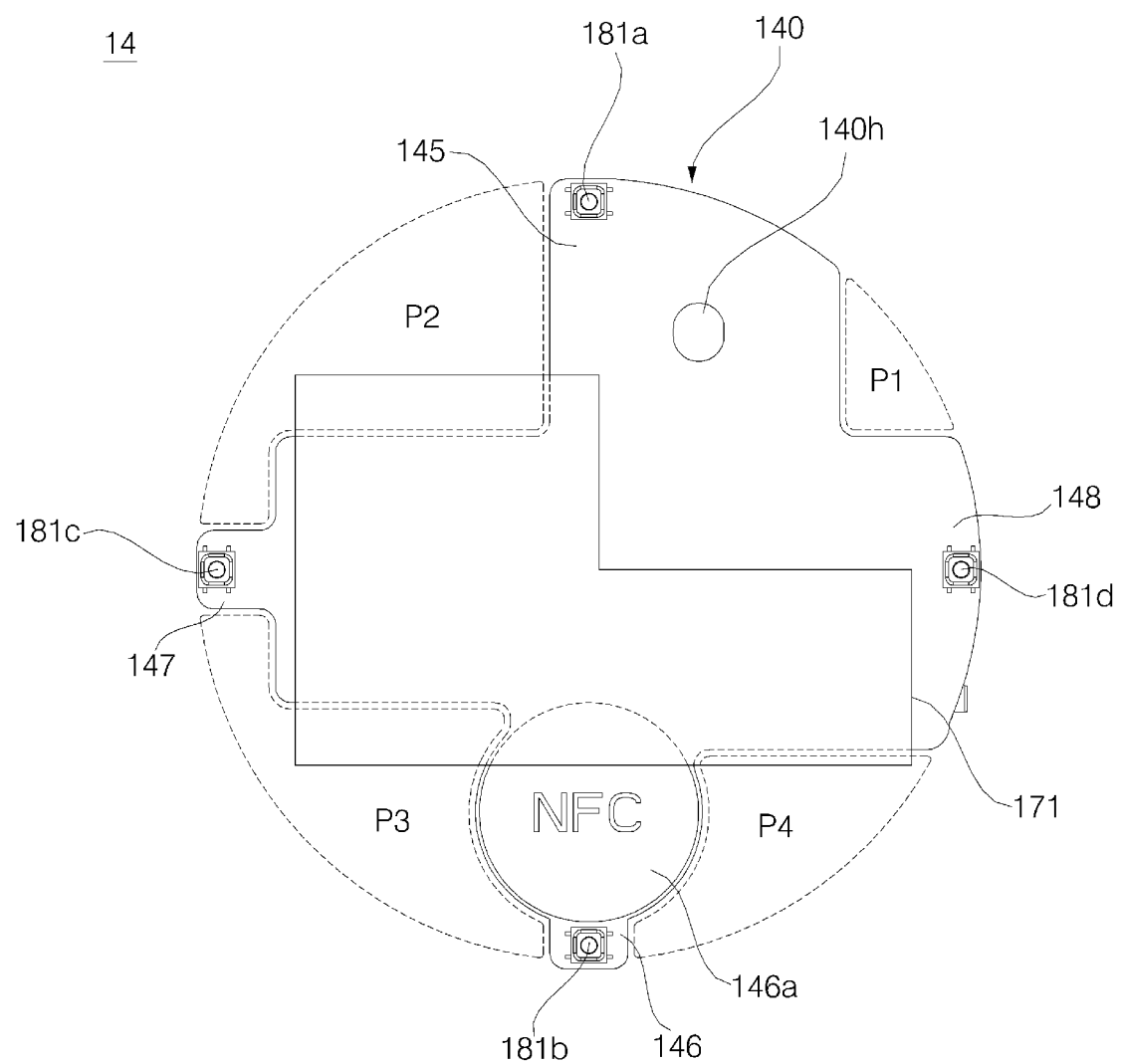
FIG. 19 is a plan view of a display PCB.
Figure 20:
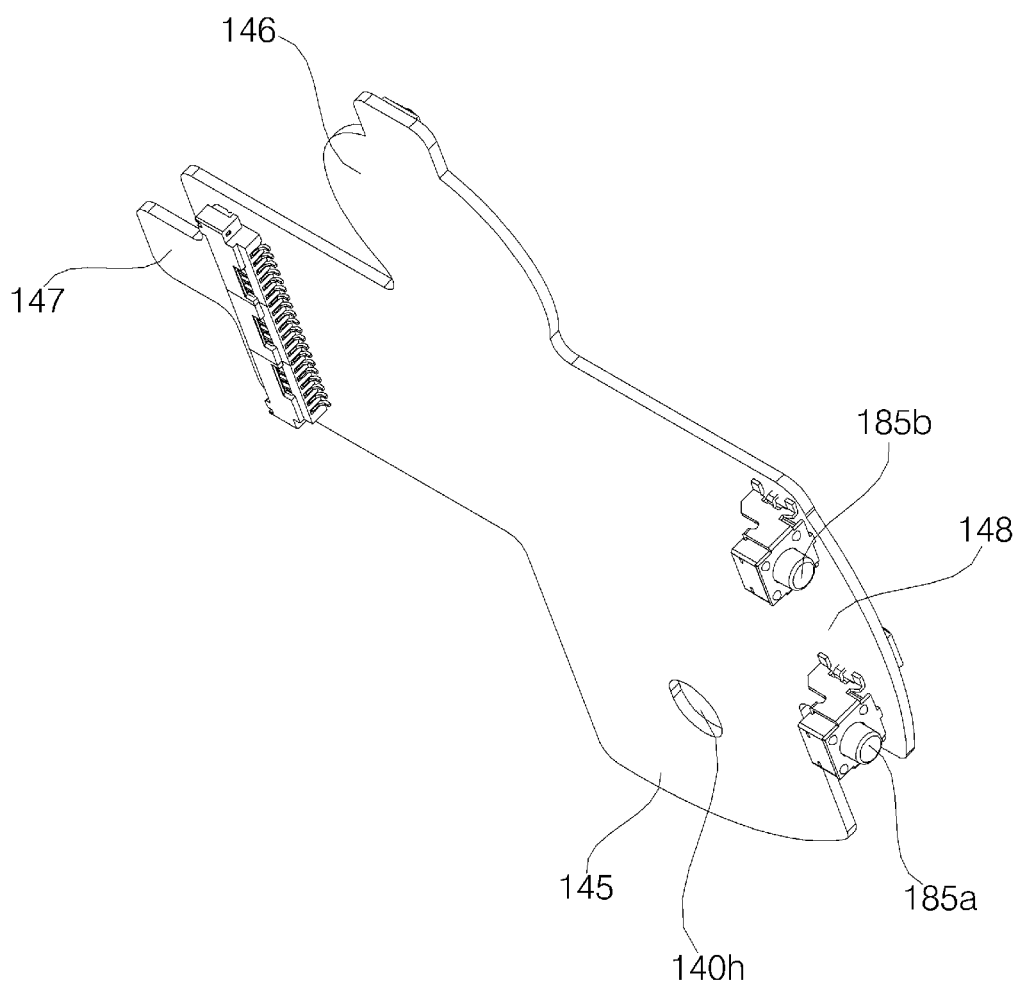
FIG. 20 is a perspective view showing the bottom surface of a display PCB.
Figure 21:
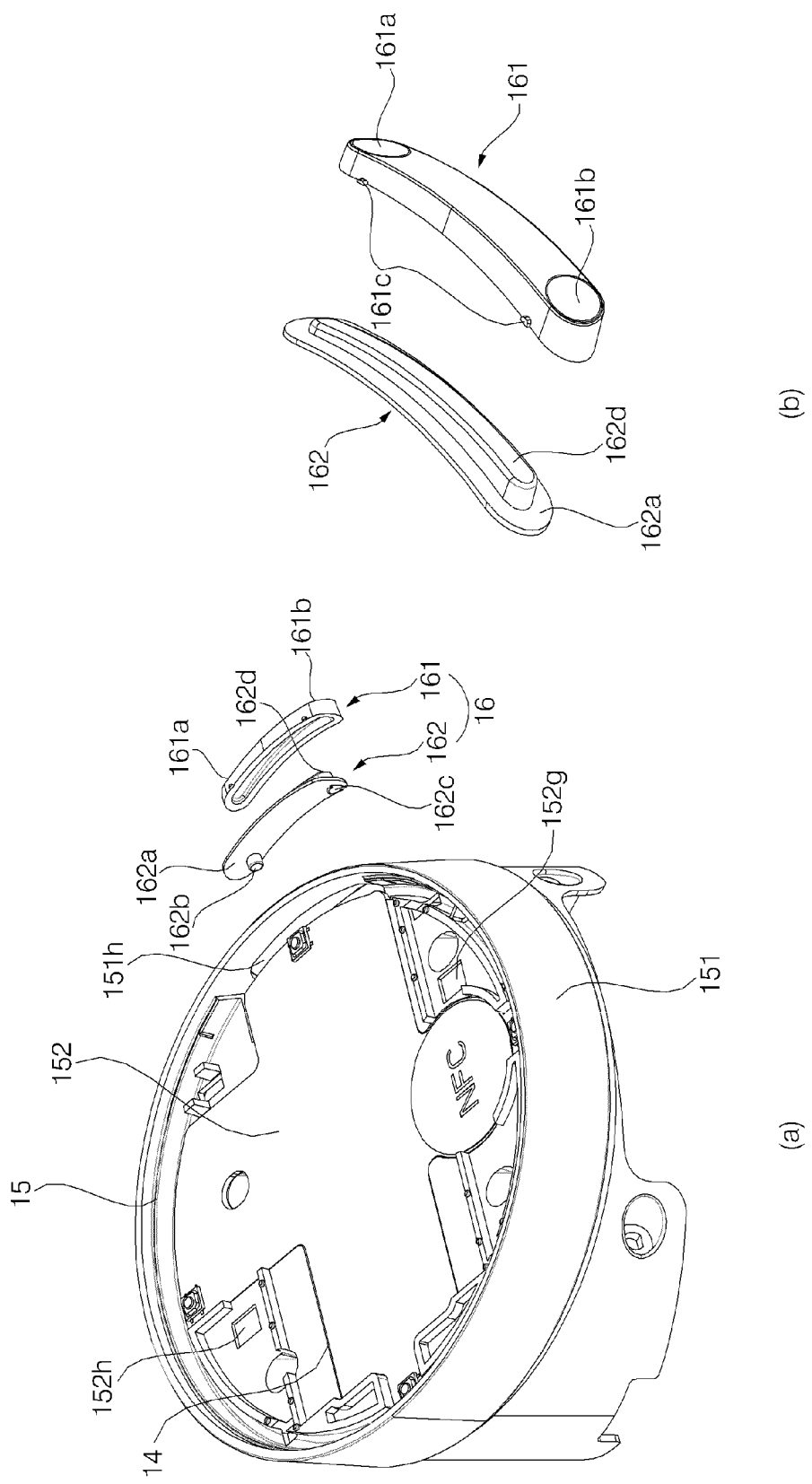
FIG. 21 is an exploded perspective view of a cover and a volume button.
Figure 22:
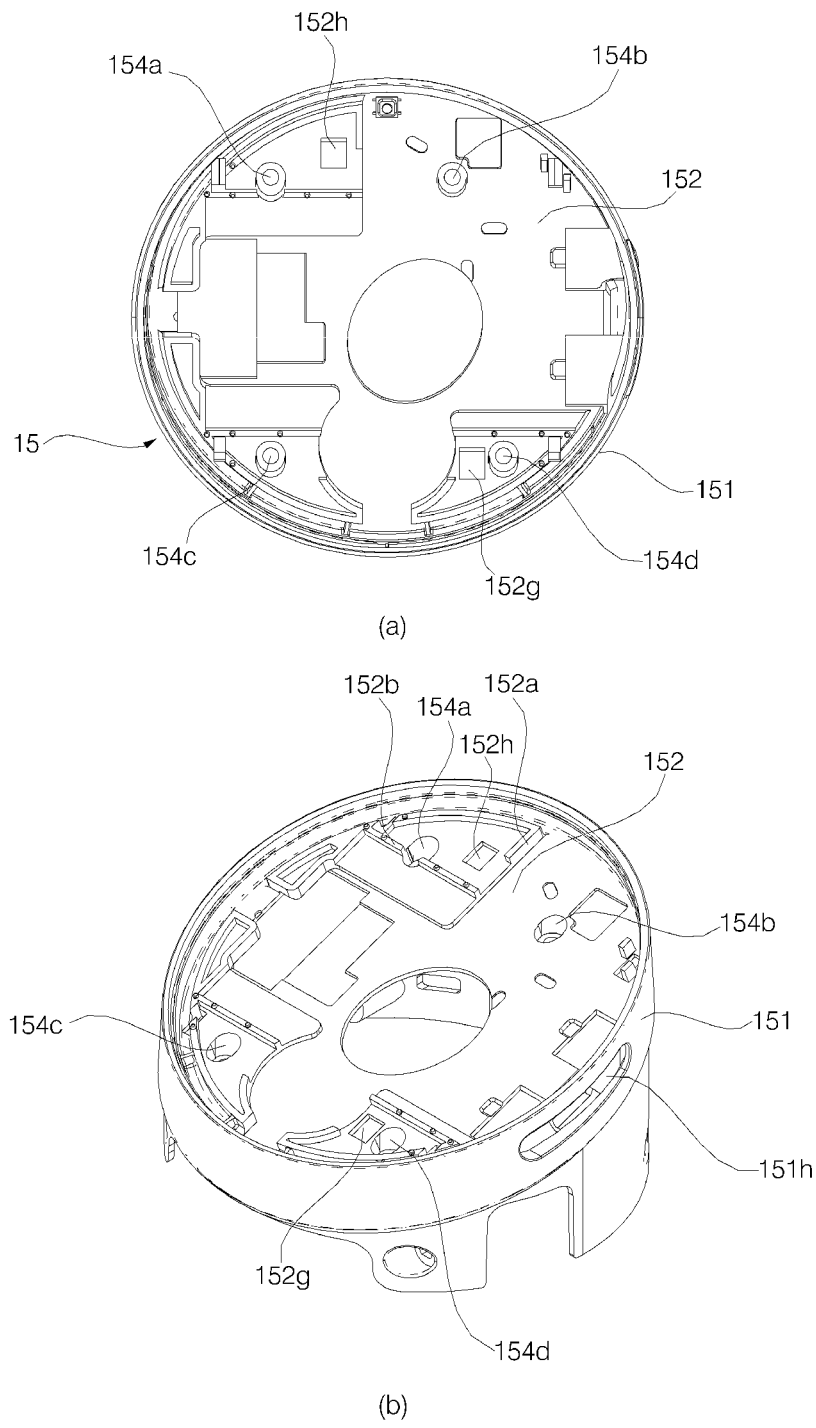
FIG. 22 shows a plane view (a) and a perspective view (b) of a cover housing.
Figure 23:
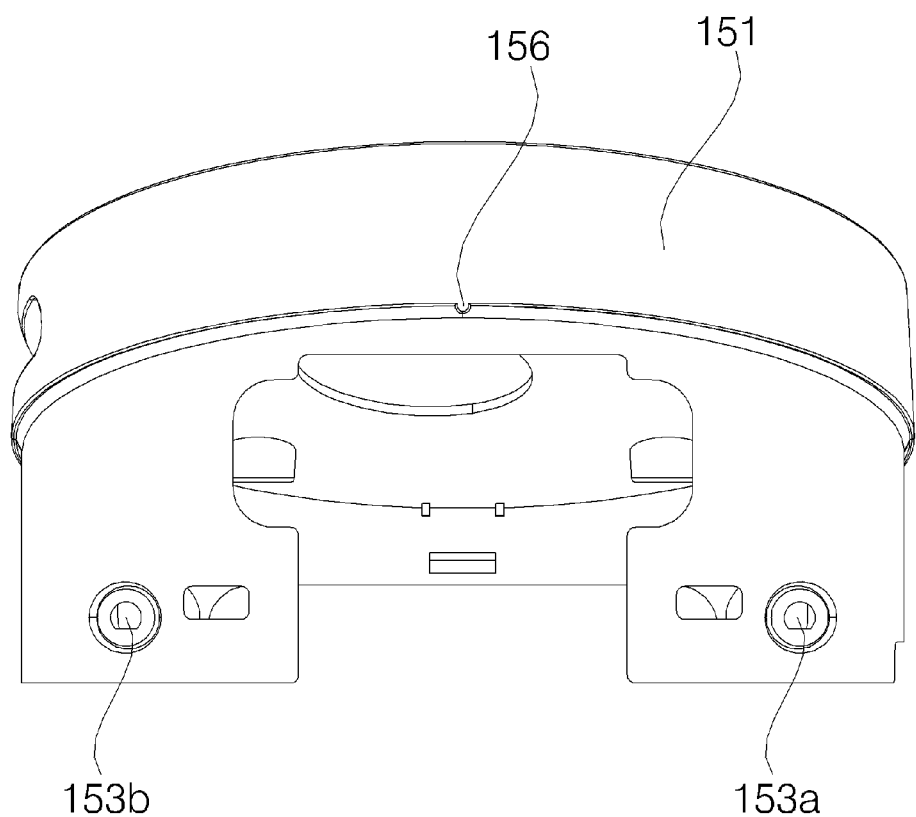
FIG. 23 is a rear view of a cover housing.

FIG. 12A is a perspective view showing an upper surface of a window support. FIG. 12B is a perspective view showing a bottom surface of a window support. FIG. 12C is a right side view of a window support. FIG. 12D is a bottom view of a window support. FIG. 13 shows a front side of a cover shown in FIG. 9. FIG. 14A is a cross-sectional view cut along B3-B3 shown in FIG. 13. FIG. 14B is a cross-sectional view cut along A3-A3 shown in FIG. 13. FIG. 14C is a cross-sectional view cut along C3-C3 shown in FIG. 13. FIG. 14D is a cross-sectional view cut along D3-D3 shown in FIG. 13. FIG. 15 is a right side view of a cover. FIG. 16A is a cross-sectional view cut along F1-F1 shown in FIG. 15. FIG. 16B is a cross-sectional view cut along F2-F2 shown in FIG. 15. FIG. 17 shows the case where a window support is removed from an assembly shown in FIG. 9. FIG. 18 shows the case where a display is removed from the assembly shown in FIG. 17. FIG. 19 is a plan view of a display PCB. FIG. 20 is a perspective view showing the bottom surface of a display PCB. FIG. 21 is an exploded perspective view of a cover and a volume button. FIG. 22 shows a plane view (a) and a perspective view (b) of a cover housing. FIG. 23 is a rear view of a cover housing. Hereinafter, description will be provided with reference to FIGS. 12A to 23.

Referring to FIGS. 8 and 17 to 20, a display PCB 14 is provided on an upper surface of the partition 152 to support the display 13 from the bottom. The display PCB 14 includes a circuit electrically connected to the display 13, and the display is connected to the circuit via a connector 132. On the upper surface of the display PCB 14, four contact switches 181a, 181b, 181c, and 181d may be disposed in the forward, rearward, leftward, and rightward direction from the display 13.

The display PCB 14 may be in the shape of a cross extending from the center thereof in the frontward, rearward, leftward, and rightward direction. More specifically, a substrate 140 in which a circuit of the display PCB 14 is configured may include a first substrate arm 145, a second substrate arm 146, a third substrate arm 147, and a fourth substrate arm 148 extending in the rearwards, frontwards, leftwards, and rightward directions, respectively from the center thereof. The substrate 140 may be approximately in the shape of a cross, but such a shape is not necessarily symmetric.

Referring to FIGS. 17 and 18, on the upper surface of the partition 152 of the cover housing 15, there may be formed a rib 152a protruding from a position in contact with the circumference of the display PCB 14. The rib 152a is not necessarily in a shape corresponding to the whole circumference of the display PCB 14, and the rib 152a may be in contact with part of the circumference of the display PCB 14, and, as in the embodiment, the rib 152a may be formed at a plurality of points along the circumference of the display PCB 14. In particular, the rib 152a may be formed at positions in contact with lateral sides (that is, a side extending outward from the center of the substrate 140) of the substrate arms 145, 146, 147, and 148.

On the substrate arms 145, 146, 147, and 148, there may be disposed the first contact switch 181a, the second contact switch 181b, the third contact switch 181c, and the fourth contact switch 181d, respectively. The contact switches 181a, 181b, 181c, and 181d are electrically connected to a circuit formed in the substrate 140.

On the display PCB 14, there may be disposed a Near Field Communication (NFC) module 50d (see FIG. 7). The NFC module 50d enables NFC communications and may be disposed in an NFC mount unit 146a formed in the second substrate arm 146. Near Field Communication (NFC) is one of wireless tag (RFID) technologies, and a non-contact communication technology using 13.56 MHz frequency band. Due to a short communication distance, NFC is relatively excellent in encryption and inexpensive and thus NFC is regarded as a next-generation short-range communication technology. Since data reading and reading functions are all possible in NFC, a dongle (reader) necessary to use RFID is not required. NFC is similar to an existing short-range communication technology, such as Bluetooth, but it is advantageous in that establishing connection between devices is not required.

The display 13 is a device that displays an image by receiving an electric signal. The display 13 is connected to a circuit of the display PCB 14, and displays an image in accordance with a control signal input through the circuit. The display 13 may include a display panel 131, and a connector 132 connecting the display panel 131 to the display PCB 14 (see FIG. 8). The display panel 131 may be attached to the upper surface of the display PCB 14 by an adhesive member (e.g., a double-side tape 171 (see FIG. 17)).

The display PCB 14 is circuit-connected to a main PCB 48, which will be described later, via a predetermined cable (not shown). Thus, a controller for controlling the display 13 is able to be mounted any one of the display PCB 14 and the main PCB 48. Hereinafter, the display 13 will be described as being controlled by a controller 82 (see FIG. 7) mounted in the main PCB 48. On the side of the main body 40, a groove 429 for accommodating the cable may be elongated in the upward-downward direction.

On the screen of the display panel 131, diverse information may be displayed. The controller 240 may control not just driving of the display panel 131 by a program stored in the memory 250, but also overall operation of electronic components of the voice recognition apparatus 1. A User Interface (UI) may be displayed through the display panel 131, and such an interface may be implemented as the program is executed.

The interface may display play information of the speakers 43 and 44. For example, diverse information may be displayed, for example, play/stop/selected menu, a play status, music title, singer/album information, lyrics, volume, etc.

In the case where the voice recognition apparatus 1 is provided with a communication module 50, the interface may display information exchanged through the communication module 40. For example, the interface may display a menu for controlling accessories 2, 3a, and 3b which communicate with the communication module 50, or may process information processed based on information transmitted from the accessories 2, 3a, and 3b. Specifically, information on a network connection state of the communication module 50 and on temperature/humidity/brightness sensed by a sensor provided in the accessory 2 may be displayed through the interface. In addition, a menu for controlling outputting of the speakers 43 and 44 maybe displayed through the interface. For example, a menu for selecting a song or album to be output through the speakers 43 and 44, information related to the album or song (e.g., a song title, an album title, and a singer), volume of output sound may be displayed.

The menu displayed on the interface may be manipulated using a manipulation unit 181.

Meanwhile, the manipulation 181 may be provided with the contact switches 181a, 181b, 181c, and 181d. How an output signal from each of the contact switches 181a, 181b, 181c, and 181d is processed is determined by a program pre-stored in the memory 250. For example, in accordance of operation signals of the first and second contact switches 181a and 181b, menu items displayed in the left and right direction on the interface may be selected. In accordance with operation signals of the third and fourth contact switches 181c and 181d, menu items displayed in the up and down direction on the interface may be selected A user is able to communicate with a Bluetooth module 50b using an external device, such as a smart phone and a laptop, and a variety of data, such as music and images, may be stored in the memory 250 due to the communication. In particular, the controller 240 may control the speakers 43 and 44 to output music stored in the memory 250, and a variety of functions, such as selecting, playing, and stopping music, may be implemented using the contact switches 181a, 181b, 181c, and 181d.

Meanwhile, on the substrate 140 of the display PCB 14, there may be formed a through-hole 140h through which a support boss 122b formed in the window support passes. In the through hole 140h, there may be formed the first substrate arm 145.

Referring to FIG. 20, a pair of volume adjusting switches 185a and 185b may be provided in the bottom surface of the substrate 140. The volume adjusting switches 185a and 185b are for adjusting volume of the speakers 43 and 44 provided in the main body 40. Each of the volume adjusting switches 185a and 185b may be in the form of a contact switch and is connected to a circuit of the display PCB 14. The volume switches 185a and 185b may include: a first volume adjusting switch (or a volume up switch 185a) which controls, upon being pressed, the speakers 43 and 44 to volume up; and a second volume adjusting switch (or a volume down switch 185b) which controls, upon being pressed, the speakers 43 and 44 to volume down.

The volume adjusting switches 185a and 185b may be provided in the fourth substrate arm 148 of the display PCB 14, and each moving terminal (a portion being pressed for switching operation) of the volume adjusting switches 185a and 1895b may protrude toward the side wall 151 of the cover housing.

Referring to FIGS. 21 and 22, the opening 151h in which a volume button is installed may be formed in the side wall 151 of the cover housing 15. The volume button 16 may include a dome 161 and an elastic pad 162.

The elastic pad 162 may be formed as a component made of an elastic material (preferably, rubber). The elastic pad 162 is formed in a plate shape that extending along the circumferential direction of the side wall 151. The elastic pad 162 may include: a supporting portion 162a disposed inside the housing 15; a pair of switch moving protrusions 162b and 162c protruding from an inner surface of the supporting portion 162a; and a dome fixing protrusion 162d protruding from an outer surface of the supporting portion 162a to be exposed to the outside through the opening 151h. The size of the supporting portion 162a is greater than that of the opening 151h, and thus, unless bending by an external force, the supporting portion 162a may not be moved out of the cover housing 15 through the opening 151h.

The dome 161 is formed of syntactic resin and has a groove formed in one surface, and the dome fixing protrusion 162d is inserted into the groove. Preferably, the dome fixing protrusion 162d is forcibly fitted into the groove, and not easily separated from the dome 161 due to an elastic force or a restoring force of the material of the dome fixing protrusion 162d, even without using an additional adhesive means. However, aspects of the present invention are not limited thereto, and the dome 161 and the dome fixing protrusion 162 may be coupled to each other by an adhesive member, such as a double-side tape.

A separation preventing protrusion 161c may protrude from an upper surface and/or a lower surface of the dome 161. The separation preventing protrusion 161 is disposed inside the cover housing 15, and meets the circumference of the opening 151h to thereby more firmly prevent the dome 161 from being separating from the cover housing 15. In the embodiment, a pair of separation preventing protrusions 161c is formed in the upper surface and the lower surface of the dome 161, but aspects of the present invention are not limited thereto.

When the elastic pad 162 is placed at the right position in the opening 151h, a pair of switch moving protrusions 162b and 162c is disposed at positions corresponding to the first volume adjusting switch 185a and the second volume adjusting switch 185b, respectively. When a volume-up manipulation unit 161a or a volume-down manipulation unit 161b of the dome 161 is pressed, the switch moving protrusions 162b and 162c of the elastic pad 162 operates the volume up switch 185a or the volume down switch 185b, and accordingly, volume of the speakers 43 and 44 are adjusted.

Referring to FIGS. 8 to 16, an approximate circular-shaped window support 12 may be disposed above the display 13. The window support 12 is an synthetic resin injected object and proper ably formed as one component. An opening 12h is formed in the window support 12, and a screen of the display 13 is exposed through the opening 12h.

The opening 12h is formed at a position corresponding to the display panel 131 provided below the window support 12, and it is desired that the opening 12h is formed in size a little bit smaller than the display panel 131. A screen displayed on the display panel 131 may be viewed through the opening 12h.

The display panel 131 is in a rectangular shape having a left-and-right direction length loner than a front-and-rear direction length. Thus, in order to correspond to the shape of the display panel 131, the opening 12h may be in a shape having a left-and-right-direction length longer than a front-and-rear-direction length.

The window support 12 may include: a window support plate 121 having the opening 12h formed at the center thereof and the window 11 disposed in the upper surface thereof; manipulation protrusions 126a, 126b, 126c, and 126d protruding downward from the window support plate 121; and a plurality of support bosses 122a, 122b, 122c, and 122d protruding downward from the window support plate 121.

The support bosses 122a, 122b, 122c, and 122d may extend vertically downwards. Similarly to the window 11, the window support plate 121 may be also inclined at the first angle θ1 relative to the horizontal plane. In this case, the support bosses 122a, 122b, 122c, and 122d are not orthogonal to the window support plate 121, and it is desirable that the support bosses 122a, 122b, 122c, and 122d may form a complementary angle 90−θ1 of θ1 relative to the window support plate 121.

Hereinafter, the window support plate 121 is divided into a first section SE1 positioned in the rear side of the opening 12h, a second section SE2 positioned in the front side of the opening 12h, a third section SE2 positioned in the left side of the opening 12h, and a fourth section SE4 positioned in the right side of the opening 12h.

At least one of the support bosses 122a, 122b, 122c, and 122d may be formed in each of the first section SE1 and the second section SE2. In order to stably fix the window support plate 121 while preventing it from shaking, the four support bosses 122a, 122b, 122c, and 122d may be formed, and the first support boss 122a and the second support boss 122b may be in the first section SE1, while the third support boss 122c and the fourth support boss 122d may be formed in the second section SE2.

The support bosses 122a, 122b, 122c, and 122d are coupled to the cover housing 15 to support the window support plate 121, and, in this case, the window support plate 121 may be spaced apart from the display PCB 14. At least one of the support bosses 122a, 122b, 122c, and 122d may be coupled to the partition 152 by passing through quadrants formed by the substrate arms 145, 146, 147, and 148, while at least another thereof may be coupled to the partition 152 by passing through the through hole 140h formed in the substrate arm 145.

Referring to FIG. 19, the inside of the cover housing 15 is divided into four areas P1, P2, P3, and P4 by the cross-shaped four substrate arms 145, 146, 147, and 148. Hereinafter, a sequence is applied according to a general definition for a quadrant, so P1 is defined as a first quadrant, P1 as a second quadrant, P3 as a third quadrant, and P4 as a fourth quadrant.

The first support boss 122a, the third support boss 122c, and the fourth support boss 122d are coupled to the partition 152 by passing through the second quadrant P2, the third quadrant P3, and the fourth quadrant P4, respectively, while the second support boss 122b is coupled to the partition 152 by passing through the through-hole 140h formed in the first substrate arm 145.

The coupling between the support bosses 122a, 122b, 122c, and 122d and the partition 152 of the cover housing 15 may be implemented in a manner in which the support bosses 122a, 122b, 122c, and 122d are coupled directly with the partition 152. However, as shown in the embodiment, the coupling between the support bosses 122a, 122b, 122c, and 122d and the partition 152 of the cover housing 15 may be implemented in a manner in which the support bosses 122a, 122b, 122c, and 122d are coupled to insertion bosses 154a, 154b, 154c, and 154d formed in the partition 152.

In the partition 152 of the cover housing 15, there may be formed a first insertion boss 154a, a second boss 154b, a third insertion boss 154c, and a fourth insertion boss 154d at positions respectively corresponding to the first support boss 122a, the second support boss 122b, the third support boss 122c, and the fourth support boss 122d. The insertion bosses 154a, 154b, 154c, and 154d may protrude downward from the partition 152, and may extend in parallel with the support bosses 122a, 122b, 122c, and 122d, respectively.

The first support boss 122a, the second support boss 122b, the third support boss 122c, and the fourth support boss 122d are inserted into the first insertion boss 154a, the second insertion boss 154b, the third insertion boss 154c, and the fourth insertion boss 154d, respectively. At a lower end of each of the insertion bosses 154a, 154b, 154c, and 154d, there may be formed a fastening hole into which a bolt is fastened. A bolt 19 may pass through each fastening hole upward from the bottom to be fastened to support bosses 122a, 122b, 122c, and 122d.

Referring to FIGS. 17 to 19, the cover housing 15 may include one or more ribs 152a, 152b, 152c, 152d, 152e, and 152f protruding upward from the partition 152.

One or more ribs 152b, 152c, 152d, 152e, and 152f from among the ribs 152a, 152b, 152c, 152d, 152e, and 152f may be in contact with the circumference of the display panel 131. However, the display PCB 14 is disposed on the upper surface of the partition 152, so the ribs 152b, 152c, 152d, 152e, and 152f should not interfere with the display PCB 14 in order to come into contact with the circumference of the display panel 131. To this end, the present invention proposes using the cross-shaped quadrants P1, P2, P3, and P4 divided by the display PCB 14 as a channel through which the ribs 152b, 152c, 152d, 152e, and 152f passes without interfering with the display PCB 14.

The ribs 152b, 152c, 152d, 152e, and 152f may pass any one of the quadrants P1, P2, P3, and P$ divided by the substrate arms 145, 146, 147, and 148 of the display PCB 14 to thereby come into contact with an edge portion of the display panel 131. The ribs 152b, 152c, 152d, 152e, and 152f may play a role of setting the position of the display panel 131, and a function of helping the display panel 131 maintained in right position without shaking.

The display panel 131 may be in a rectangular shape, and at least one side of the display panel 131 may come into contact with the ribs 152b, 152c, 152d, 152e, and 152f.

Each pair of sides out of the four sides of the display panel 131 may come into contact with ribs. In the embodiment, horizontal sides (or sides extending in the left and right direction) of the display panel 131 are in contact with the ribs 152b, 152c, and 152d. The ribs 152b, 152c, and 152d may extend along a horizontal side of the display panel 131.

The ribs 152b, 152c, and 152d may respectively pass different areas from among the four areas P1, P2, P3, and P4 which are divided by the substrate arms 145, 146, 147, and 148. In the embodiment, the rib 152b passes the second quadrant P2, the rib 152c passes through the third quadrant P3, and the rib 152d passes the fourth quadrant P3, so the ribs 152b, 152c, and 152d are respectively in contact with a rearward side (an upper horizontal side in the drawing), a left lateral side, and a forward side (a lower horizontal side in the drawing) of the display panel 131.

In some implementations, there may be additionally formed a rib that passes through the first quadrant P1 and/or the fourth quadrant P5 to thereby come into contact with the right side of the display panel 141.

A rib (e.g., 152b) in contact with any one side of the display panel 131, and a rib (e.g., 152c) in contact with another side of the display panel 131 may respectively pass through different areas (e.g., P2 and P3) from among the areas P1, P2, P3 and P4 divided by the substrate arms 145, 146, 147, and 148.

Due to material characteristics, in response to pressure in a predetermined range, the window support plate 121 may bend about the support bosses 122a, 122b, 122c, and 122d. Such deformation of the window support plate 121 is elastic such that the window support plate 121 returns back to its original shape when the pressure is removed.

The first manipulation protrusion 126a, the second manipulation protrusion 126b, the third manipulation protrusion 126c, and the fourth manipulation protrusion 126d of the window support 12 are disposed at positions respectively corresponding to the first contact switch 181a, the second contact switch 181b, the third contact switch 181c, and the fourth contact switch 181d provided on the display PCB 14. Accordingly, when pressure is applied through the window 11 to any one of the first section SE1, the second section SE2, the third section SE3, and the fourth section SE4 of the window support 12, a manipulation protrusion (e.g., the first manipulation protrusion 126a) belonging to a section (e.g., the first section SE1) to which the pressure is applied operates a contact switch (e.g., the first contact switch 181a) positioned below the corresponding manipulation protrusion.

The window support 12 may further include a first tab 125a, a second tab 125b, a third tab 125c, and a fourth tab 125d extending downward from the window support plate 121. The tabs 125a, 125b, 125c, and 125d may protrude vertically from the bottom surface of the window support plate 121. On the upper surface of the partition 152 of the cover housing 15, there may be formed tab insertion grooves (not indicated by reference numerals) at positions respectively corresponding to the tabs 125a, 125b, 125c, and 125d.

Meanwhile, the window 11 is a circular transparent plate, and allows a screen of the display 13 to pass therethrough, and it is desirable that the window 11 is formed of acryl. A user is able to see a screen displayed on the display 13 through the window 11. Not the entire area of the window 11 is necessarily transparent. The window support 12 may not viewable in the exterior appearance of the voice recognition apparatus 1, and only a screen of the display panel 131 exposed through the opening 12h of the window support 12 may be viewable. Only a specific area 11b at a position approximately corresponding to the opening 12h is may be transparent, and other areas 11a may be colored opaquely or translucently to be hidden from the outside or may have a film or the like attached thereto (see FIG. 3).

The window 11 may be bonded to the upper surface of the window support plate 121 of the window support 12 using a double-side tape or the like. Due to characteristics of a syntactic resin material, the window may be elastically bent in response to application of pressure in a predetermined range. Such bending helps the contact switches 181a, 181b, 181c, and 181d to operate more smoothly. However, the bending of the window 11 is elastic, so the window 11 may be restored to its original shape when the pressure is removed.

Meanwhile, the opening 12h formed in the window support plate 121 has a horizontal-direction (or left-right direction) length longer than a front-and-rear-direction (or vertical-direction) length, so the third region SE 3 and the fourth section SE4 corresponding to the left and right sides of the opening 12H is not appropriate for installation of support bosses. It is because a distance from the circumference of the opening 12h to the third manipulation protrusion 126c or the fourth manipulation protrusion 126 in the third section SE3 and the fourth section SE4 is shorter than a distance from the circumference of the opening 12h to the first manipulation protrusion 126a or the second manipulation protrusion 126b in the first section SE1 and the second section SE2, and thus, if a support boss is formed in the third section SE3 or the fourth section SE4, a distance of the third manipulation protrusion 126c or the fourth manipulation protrusion 126d to the support boss is too close, and, in this case, greater pressure needs to be applied to the window support plate 121 in order to operate the corresponding manipulation protrusion For this reason, the first support boss 122a and the second support boss 122b are formed in the first section SE1, and it is desirable that the third support boss 122c and the fourth support boss 122d are formed in the second section SE2.

Meanwhile, as viewed from above, the first manipulation protrusion 126a is disposed more outer than the first support boss 122a and the second support boss 122b within the cover housing 15, and the second manipulation protrusion 126b is disposed more outer than the third support boss 122c and the fourth support boss 122d.

In each of the first section SE1 and the second section SE2, there may be formed slits 121a and 121b between the manipulation protrusions 126a and 126b and the support bosses 122a, 122b, 122c, and 122d.

Referring to FIG. 12D, the support bosses 122a, 122b, 122c, and 122d are disposed in the first section SE1 or the second section SE2, and thus closer to the first manipulation protrusion 126a or the second manipulation protrusion 126b than the third manipulation protrusion 126c or the fourth manipulation protrusion 126d. For example, when pressure is applied to the first section SE1 of the window support plate 121, the window support plate 121 may bend about the first support boss 122a and the second support boss 122b. In this case, a radius of rotation (moment arm) of the first manipulation protrusion 126a about the first support boss 122a is r11, and a radius of rotation of the first manipulation protrusion 126a about the second support boss 122b is r12.

In the embodiment, since the first manipulation protrusion 126a is closer to the second support boss 122b than the first support boss 122a, r12 is shorter than r11. In addition, a distance from the third manipulation protrusion 126c to the first support boss 122a is r31 (r31>r11>r12), and r33, which is a distance from the third manipulation protrusion 126c to the third support boss 122c is substantially identical to r31.

Manipulability of each of the manipulation protrusions 126a, 126b, 126c, and 126d is influenced by a distance to the most adjacent support bosses. If the slits 121a and 121b do not exist, and, if r31 is greater than r12 as in the above example, the third section SE3 bends more easily than the first section SE1 even when the same pressure is applied to the first section SE1 and the third section SE3. As a result, the third manipulation protrusion 126c may move downward more easily than the first manipulation protrusion 126a, and thus, the third contact switch 181c may operate more smoothly than the first contact switch 181a. For the same reason, the second contact switch 181b may not operate smoothly compared to the third contact switch 181c or the fourth contact switch 181d.

To solve this problem, a first slit 121a and a second slit 121b are respectively formed in the first section SE1 and the second section SE2 of the window support plate 121. In these sections SE1 and SE2, the slits 121a and 121b are located between the support bosses 122a, 122b, 122c, and 122d and the manipulation protrusions 126a, 126b, 126c, and 126d.

As shown in FIG. 12D, a diameter passing through the center C of the window support plate 121 and extending in the left-and-right direction is defined as a horizontal diameter D1, and a diameter passing through the center C of the window support plate 121 and extending in the front-and-rear direction is defined as a vertical diameter D2. In this case, the first support boss 122a and the second support boss 122b are disposed substantially parallel to the horizontal diameter D1 in the first section SE1, and the third support boss 122c and the fourth support boss 122d may be disposed substantially parallel to the horizontal diameter D1 in the second section SE2. In addition, each of the first slit 121a and the second slit 121b may extend substantially parallel to the horizontal diameter D1.

As the slits 121a and 121b are formed, bending of the window support plate 121 occurs at positions adjacent to both ends of the slits 121a and 121b when pressure is applied to the first section SE1 or the second section SE2. In particular, such bending often occurs in a narrow area between end portions of the slits 121a and 121b and an outer circumference of the window support late 121, so the window support plate 121 may bend more smoothly than when the slits 121a and 121b are not formed.

In addition, there is an effect that a distance from the manipulation protrusions 126a and 126b and a bending portion increases. For example, in the case of the first manipulation protrusion 126a, a distance rs to one end of the first slit 121a becomes longer than a distance r12 to the second support boss 122b. It is because a length of the moment arm of a force applied to a bending portion the first section SE1 is increased. This helps the first manipulation protrusion 126a to more smoothly move downward.

In addition, as in the embodiment, in the case where the support bosses 122a, 122b, 122c, and 122d in the first section SE1 and the second section SE2 are disposed asymmetrically, the slits 121a and 121b is formed between the support bosses 122a, 122b, 122c, and 122d and the manipulation protrusions 126a and 126b. Accordingly, bending of the window support plate 121 in the first section SE1 and the second section SE2 may be influenced more substantially by positions and shapes of the slits 121*a* and 122*b*, than by the positions of the support bosses 122*a*, 122*b*, 122*c*, and 122*d*. Therefore, in the case where the first slit 121*a* and the second slit 121*b* are asymmetrically disposed to each other, manipulability of the first contact switch 181*a* and the second contact switch 181*b* may become uniform.

Referring to FIGS. 3 to 5, the main body 30 may be supported by the base 30 disposed therebelow, and the upper part of the main body 40 may be coupled to the housing 15. The main body 40 may include speaker cases 41 and 42 which forms a cavity 49 in an inward direction, and at least one speaker 43 or 44 disposed inside the cavity 49. In the embodiment, two speakers 43 and 44 are disposed in the speaker cases 41 and 42. The speaker 43 disposed in the upper side is a tweeter which outputs high-note sound, and the speaker 44 disposed in the lower side is a woofer which outputs low-note band.

Referring to FIGS. 3 to 23, a voice input PCB 17 and 18 is installed in the cover 10. A user's voice is input to the voice input PCB 17 and 18. The voice input PCB 17 and 18 are connected to a voice recognition PCB 40*a* disposed in the main body 40. The voice input PCB 17 and 18 may be connected to the voice recognition PCB 40*a* via harness cables 17*b* and 18*b*. The voice input PCB 17 and 18 may convert a user's voice into a soundwave signal recognizable by the voice recognition PCB 40*a*, and the voice recognition PCB 40*a* may recognize the user's voice by analyzing the soundwave signal received from the voice input PCB 17 and 18.

The voice input PCBs 17 and 18 are installed in the window support 12. A plurality of voice input PCBs may be provided, and the plurality of voice input PCBs may be arranged symmetrically to the opening 12*h* formed in the window support 12. In this embodiment, two voice input PCBs 17 and 18 is provided, including a first voice input PCB 17 and a second voice input PCB 18

The first voice input PCB 17 and 18 includes a first voice input PCB 17 located in front of the opening 17*h* formed in the window support 12, and a second voice input PCB 18 formed at rear of the opening 12*h*. The first voice input PCB is disposed in the second section SE2 of the window support plate 121, and the second voice input PCB 18 is disposed in the first section SE1 of the window support plate 121.

The first voice input PCB 17 is relatively lopsided toward the right side with reference the center of the window support plate 121, and the second voice input PCB 18 is relatively lopsided toward the left side with reference the center of the window support plate 121.

On the upper surface of the window support 12 which opposes the window 11, there is formed a PCB accommodation space 12*a* and 12*b* in which the voice inputs PCB 17 and 18 are accommodated. When accommodated in the PCB accommodation space 12*a* and 12*b*, the voice input PCB 17 and 18 do not protrude outward from the PCB accommodation space 12*a* and 12*b*. That is, the PCB accommodation space 12*a* and 12*b* is formed on the upper surface 12 of the window support as being recessed at a depth corresponding to the vertical depth of the voice input PCB 17 and 18. When the voice input PCB 17 and 18 is accommodated in the PCB accommodation space 12*a* and 12*b*, the upper surface of the voice input PCB 17 and 18 coincide with the upper surface of the window support 12.

The PCB accommodation space 12*a* and 12*b* includes a first PCB accommodation space 12*a* in which the first voice input PCB 17 is accommodated, and a second PCB accommodation space 12*b* in which the second voice input PCB 18 is accommodated. The first PCB accommodation space 12*a* is disposed in front of the opening 12*h* formed in the window support 12, and the second PCB accommodation space 12*b* is disposed at rear of the opening 12*h*. The first PCB accommodation space 12*a* is formed in the second section SE2 of the window support plate 121, and the second PCB accommodation space 12*b* is formed in the first section SE1 of the window support plate 121.

The first PCB accommodation space 12*a* is relatively lopsided toward the right side with reference to the center of the window support plate 121, and the second PCB accommodation space 12*b* is relatively lopsided toward the left side with reference to the center of the window support plate 121.

The window support 12 further includes a position protrusion 12*c* and 12*d* protruding from the bottom of the PCB accommodation space 12*a* and 12*b*. In the voice input PCB 17 and 18, there is formed a position hole 17*a* and 18*a* into which the position protrusion 12*c* and 12*d* is inserted. One position protrusion 12*c* and 12*d* is formed at an edge of a rectangular-shaped PCB accommodation space 12*a* and 12*b*, and one position protrusion 12*c* and 12*d* is formed at an edge of a rectangular-shaped voice input PCB 17 and 18. To make the voice input PCB 17 and 18 accommodated in the PCB accommodation space 12*a* and 12*b*, an operator may fit the position protrusion 12*c* and 12*d* into the position hole 17*a* and 18*a* so that the voice input PCB 17 and 18 is accommodated at right position in the PCB accommodation space 12*a* and 12*b*.

The position protrusion 12*c* and 12*d* includes a first position protrusion 12*c* protruding upward from the bottom of the first PCB accommodation space 12*a*, and a second position protrusion 12*d* protruding upward from the bottom of the second PCB accommodation space 12*b*. In addition, the position hole 17*a* and 18*a* includes: a first position hole 17*a* which is formed in the first voice input PCB 17 and into which the first position protrusion 12*c* is inserted; and a second position hole 18*a* which is formed in the second voice input PCB 18 and into which the second position protrusion 12*d* is inserted.

On the bottom of the PCB accommodation space 12*a* and 12*b*, there is formed an opening 12*e* and 12*f*. The opening 12*e* and 12*f* acts as a hole through which the harness cable 17*b* and 18*b* passes when the voice input PCB 17 and 18 is connected to the voice recognition PCB 40*a*. The opening 12*e* and 12*f* includes a first opening 12*d* formed in the bottom of the first PCB accommodation space 12*a*, and a second opening 12*f* formed in the bottom of the second PCB accommodation space 12*b*.

The opening 12*e* and 12*f* forms at least part of the slits 121*a* and 121*b* formed in each of the first section SE1 and the second section SE2. The first PCB accommodation space 12*a* is relatively lopsided toward the right side in the second slit 121*b* formed in the second section SE2, so formed between the third support boss 122*c* and the fourth support boss 122*d* in the second section SE2 to be disposed right nest to the fourth support boss 122*d*. In addition, the second PCB accommodation space 12*b* is relatively lopsided toward the left side in the first slit 121*a* formed in the first section SE1, so formed between the first support boss 122*a* and the second support boss 122*b* in the first section SE1 to be disposed right next to the first support boss 122*a*. Thus, when a user presses the window 1, the contact switches 181*a*, 181*b*, 181*c*, and 181*d* may become easily operated as the window support plate 121 is elastically deformed.

The opening 12*e* and 12*f* is formed to have a width in front-and-rear direction, compared to the slit 121*a* and 121*b*.

Since the voice input PCB 17 and 18 is connected to the voice recognition PCB 40a via the harness cable 17b and 18b, a connector 17c and 18c to be connected to the voice recognition PCB 40a is connected to the lower end of the harness cable 17b and 18b. The connector 17c and 18c needs to come out from the bottom of the window support 12 through the opening 12e and 12f, so it is desirable that the connector 17c and 18c is formed to have a front-and-rear direction width wider than that of the slit 121a and 121b.

The harness cable 17b and 17b includes a first harness cable 17b connecting the first voice input PCB 17 and the voice recognition PCB 40a, and a second harness cable 18b connecting the second voice input PCB 18 and the voice recognition PCB 40a. In addition, the connector 17c and 18c includes a first connector 17c coupled to the lower end of the first harness cable 17b to be thereby connected to the voice recognition PCB 40a, and a second connector 18c coupled to the lower end of the second harness cable 18b to be thereby connected to the voice recognition PCB 40a.

In the window 11, there is formed a voice passage hole 11c and 11d through which a user's voice passes from the upper side of the window 11 to the lower side of the window 11. The voice passage hole 11c and 11d includes a first voice passage hole 11c formed in a front area with reference to the center of the window, and a second voice passage hole 11d formed in a rear area with reference to the center of the window 11. The first voice passage hole 11c guides voice to the first voice input PCB 17, and the second voice passage hole 11d guides voice to the second voice input PCB 18.

The center portion of the window 11 is formed as a transparent area 11b, and the rest area other than the transparent area 11b is formed as an opaque area 11a. The transparent area is formed in size and shape corresponding to the opening 12h formed in the window support 12, and allows a screen output by the display panel 131 to pass therethrough.

The first voice passage hole 11c is formed in an opaque area 11a in front of the transparent area 11b of the window 11, and the second voice passage hole 11d is formed in an opaque area 11a at rear of the transparent area 11b of the window 11.

In order to allow a user's voice to be easily input to the voice input PCB 17 and 18, it is desirable that the voice passage hole 11c and 11d is formed at a position corresponding to the voice input PCB 17 and 18. In the voice input PCB 17 and 18, a voice input hole 17d and 18d through which a voice passing through the voice passage hole 11c and 11d is formed at a position corresponding to the voice passage hole 11c and 11d. In the voice input PCB 17 and 18, it is desirable that a microphone (not shown) is formed at the bottom surface in which the voice input hole 17d and 18d is formed. The microphone amplifies a voice input through the voice input hole 18d and 18d to input the voice to a soundwave conversion circuit of the voice input PCB 17 and 18. That is, a user's voice passing through the voice passage hole 11c and 11d from the outside of the window 11 is input to the voice input hole 17d and 18d formed in the voice input PCB 17 and 18, amplified by the microphone, input to the soundwave conversation circuit of the voice input PCB 17 and 18, and converted into a soundwave signal readable by the voice recognition PCB 40a.

Between the window 11 and the window support 12, a gasket 17e and 18e is installed. The gasket 17e and 18e prevents a voice, having passed through the voice passage hole 11c and 11d, from leaking via a gap between the window 11 and the window support 12, without flowing into the voice input hole 17d and 18d of the voice input PCB 17 and 18.

The gasket 17e and 18e includes: a first gasket 17e having an upper surface brought closely in contact with the bottom surface of the window 11 and a bottom surface brought closely into contact with the upper surface of the first voice input PCB 17; and a second gasket 18e having an upper surface brought closely into contact with the bottom surface of the window 11 and a bottom surface brought closely into contact with the upper surface of the second voice input PCB 18. A communication hole 17f and 18f includes: a first communication hole 17f formed in the first gasket 17e to allow the first voice passage hole 11c and the first voice input hole 17d to communicate with each other; and a second communication hole 18f formed in the second gasket 18e to allow the second voice passage hole 11d and the second voice input hole 18d to communicate with each other.

The gasket 17e and 18e may be formed in shape and size corresponding to the voice input PCB 17 and 18. The gasket 17e and 18e may be a double-side tape bonded to the upper surface of the voice input PCB 17 and 18. In this embodiment, the window 11 and the window support 12 are coupled to each other using a double-side tape. Thus, when the window 11 and the window support 12 is coupled to each other using a double-side tape, the gasket 17e and 18e is desirably formed as a double-side tape in order to allow the voice input PCB 17 and 18 to be easily coupled to the bottom surface of the window 11.

The communication hole 17f and 18f is formed in size larger than that of the voice input hole 17d and 18d formed in the voice input PCB 17 and 18. If the communication hole 17f and 18f is formed in size smaller than that of the voice input hole 17d and 8d, voice having passed through the voice passage hole 11c and 11d is not able to easily go inside the voice input hole 17d and 18d and thus voice recognition may not be performed precisely. In addition, in the case where the communication hole 17f and 18f is formed in size smaller than that of the voice input hole 17d and 18d or in size equal to that of the voice input hole 17d and 18d, when voice having passed through the voice passage hole 11c and 11d passes through the communication hole 17f and 18f, the gasket 17e and 18e slightly shapes due to vibration of the voice to thereby reduce adherence of the gasket 17e and 18e, and thus, the voice may leak through a gap between the window 11 and the gasket 17e and 18e and a gap between the gasket 17e and 18e and the voice input PCB 17 and 18. Thus, for precise voice recognition, it is desirable that the communication hole 17f and 18f is formed in size larger than that of the voice input hole 17d and 18d formed in the voice input PCB 17 and 18.

In this embodiment, the voice input hole 17d and 18d is formed in size equal to that of the voice passage hole 11c and 11d formed in the window 11. Thus, the communication hole 17f and 18f is formed in size larger than that of the voice passage hole 11c and 11d formed in the window 11. In the case the communication hole 17f and 18f is formed in size equal to or smaller than that of the voice passage hole 11c and 11d, when a voice having passed the voice passage hole 11c and 11d passes through the communication hole 17f and 18f, the gasket 17e and 18e slightly shakes due to vibration of the voice to thereby reduce adherence of the gasket 18e and 18e, and thus, the voice may leak through a gap between the window 11 and the gasket 17e and 18e and a gap between the gasket 17e and 18e and the voice input PCB 17 and 18. Thus, for precise voice recognition, it is desirable that the communication hole 17f and 18f is formed in size larger than that of the voice passage hole 11c and 11d.

Meanwhile, the voice passage hole 11c and 11d is formed at a position corresponding to the voice input PCB 17 and 18. That is, since the first voice input PCB 17 is relatively lopsided to the right side with reference to the center of the window support plate 121, and the second voice input PCB 18 is relatively lopsided to the left side with reference to the center of the window support plate 121, one first voice passage hole 11c is formed as being relatively lopsided to the right side with reference to the center of the window 11 in a front area of the center of the window 11, and one second voice passage hole 11d is formed as being relatively lopsided to the left side of the center of the window 11 in a rear area of the center of the window 11. Thus, positions of the voice passage holes 11c and 11d are vertically and horizontally symmetric with reference to the center of the window 11, so it may hinder exterior design of the voice recognition apparatus 1.

However, in the window 11 of this embodiment, two first deco holes lie are formed next to the first voice passage hole 11c in the left-and-right direction in front of the center of the window 11, and two second deco holes 11f is formed next to the second voice passage hole 11d in the left-and-right direction at rear of the center of the window 11.

The two first deco holes lie is formed on the left side of the first voice passage hole 11c in the opaque area 11a located in front of the transparent area 11b of the window 11, and the two second deco hole 11f is formed on the right side of the second voice passage hole 11d in the opaque area 11a located at rear of the transparent area 11b of the window 1.

The overall alignment of the first voice passage hole 11c and the two first deco holes lie in the opaque area 11a located in front of the transparent area 11b of the window is positioned at the center in the left-and-right direction in the front area of the center of the window 11. The overall alignment of the second voice passage hole 11d and the two second deco holes 11f in the rear area of the center of the window 11 is positioned at the center in the left-and-right direction of the center of the window 11. Accordingly, the window 11 is vertically and horizontally symmetrical to the center thereof, thereby improving the exterior design of the voice recognition apparatus 1.

Meanwhile, since the voice input PCB 17 and 18 needs to be connected to the harness cable 17b and 18b, a harness cable through-hole 152g and 152h penetrated by the harness cable 17b and 18b is formed in the partition 152 of the cover housing 15. It is desirable that the harness cable through-hole 152g and 152h is formed at a position corresponding to a wide-width portion of the slit 121a and 121b formed in the PCB accommodation space 12a and 12b so that the harness cable through-hole 152g and 152h is disposed below the PCB accommodation space 12a and 12b.

The upper end of the harness cable 17b and 18b is connected to the voice input PCB 17 and 18. The lower end of the harness cable 17b and 18b comes out of the bottom of the window support 12 through a wide-width portion of the slit 121a and 121b formed in the PCB, comes out of the bottom of the partition 152 through the harness cable hole 152g and 152h formed in the partition 152, and is then coupled to the voice recognition PC 40a installed on the upper surface of the main body 40.

The harness cable through-hole 152g and 152h includes: a first harness cable through-hole 152g penetrated by the first harness cable 17b which is connected to the first voice input PCB 17; and a second harness cable through-hole 125h penetrated by the second harness cable 18b which is connected to the second voice input PCB 18.

Figure 24:
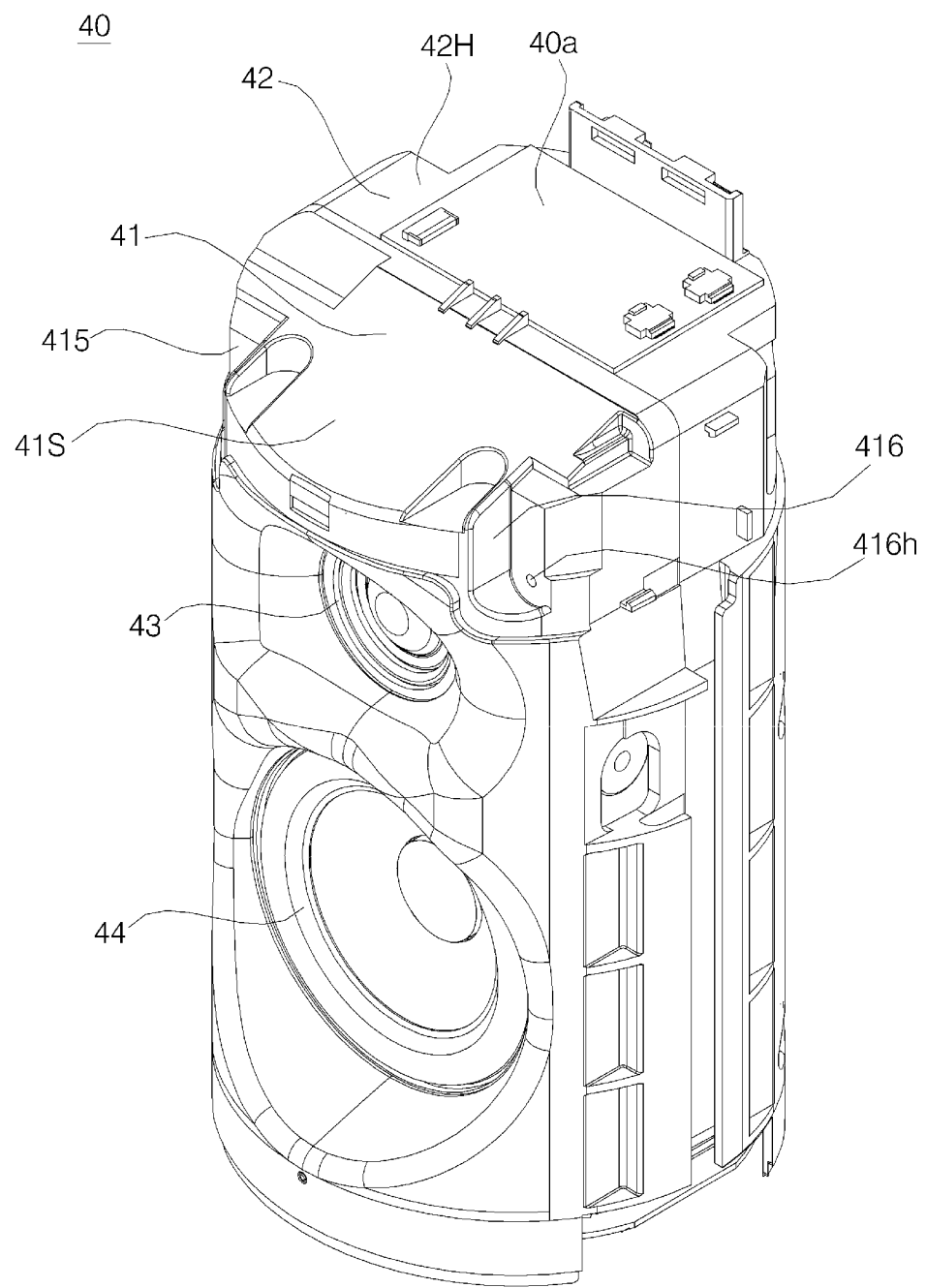
FIG. 24 is a perspective view showing an upper surface of a main body.
Figure 25:
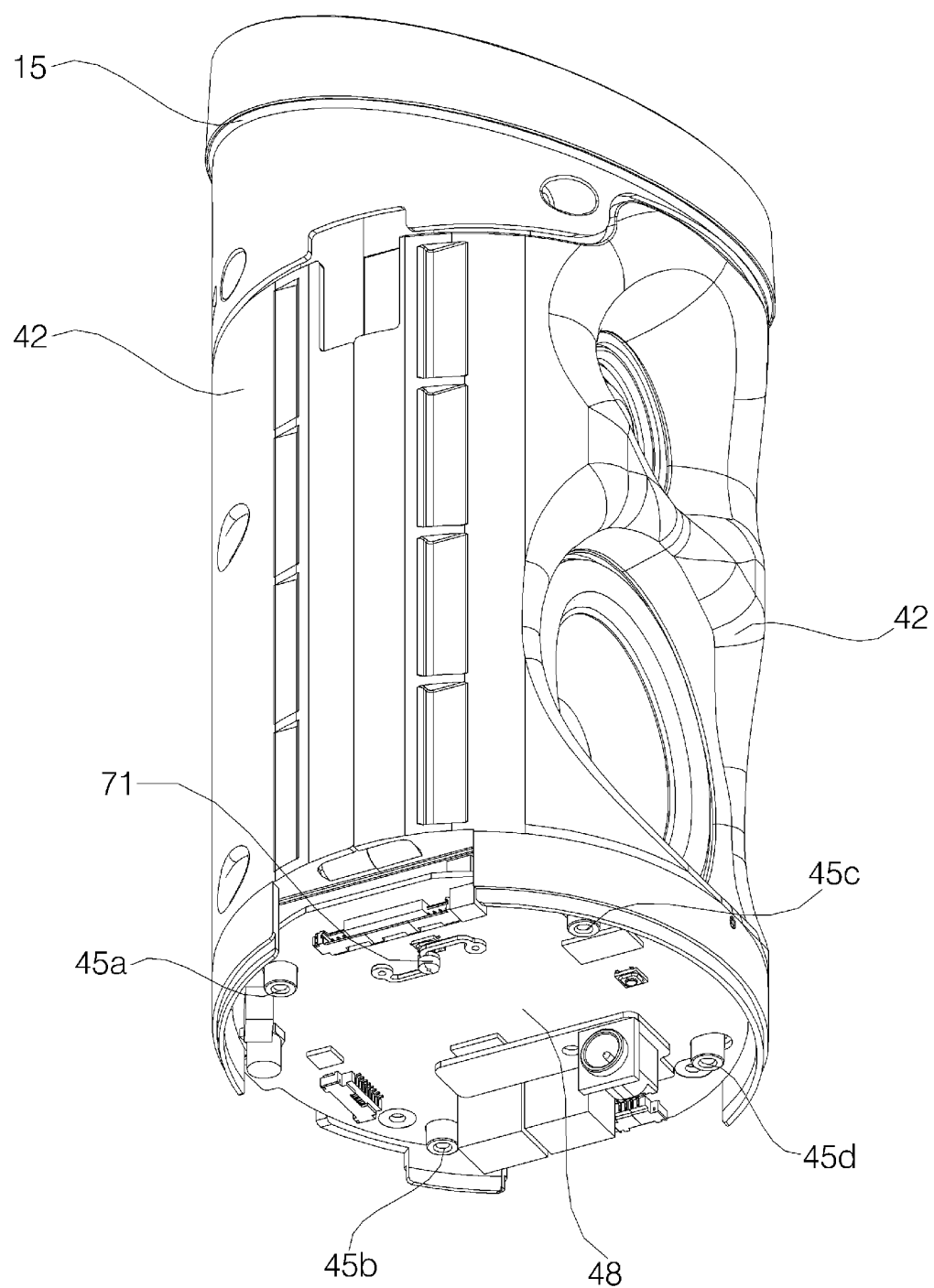
FIG. 25 shows a perspective view showing a bottom surface of the main body.
Figure 26:
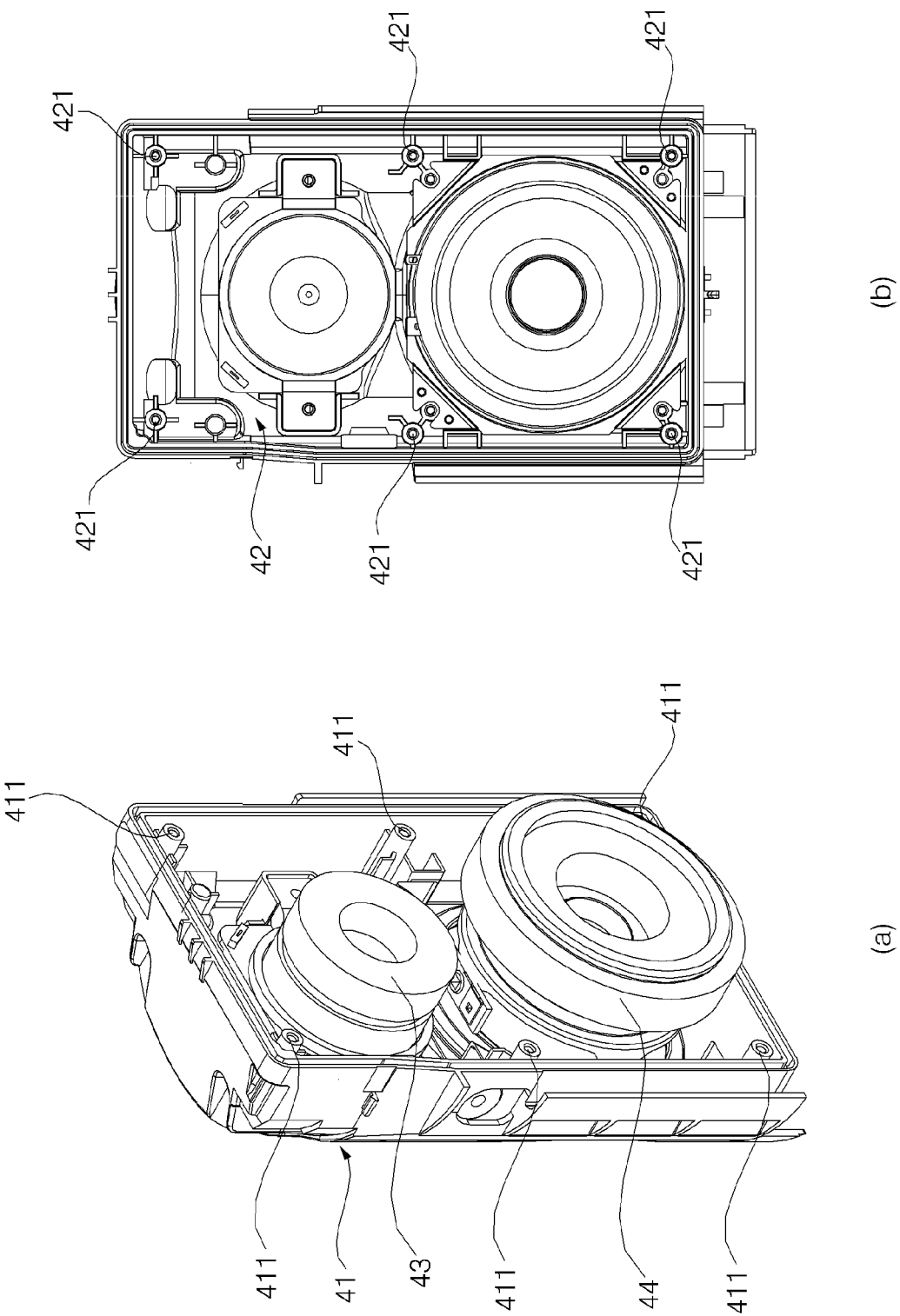
FIG. 26 shows a front-side case (a) and a front-side case (b)
Figure 27:
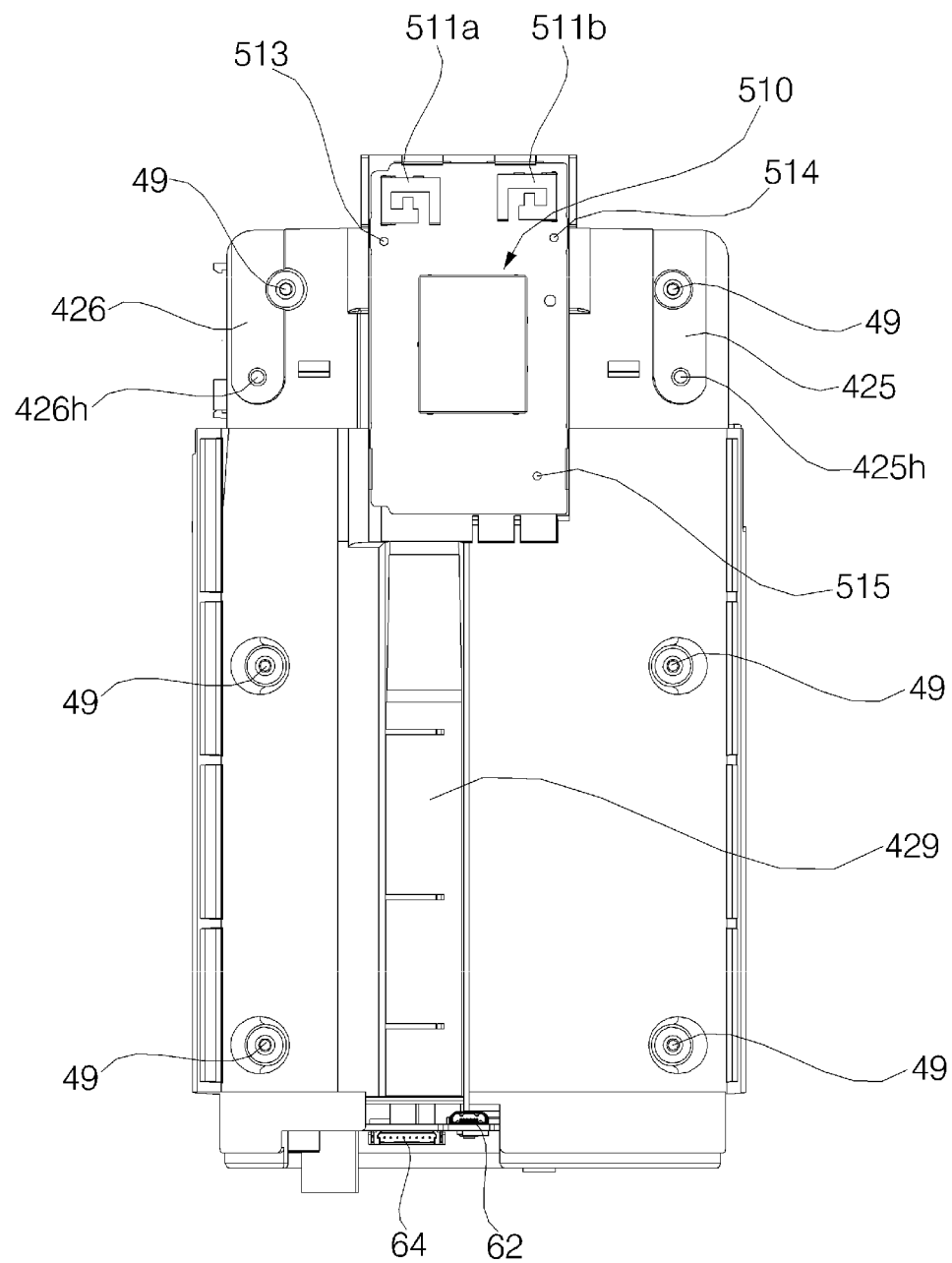
FIG. 27 shows a rear surface of a main body.
Figure 28:
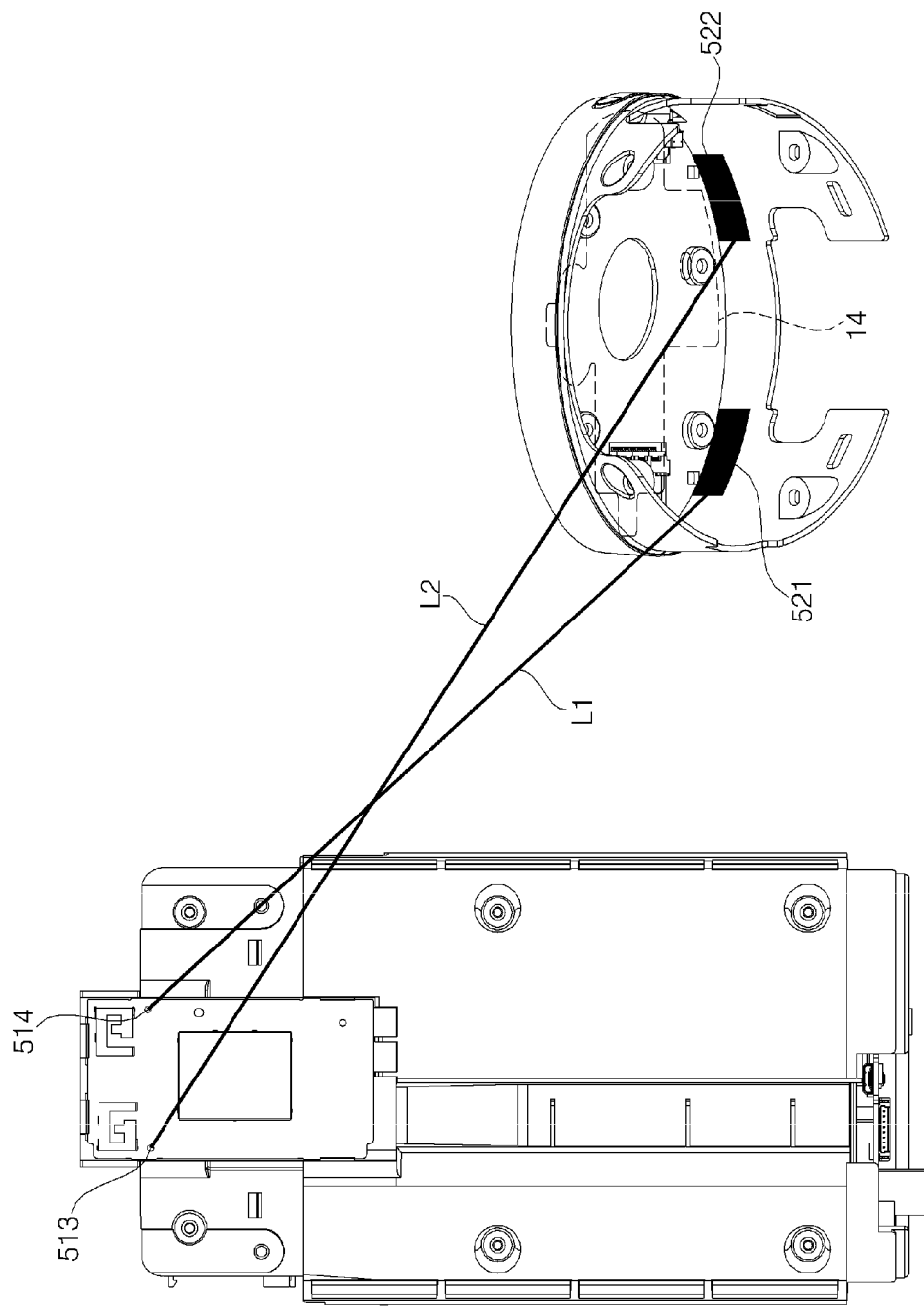
FIG. 28 is a diagram showing positions of antennas connected to a Wi-Fi module.
Figure 29:
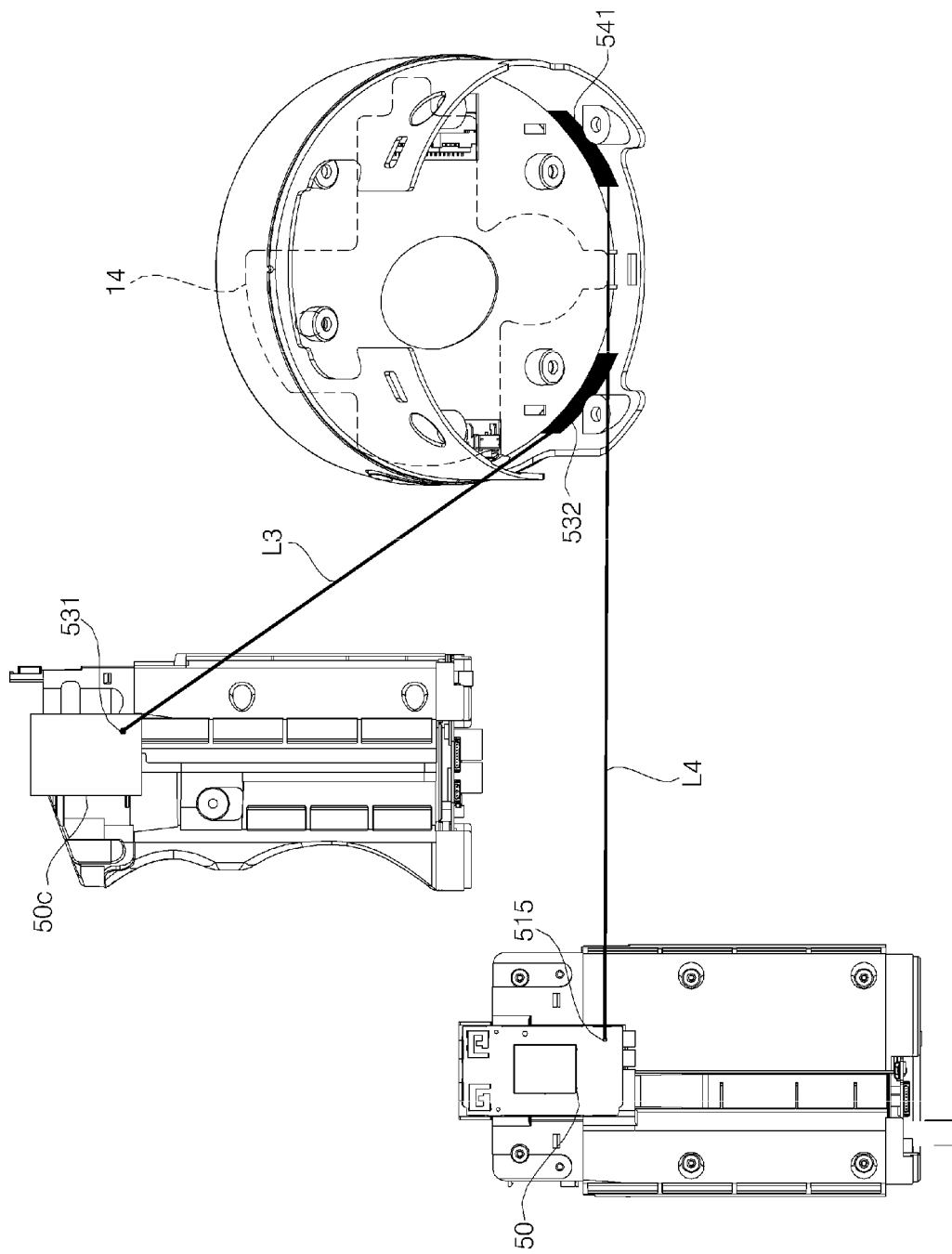
FIG. 29 is a diagram showing a position of an antenna connected to a Bluetooth module and a position of antenna connected to a Zigbee module.
Figure 30:
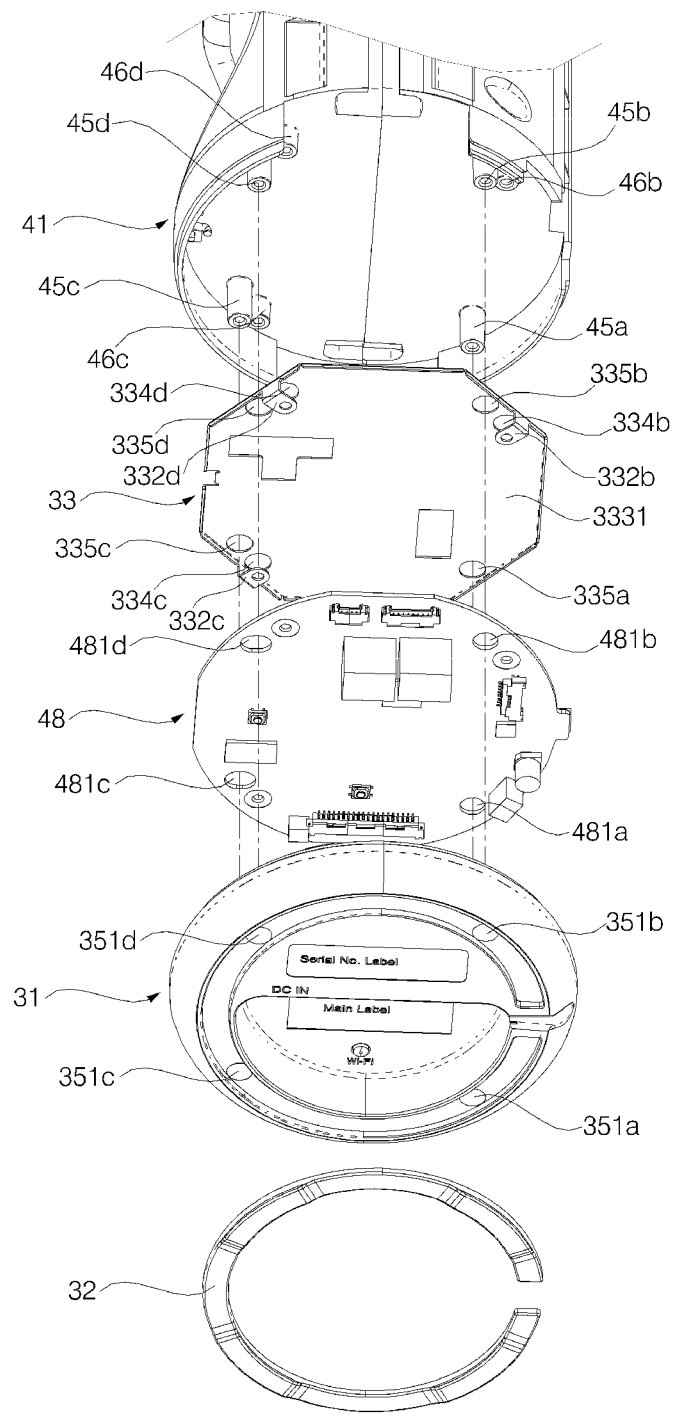
FIG. 30 is an exploded perspective view of a main body, a heatsink, a main PCB, a base body, and a support rubber.

FIG. 24 is a perspective view showing an upper surface of a main body. FIG. 25 shows a perspective view showing a bottom surface of the main body. FIG. 26 shows a front-side case (a) and a front-side case (b). FIG. 27 shows a rear surface of a main body. FIG. 28 is a diagram showing positions of antennas connected to a Wi-Fi module. FIG. 29 is a diagram showing a position of an antenna connected to a Bluetooth module and a position of antenna connected to a Zigbee module. FIG. 30 is an exploded perspective view of a main body, a heatsink, a main PCB, a base body, and a support rubber.

Referring to FIGS. 24 to 27, the voice recognition PCB 40a is disposed on the upper surface of the main body 40. The voice recognition PCB 40a analyzes a soundwave signal, received from the voice input PCB 17 and 18, to recognize a user's voice. The voice recognition PCB 40a is circuit-connected to the main PCB 48. The voice recognized by the voice recognition PCB 40a is input to a controller 240 of the main PCB 48. If a preset voice is include in the recognized voice received from the voice recognition PCB 40a, the controller 240 may communicate with a device corresponding to the preset voice from among nearby devices 2, 3a, 3b, and 5 via the communication module 50 so as to control a device corresponding to the preset voice in accordance of the recognized voice.

For example, if a user says "How is weather?" while operating one of the contact switches 181a, 181b, 181c, and 181d by pressing the window, the user's voice is input to the voice input PCB 17 and 18. The voice input PCB 17 and converts the user's voice into a soundwave signal recognizable by the voice recognition PCB 40a, and the soundwave signal is input to the voice recognition PCB 40a through the harness cable 152g and 152h. The voice recognition PCB 40a analyzes the soundwave signal, received from the voice input PCB 17 and 18, and recognize the user's voice as "How is weather?". The voice "How is weather" recognized by the voice recognition PCB 40a is signaled and input to the controller 240 of the main PCB 48. If a preset voice "Weather" is included in the voice "How is weather" recognized by the voice recognition PCB 40a, the controller 240 may receive weather information from the device capable of receiving weather information by controlling a device capable of receiving weather information through communication with the communication module 50 from among the nearby devices 2, 3a, 3b, and 5 and a device capable of receiving weather information. Accordingly, the controller 240 may display the weather information on the display 13 and output the weather information in an audio form through the speakers 43 and 44.

In the upper surface of the main body 40, a front part is formed as a slope 41S having a front portion at a low height and a rear portion at a high height, and a rear part extending rearward from the front part may be formed as a horizontal surface 42H. The slope 41S is disposed parallel to the window 11, the window support 12, and the partition 152. That is, the upper surface of the speaker case 41 and 42 defining the exterior appearance of the main body 40 may have a front part, which is formed as the slope 41S having a front portion at a low height and a rear portion at a high height, and a rear part which is formed as the horizontal surface 42H extending rearward from the slope 41S. The voice recognition PCB 40a may be installed at the rear part of the upper surface of the main body 40, the rear part which is formed as a horizontal surface.

The window 11, the window support 12, and the partition 152 is inclined with a low front height and a high rear height, Thus, when the cover is coupled to the top of the main body 40, a space S for installation of the voice recognition PCB 40*a* may be provided between the rear part, which is the horizontal surface 42H, of the upper surface of the main body 40 and the partition 152 (see FIG. 5). Thus, it is desirable that the voice recognition PCB 40*a* is installed at the rear part which is formed as the horizontal surface 42H in the upper surface of the main body 40.

The speaker case 41 and 2 may include: a front case 41 defining the front part of the main body 40; and a rear case coupled to the rear of the front case 41 to thereby define the rear experience of the main body 40. Between the rear case 42 and the front case 41, there is formed a cavity 49. The upper surface of the front case 41 is formed as a slope 41S having a low front height and a high rear height, and the upper surface of the rear case 42 is formed as a horizontal surface 42H. Thus, when the cover 10 is coupled to the top of the main body 40, a space S for installation of the voice recognition PCB 40*a* is provided between the partition 152 and the rear case 42. Thus, it is desirable that the voice recognition PCB 40*a* is installed at the upper surface of the rear case 42. The voice recognition PCB 40*a* may be mounted to the upper surface of the rear case 42 using an adhesive member such as a double-side tape.

In the front case 41, there may be formed a pair of sound output hole which is formed to face the front and which vertically exposes diaphragms (membranes) of the tweeter 43 and the woofer 44.

Case position protrusions 311 protruding rearward may be formed at multiple points in an inner surface of the front case 41. In the embodiment, the case position protrusions 411 are formed at two points on the let and right sides at a constant height, and the case position protrusions 411 are formed such that each pair of case position protrusions 411 is formed at three height points in the same manner described above. However, aspects of the present invention are not limited thereto.

Insertion bosses 421 are formed in the rear case 42 at positions corresponding to the case position protrusions formed in the front case 41. Bolts passes through the respective insertion bosses 421 from the rear of the rear case 42 to be fastened to the case position protrusions 411.

A pair of fastening bosses 153*c* and 153*d* may be recessed rearward in the front surface of the upper end holder 153 (see FIGS. 14 to 16). A pair of fastening bosses 153*a* and 153*b* are recessed rearward on the left and right sides of the rear surface of the upper end holder 153.

To correspond to the fastening bosses 153*a*, 153*b*, 153*c*, and 153*d* formed in the cover housing 15, there may be formed first and second boss insertion groove 415 and 415 in the front case 41 of the main body 40, and third and fourth boss insertion grooves 425 and 426 in the rear case 42 of the main body 40.

Referring to FIG. 24, the first and second boss insertion grooves 415 and 416 are respectively recessed rearward from the front surface (a surface facing the front of the voice recognition apparatus 1) of the front case 41, while the upper portions of the first and second boss insertion grooves 415 and 416 are open so that the fastening bosses 153*c* and 153*d* are inserted from above into the first and second boss insertion grooves 415 and 416.

Referring to FIG. 27, the third and fourth boss insertion grooves 425 and 427 are respectively recessed forward from the rear surface (a surface facing the rear of the voice recognition apparatus 1) of the rear case 42, while the upper portions of the third and fourth boss insertion grooves 425 and 427 are open so that the fastening bosses 153*a* and 153*b* are inserted from above into the third and fourth boss insertion grooves 425 and 427.

A fastening hole through which a bolt passes may be formed at each of the boss insertion grooves 415, 416, 425, and 426. Only a fastening hole 416*h* formed in the second boss insertion groove 416 is illustrated in the drawings, but When inserted into the boss insertion grooves 415, 416, 425, and 426, respectively, the fastening bosses 153*a*, 153*b*, 153*c*, and 153*d* may reach positions corresponding to the fastening holes 415*h*, 416*h*, 425*h*, and 426*h* and bolts may pass through the respective fastening holes 415*h*, 416*h*, 425*h*, and 426*h* to be fastened to the fastening bosses 153*a*, 153*b*, 153*c*, and 153*d*.

Referring to FIGS. 27 to 27, at least one communication module 50 may be disposed in the main body 40. The communication module 50 may be connected to a circuit of the main PCB 48 and/or the display PCB 14 and thereby controlled by the controller 240. In the embodiment, a Wi-Fi module 50*a*, a Bluetooth module 50*b*, a Zigbee module 50*c* are provided as the communication module 50. However, aspects of the present invention are not limited thereto, and a Z-wave module may be provide.

A module assembly 510 is a set of the Wi-Fi module 50*a* and the Bluetooth module 50*b*, and may be disposed at the rear side of the main body 40. The module assembly 510 may be disposed in the rear case 42.

The module assembly 510 may be coupled to or separated from the rear case 42 as one body. However, aspects of the present invention are not limited thereto, and the Wi-Fi module 50*a* and the Bluetooth module 50*b* may be provided separately and individually coupled to or separated from the main body 40.

The module assembly 510 may include a pair of antennas 511*a* and 511*b* which transmits and receives a signal. The pair of antenna 511*a* and 511*b* is basically provided in the module assembly 510, but aspects of the present invention are not limited thereto and at least one antenna 521 and 522 may be further provided at a position spaced apart from the module assembly 510 (see FIGS. 27 to 29).

In the module assembly 510, there may be provided a first antenna connection terminal 513 and a second antenna connection terminal 514 of the Wi-Fi module 50*a*, and a antenna connection terminal 515 of the Bluetooth module 50*b*. In addition, a first antenna 521 and a second antenna 522 may be provided in the left and right sides of the rear part in the inner surface of the side wall 151 of the cover housing 15. The first antenna 521 may be connected to the first antenna connection terminal 513 via a wire L1, and the second antenna 522 may be connected to the second antenna connection terminal 514 via a wire L2.

Each of the first antenna 521 and the second antenna 522 is a conductor of a specific pattern coupled to a thin film. The wires L1 and L2 are connected to the conductor.

The side wall 151 of the cover housing 15 is positioned in the upper side of the grill 20, and thus not surrounded by the grill 20. Thus, as the first antenna 521 and the second antenna 522 are positioned on the side wall 151, signal interference from the metallic grill 20 is reduced, thereby enabling precise transmission and reception of a signal.

In addition, the side wall 151 may be formed such that the height of the upper end thereof becomes distal from the partition 152 in a front-to-rear direction. In this case, the rear part of the side wall 151 may form a greater gap with the display PCB 14 mounted to the partition 152, compared to the front part of the side wall 151. Thus, as the first antenna 521 and the second antenna 522 are positioned in the rear part of the side wall 151, it is possible to place the antennas 521 and 522 more distal from the display PCB 14 and to reduce signal interference caused by a magnetic field generated by a current flowing in a circuit of the display PCB 14.

Meanwhile, the Zigbee module 50c may be provided at any one of the left side and the right side of the main body 40. In the inner surface of the front part of the side wall 151 of the cover housing 15, there may be provided a third antenna 532 connected to an antenna connection terminal 531 of the Zigbee module 50c via a wire L3, and a fourth antenna 541 connected to an antenna connection terminal 515 of the Bluetooth module 50b via a wire L4.

Each of the third antenna 532 and the fourth antenna 541 is a conductor of a specific pattern coupled to a thin film, and connected to the conductor via the wires L3 or L4. The third antenna 532 and the fourth antenna 541 may be attached to the side wall 151 of the cover housing 15 by a double-side tape.

Referring to FIG. 30, the main PCB 48 may be disposed in a space formed between the main body 40 and the base 30. The main PCB 48 controls overall operation of the voice recognition apparatus. In the main PCB, there are mounted the controller 240, a USB port 62, a data transport port 64, a variety of switches, a receptacle, etc. In addition, the main PCB 48 is circuit-connected to a variety of electronic devices, such as the communication modules 50a and 50c, the display PCB 14, the tweeter 43, and the woofer 44.

Between the main PCB 48 and the main body 40, there may be a heatsink 33. The heatsink is a processed metal plate, and desirably formed of aluminum. The heatsink 33 disperses heat, discharged from the pain PCB 48, to an upper space (that is, a space between the bottom surface of the main body 40 and the heatsink 33).

A plurality of fastening bosses 45a, 45b, 45c, and 45d may protrude from the bottom surface of the main body 40. A first fastening boss 45a and a second fastening boss 45b may protrude from the bottom surface of the rear case 42, and a third fastening boss 45c and a fourth fastening boss 45d may protrude from the bottom surface of the front case 41. The fastening bosses 4a, 45b, 45c, and 45d may be coupled to the base 30.

If the bottom surface of the main body 40 is partitioned by a horizontal line and a vertical line crossing the center of the bottom surface, the fastening bosses 45a, 45b, 45c, and 45d may be formed in the four quadrants partitioned by the horizontal line and the vertical line.

In the base 30, there may be formed insertion bosses at positions respectively corresponding to the fastening bosses 45a, 45b, 45c, and 45d. Each of the fastening bosses 45a, 45b, 45c, and 45d may be inserted into a corresponding insertion boss. When inserted into the corresponding insertion boss, each of the fastening bosses 45a, 45b, 45c, and 45d may be fastened to a bolt passing upward through the corresponding insertion boss.

A plurality of heatsink support bosses 46b, 46c, and 46d may further protrude from the bottom surface of the main body 40. The heatsink support bosses 46b, 46c, and 46d may be disposed at positions adjacent to the fastening bosses 45a, 45b, 45c, and 45d. In the embodiment, the heatsink support bosses 46b, 46c, and 46d are formed in three out of the four quadrants, but the number of heatsink support bosses is not limited thereto.

The heatsink 33 is a processed metal plate, and it is desirable that the heat sink 33 is formed of aluminum or stainless steel. However, any other metal material may be used. The heatsink 33 may include a horizontal flat board 3331 and a plurality of support tabs 332b, 332c, and 332d extending from the circumference of the flat board 3331.

Through-holes 335a, 335b, 335c, and 335d respectively penetrated by the fastening bosses 45a, 45b, 45c, and 45d, and through-holes 334b, 334c, and 334d respectively penetrated by the support bosses 46b, 46c, and 46d may be formed in the flat board 3331.

The support bosses 46, 46c, and 46d may be coupled to the support tabs 332b, 332c, and 332d in the upper side of the main PCB 48. The support tabs 332b, 332c, and 332d may include a vertical portion extending downward from the flat board 3331, and a horizontal part horizontally bent from the vertical part. A fastening hole through which a bolt passes is formed in the horizontal part of each of the support tabs 332b, 332c, and 332d, and, after bolts pass upward through the respective fastening holes, the bolts may be fastened to the support bosses 46b, 46c, and 46d.

When the support bosses 46b, 46c, and 46d are fastened to the support tabs 332b, 332c, and 332d, the flat board 3331 is spaced apart from the bottom surface of the main body 40, which is above the flat board 3331, and the flat board 3331 is spaced apart from even the main PCB 48, which is below the flat board 3331. Since the flat board 3331 is spaced apart from the bottom surface of the main body 40, tapping noise caused by contact of the bottom surface of the main body 40 and the flat board 3331 does not occur even when the main body 40 vibrates due to outputting of the speakers 43 and 44.

In the main PCB 48, there may be formed through-holes 481a, 481b, 481c, and 481d at positions respectively corresponding to the through-holes 335a, 335b, 335c, and 335d of the heatsink 33. A length of each of the fastening boss 45a, 45b, 45c, and 45d is longer than that of each of the support boss 46b, 46c, and 46d. The fastening bosses 45a, 45b, 45c, and 45d may pass through the through-holes 335a, 335b, 335c, and 335d of the heatsink 33 and the through-holes 481a, 481b, 481c, and 481d of the main PCB 48 and be then inserted into insertion bosses of the base 30.

The base 30 may include: a base body 31 which has an open upper surface and in which a specific space is formed inside; and a support rubber 32 which is fixed onto the bottom surface of the base body 31. The voice recognition apparatus 1 is manufactured in a small size to allow a user to lift the voice recognition apparatus 1. The voice recognition apparatus 1 may be placed in a floor, such as a table and a shelf. The support rubber 32 provided at the bottom of the base body 31 increases friction against the floor so that the voice recognition apparatus 1 is prevented from falling down.

The insertion bosses formed in the base 30 protrude upward from the inner surface of the body 31, and through-holes (351a, 351b, 351c, and 351d respectively communicating with the insertion bosses may be formed in the base bottom of the base body 31.

After the main body 40 and the heatsink 33 are assembled, the fastening bosses 45a, 45b, 45c, and 45d are allowed to pass through the fastening boss through-holes 481a, 481b, 481c, and 481d formed in the main PCB 48. Next, the fastening bosses 45a, 45b, 45c, and 45d are inserted into the insertion bosses formed in the base 30. Next, bolts (not shown) are inserted into the fastening holes 351a, 351b, 351c, and 351d from the bottom of the base 30 and fastened to the fastening bosses 45a, 45b, 45c, and 45d inside the insertion bosses.

FIG. 31 is a diagram schematically illustrating a smart home system including a voice recognition server system and a voice recognition apparatus according to an embodiment of the present invention.

Referring to FIG. 31, a smart home system 10 according to an embodiment of the present invention may be composed of a voice recognition apparatus 1 including a communication module (not shown) to communicate with another device or access a network; and a voice recognition server system 1100 including a plurality of server for voice recognition and home appliance control.

Meanwhile, the voice recognition apparatus 1 is an apparatus enabled to recognize voice.

In addition, the smart home system 10 according to an embodiment of the present invention may include a mobile terminal (not shown), such as a smart phone and a tablet PC.

The voice recognition apparatus 1 includes a communication module inside to communicate with electronic devices inside/outside the smart home system 10.

The smart home system 10 according to an embodiment of the present invention may further include an Access Point (AP) device 7, and the voice recognition apparatus 1 may access a wireless internet network via the AP device 7 to communicate with other devices.

The AP device 7 may allocate a wireless channel to electronic devices located in the smart phone system 10 according to a specific communication scheme, and perform wireless data communication via the corresponding channel.

The specific communication scheme may be a Wi-Fi communication scheme. In response, a communication module included in the voice recognition apparatus 1 may be a Wi-Fi communication module, but aspects of the present invention are not limited thereto.

Alternatively, the voice recognition apparatus 1 may include a different type of communication module or a plurality of communication modules. For example, the voice recognition apparatus 1 may include a near field communication (NFC) module, a Zigbee communication module, a Bluetooth communication module, etc.

The voice recognition apparatus 1 may be connected, using a Wi-Fi communication module, to a server included in the voice recognition server system 1100, an external server, or a user's mobile terminal, and may support smart functions such as remote monitoring and remote controlling.

Using the mobile terminal, the user may check information about the voice recognition apparatus 1 in the smart home system 10 or may control the voice recognition apparatus 1.

Meanwhile, in order to control the voice recognition apparatus 1 or check specific information at home, the user needs to use the mobile terminal and this may be inconvenient.

For example, if the user does not know where the mobile terminal is now or if the mobile terminal is in a difference place, it is more efficient to have another means for controlling the voice recognition apparatus 1 in a different way.

The voice recognition apparatus 1 according to an embodiment of the present invention may receive a user's voice input, and the voice recognition server system 1100 may recognize and analyze the user's voice input to control the voice recognition apparatus 1.

Accordingly, the user is able to control the voice recognition apparatus 1 even without manipulating a mobile terminal, a remote control device, or the like.

Meanwhile, at least some of servers included in the voice recognition server system 1100 may be a server operated by a manufacturing or selling company of corresponding voice recognition apparatus or a server operated by a firm commissioned from the manufacturing or selling company.

FIG. 32A shows an example of a voice recognition server system according to an embodiment of the present invention.

Referring to FIG. 32A, a voice recognition server system according to an embodiment of the present invention may include a voice server 1110, which is configured to receive voice data from the voice recognition apparatus 1 and determine a voice command by analyzing the received voice data.

The voice server 1110 may receive voice data from the voice recognition apparatus 1, convert the received voice data into text data, and analyze the text data so as to determine a voice command.

In addition, the voice server 1110 may transmit a signal corresponding to the determined voice command to a specific server.

For example, the voice recognition server system according to an embodiment of the present invention may include: an associated service server 1120 which receives a signal corresponding to the determined voice command from the voice server 1110 and generate a request signal corresponding to the determined voice command; and a home appliance control server 1130 which transmits a control signal, which is based on the request signal received from the associated service server 1120, to the voice recognition apparatus 1.

The voice recognition apparatus 1 may receive a voice command input uttered by a user, and transmit voice data based on the received voice command input to the voice server 1110.

The voice server 1110 may include: an Automatic Speech Recognition (ASR) server 111 configured to receive voice data from the voice recognition apparatus 1 and convert the received voice data into text data; a Natural Language Processing (NLP) server 1112 configured to receive the text data from the ASR server 1111, determine a voice command by analyzing the received text data, and transmit a response signal based on the determined voice command to the voice recognition apparatus 1; and a Text to Speech (TTS) server 113 configured to receive a signal including a text corresponding to the response signal from the voice recognition apparatus 1, convert the text included in the received signal into voice data, and transmit the voice data to the voice recognition apparatus 1.

The NSR server 1111 may generate text data by performing voice recognition on voice data received from the voice recognition apparatus 1, and transmit the text data to the NLP server 1112.

The NLP server 1112 may determine a voice command by analyzing the text data received from the ASR server 1111 according to a natural language processing algorithm.

The NSP server 1112 may process natural language, commonly used by humans, according to the natural language processing algorithm and analyze a user's intent. The NLP server 1112 may determine a voice command coinciding with the user's intent, by performing natural language processing on text data received from the ASN server 1111.

Accordingly, even though a user inputs a voice command with a commonly used language, the NLP server 1112 may determine a voice command that coincides with the user's intent.

The NLP server 1112 may transmit a signal corresponding to a result of natural language processing, that is, a signal corresponding to the determined voice command, to the associated service server 1120.

The associated service server 1120 may receive the signal corresponding to the determined voice command from the NLP server 1112.

When the determined voice command is about the voice recognition apparatus 1, the associated service server 1120 may perform an operation corresponding to the determined voice command by communicating with the home appliance control server 1130.

Alternatively, when the determined voice command is not about the voice recognition apparatus 1, the associated service server 1120 may perform an operation corresponding to the determined voice command by communicating with the external service 1121.

For example, when the determined voice command is a command for requesting information on weather, stock, news, or the like, the associated service server 1120 may request the requested corresponding information from a server which provides services corresponding to the requested information, and receive the requested information from the server.

In addition, the associated service server 1120 may transmit the received information to the voice server 1110, and the NLP server 1112 may transmit received information to the voice recognition apparatus 1.

When the determined voice command is about the voice recognition apparatus 1, the associated service server 1120 may generate a request signal corresponding to the determined voice command and transmit the request signal to the home appliance control server 1130.

The home appliance control server 1130 may transmit a control signal, which is based on the request signal received from the associated service server 1120, to the voice recognition apparatus 1.

For example, when a request for playing music is received form the voice recognition apparatus 1, the home appliance control server 1130 may transmit a control signal for playing music to the voice recognition apparatus 1.

Meanwhile, the voice recognition apparatus 1 may perform a corresponding operation in accordance with the control signal received from the home appliance control server 1130.

In addition, after performing a requested operation, the voice recognition apparatus 1 may transmit a signal indicative of completion of the requested operation to the home appliance control server 1130.

In addition, the home appliance control server 1130 may receive a response signal from the voice recognition apparatus 1 in response to the control signal, and transmit processing result information corresponding to the response signal to the associated service server 1120.

The voice server 1110 may transmit the response signal, including the processing result information, to voice recognition apparatus 1.

The voice server 1110 may receive a signal, including an output text corresponding to the processing result information, from voice recognition apparatus 1, convert the received output text into voice data, and transmit the voice data to the voice recognition apparatus 1.

In this case, the response signal transmitted by the NLP server 1112 to the voice recognition apparatus 1 based on the determined voice command may include the processing result information.

Meanwhile, the voice recognition apparatus 1 may receive a response signal, which is based on the determined voice command, from the NLP server 1112. The response signal may include text data corresponding to the determined voice command.

For example, a user inputs a voice command to request playing music, the response signal may include text data indicating that music starts to play.

Meanwhile, the voice recognition apparatus 1 may transmit a signal including a text corresponding to the received response signal to the TTS server 1113. The signal including a text corresponding to the response signal may include an output text corresponding to the processing result information.

Meanwhile, the TTs server 1113 may convert the text included in the received signal into voice data, and transmit the voice data to the voice recognition apparatus 1. The voice data may include a source audio file.

The voice recognition apparatus 1 may output, through a speaker, an audible guidance message which is based on the received voice data.

Meanwhile, the associated service server 1120 may request state information of the voice recognition apparatus 1 from the home appliance control server 1130 based on a signal corresponding to the determined voice command. The home appliance control server 1130 may transmit the state information of the voice recognition apparatus 1 to the associated service server 1120. When the state information of the voice recognition apparatus 1 is not secured, the home appliance control server 1130 may request and receive the state information from the voice recognition apparatus 1.

Meanwhile, when the determined voice command is supported based on the state information of the voice recognition apparatus 1, the associated service server 1120 may transmit a request signal corresponding to the determined voice command to the home appliance control server 1130.

Alternatively, when the determined voice command is not supported based on the state information of the voice recognition apparatus 1, the associated service server 1120 may transmit, to the NLP server 1112, a signal for notifying that the determined voice command is about a function not supported in the current state.

Even in this case, the voice recognition apparatus 1 may request and receive voice data from the TTS server 1113, and output an audible guidance message for notifying that the determined voice command is a function not supported in the current state.

In some implementations, the voice server 1110 may determine whether or not the determined voice command is supported. For example, the NSP server 1112 having analyzed the intent of the user's voice command may determine whether or not the determined voice command is supported.

In this case, if the determined voice command includes an unsupported command, a response signal based on the determined voice command, the signal which is transmitted by the NLP server 1112, may be a signal indicating that the determined voice command is a function not supported by the voice recognition apparatus 1.

The voice server 1110 according to an embodiment of the present invention, and the voice recognition server system 100 including the voice server 1110 may connect and use servers which perform various functions for processing of natural-language voice.

The voice recognition apparatus 1 may perform operations from receiving and pre-processing of a voice command to transmitting the voice command to a server, and the voice server 1110 may perform natural language processing operations such as conversion of a voice/text, analysis of an intent, identification of a command, etc.

As the voice server 1110 performs natural-language processing, this may reduce the burden on a CPU of an embedded module and a memory in the voice recognition apparatus.

Meanwhile, the associated service server 1120 may perform an operation based on a user's voice command by communicating with an external service server or a home appliance control server 1130.

Meanwhile, the voice recognition apparatus 1 may receive voice data including an audio file from the voice server 1110 and output an audible guidance message so as to provide an audible feedback in response to a user's voice input.

The voice recognition apparatus 1 may receive a voice file from the voice server 1110 via a streaming media, and playback or output an audible guidance message to a user. Accordingly, the voice recognition apparatus 1 does not need to store diverse audio files.

Meanwhile, via the associated service server 1120, it is possible to be associated with various external services without colliding with other servers. In addition, using the external service associated server, an intention analysis rate may be enhanced by reflecting external information during intent analysis.

The voice recognition server system 1100 according to an embodiment of the present invention may secure compatibility and connectivity using a plurality of servers. In addition, using the home appliance control server 1130, a final control command may prevent a collision between a voice recognition process and a home appliance controlling process performed by the home appliance control server 1130 through Wi-Fi communication, and a collision between a home appliance controlling processing through a mobile terminal and a home appliance controlling process upon a voice input through the voice recognition apparatus 1.

The voice recognition server system 1100 according to an embodiment of the present invention may reduce the problem that loads are focused on one specific server, through organic connection of servers. Each server performs a different function, and thus, when a problem occurs in a specific server, it is possible to address the problem by associating with a different server which performs the same function.

In addition, a plurality of servers may be updated independently from time to time, and it is advantageous in improving performance.

Figure 32B:
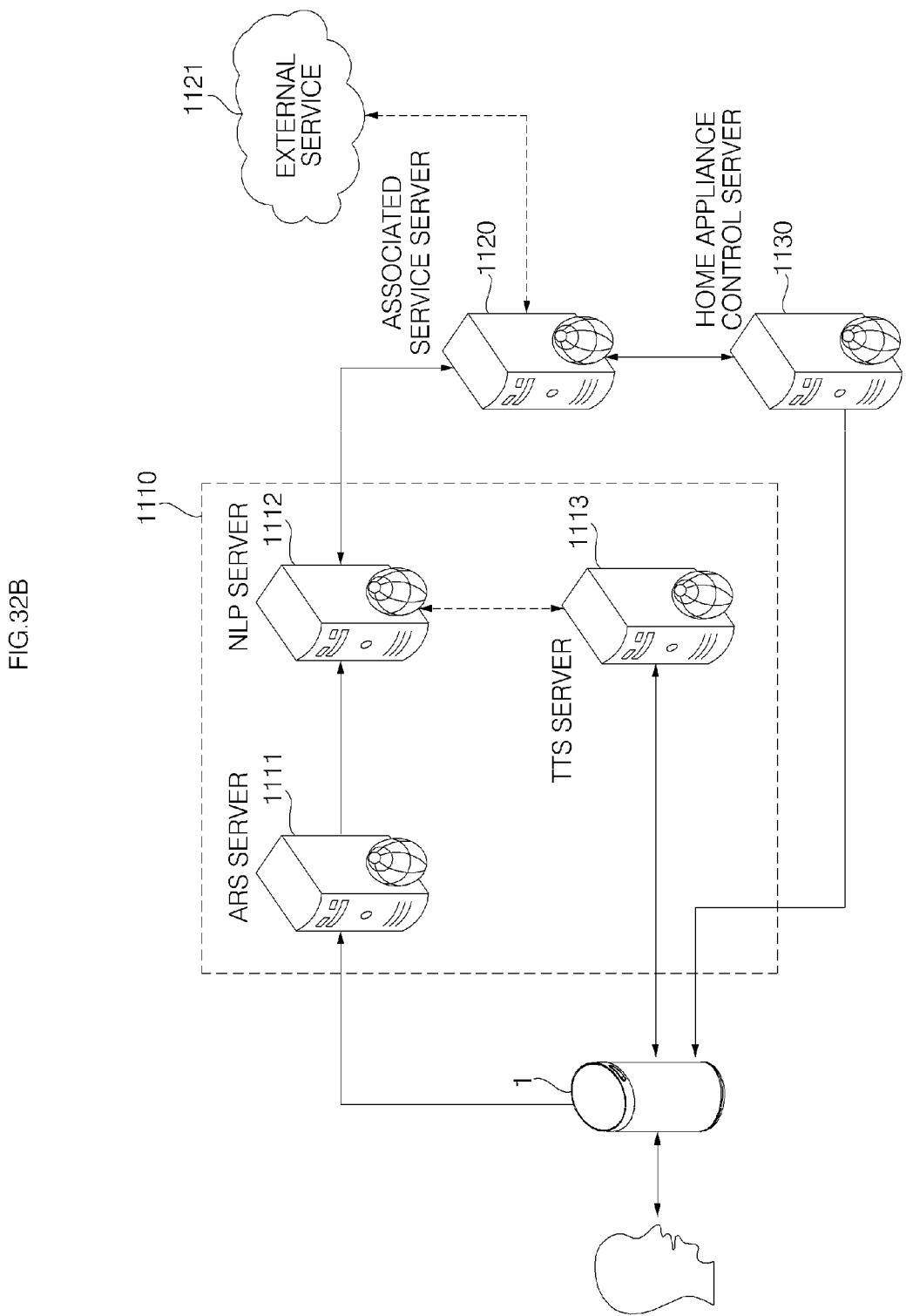
FIG. 32B shows an example of a voice recognition server system according to an embodiment of the present invention.

FIG. 32B shows an example of a voice recognition server system according to an embodiment of the present invention.

The voice recognition server system shown in FIG. 32B is an example of the voice recognition server system shown in FIG. 32A of which a process of transmitting voice data for outputting of an audible guidance message to the voice recognition apparatus 1 has improved to reduce a voice control response time.

Thus, the voice recognition server systems shown in FIGS. 32A and 32B may perform other operations substantially in the same way, and only the identical parts between the two systems will be briefly described.

Referring to FIG. 32B, a voice recognition server system according to an embodiment of the present invention may include a voice server 1110 configured to receive voice data from the voice recognition apparatus 1 and analyze the received voice data to determine a voice command.

In addition, the voice recognition server system according to an embodiment of the present invention may include: an associated service server 1120 configured to a signal corresponding to the determined voice command from the voice server 1110, and generate a request signal corresponding to the determined voice command; and a home appliance control server 1130 configured to transmit, to the voice recognition apparatus 1, a control signal which is based on the request signal received from the associated service server 1120.

In the voice recognition server system shown in FIG. 32B, the voice server 1110 may transmit voice data, including processing result information which is based on the voice command, to the voice recognition apparatus 1 even without a request from the voice recognition apparatus 1.

The voice server 1110 may include: an ASR server 11 configured to receive voice data from the voice recognition apparatus 1 and convert the received voice data into text data; a NLP server 1112 configured to receive the text data from the ASR server 1111 and analyze the received text data to determine a voice command; and a TTS server 1113 configured to convert a response signal based on the voice command into voice data and transit the voice data to the voice recognition apparatus 1.

In this embodiment, the home appliance control server 1130 may receive a response signal from the voice recognition apparatus 1 in response to the control signal, and transmit processing result information corresponding to the response signal to the associated service server 1120.

The associated service server 1120 may transmit the processing result information to the voice server 1110, especially, the NLP server 1112.

In this case, the voice data transmitted by the TTS server 1113 to the voice recognition apparatus 1 may include the processing result information.

In addition, the associated service server 1120 may request state information of the voice recognition apparatus 1 from the home appliance control server 1130 based on a signal corresponding to the determined voice signal, and the home appliance control server 1130 may transmit the state information of the voice recognition apparatus 1 to the associated service server 120.

In addition, when the determined voice command is supportable based on the state information of the voice recognition apparatus 1, the associated service server 1120 may transmit a request signal corresponding to the determined voice command to the home appliance control server 1130.

Alternatively, when the determined voice command is not supported based on the state information of the voice recognition apparatus 1, the associated service server 1120 may transmit, to the voice server 1110, a signal for notifying that the determined voice command is a function not supported in the current state.

For example, the associated service server 1120 may transmit, to the NLP server 1112, a signal for notifying that the determined voice command is about a function not supported in the current state.

In addition, the NLP server 1112 may transmit, to the TTS server 1113, a signal for notifying that the determined voice command is about a function not supported in the current state, and the TTS server 1113 may generate corresponding voice data and transmit the voice data to the voice recognition apparatus 1.

The voice recognition apparatus 1 may receive the voice data from the TTS server 1113, and output an audible guidance message for notifying that the determined voice command is about a function not supported in the current state.

In some implementations, the voice server 1110 may determine whether or not the determined voice command is supported. For example, the NLP server 1112 having analyzed intent of a user's voice command may determine whether the determined voice command is supported.

In this case, if the determined voice command includes an unsupported command, a response signal based on the determined voice command, the signal which is transmitted by the NLP server 1112, may be a signal indicating that the determined voice command is a function not supported by the voice recognition apparatus 1.

If the voice recognition apparatus 1 operates first and then requests voice guidance about a corresponding operation from the TTS server 1113 in the last stage, there may be a time gap between performing of the corresponding operation and outputting of the voice guidance.

However, according to an embodiment of the present invention, at a time when an operation request is transmitted from the NLP server 1112 after completion of intent analysis, information may be simultaneously provided to the TTS server 1113.

In addition, around when the home appliance control server 1130 transmits a control command to the voice recognition apparatus 1 the TTS server 1113 may provide an audible comment to the voice recognition apparatus 1.

Accordingly, the audible comment may be output at the same time when or right after operation of the voice recognition apparatus 1.

According to this embodiment, by connecting the NLP server 1112 and the TTS server 1113 directly, it is possible to reduce an interval between outputting of a control command and outputting of the audible comment via the home appliance control server 1130.

Meanwhile, although the a voice recognition apparatus performing a hub function is described with reference to FIGS. 32A and 32B as an example of the voice recognition apparatus 1, aspects of the present invention are not limited. For example, the voice recognition apparatus 1 may be the robot cleaner, the refrigerator, the washing machine, the cooking appliance, a TV, a mobile terminal (a smart phone, a wearable device, etc.), a vehicle, a lighting device, a temperature adjusting device, etc.

According to one aspect of the present invention, unlike the examples shown in FIGS. 32A and 32B, the NSR server 1111, the NLP server 1112, and the TTS server 1113 for voice recognition and processing may be configured as one integrated server.

In addition, in some implementations, the associated service server 1120 and the home appliance control server 1130 may be configured as one integrated server.

According to the present invention, a voice recognition apparatus operates upon a voice input, and thus, a user does not needs to manipulate a remote control device, such as a remote controller, or a mobile terminal, thereby improving user convenience.

In addition, as described above with reference to FIGS. 32A and 32B, the present invention recognizes a user's natural-language voice command and performs a corresponding control operation, thereby enabled to recognize and process a natural language without a limitation to system resources of a voice recognition apparatus and each server.

Figure 35:
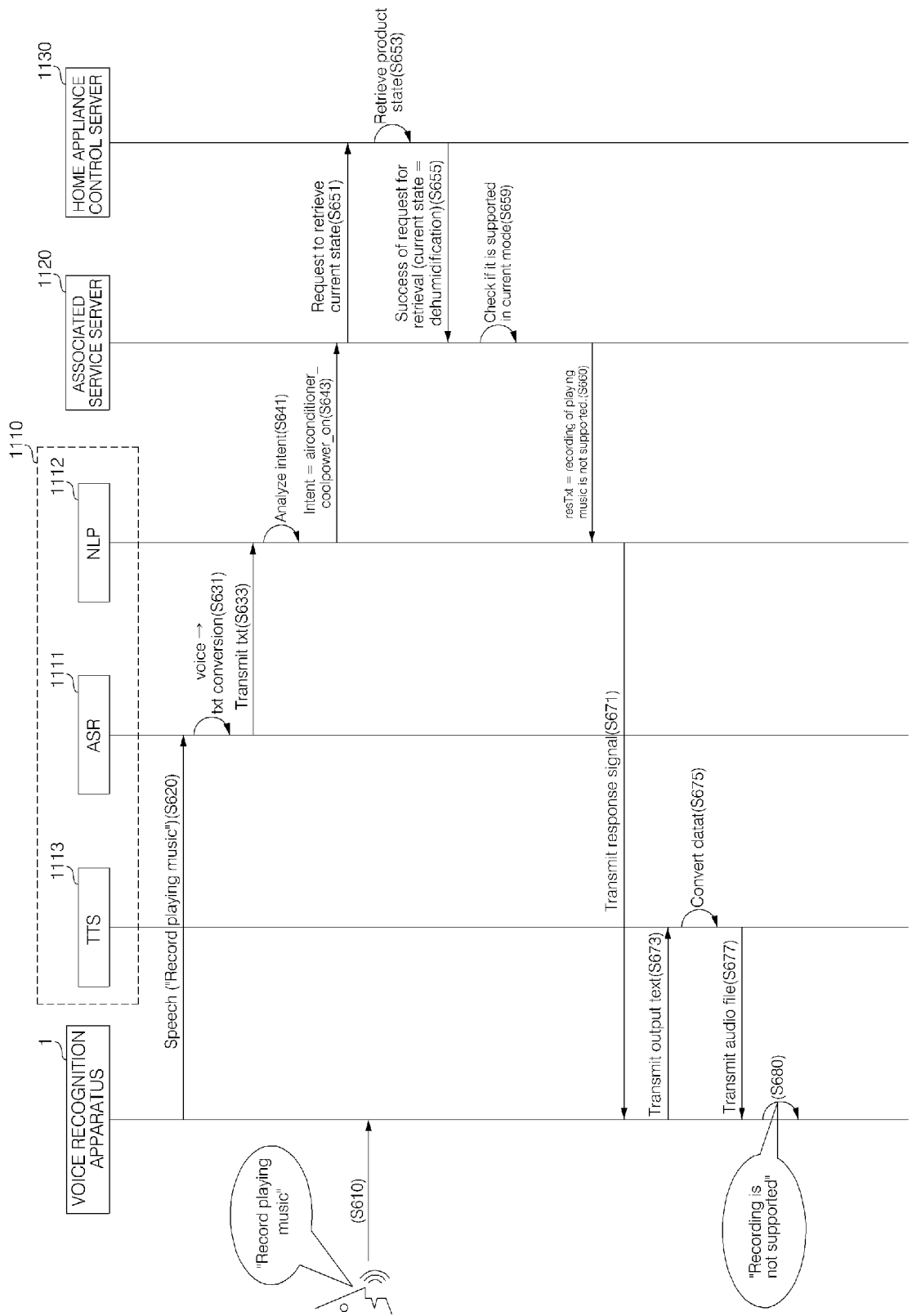

FIGS. 33 to 35 are diagrams illustrating a signal flow in a voice recognition server system according to an embodiment of the present invention, the diagrams which shows a signal flow in the voice recognition server system shown in FIG. 32A.

FIG. 33 shows an example of a signal flow in a general situation in which a voice recognition apparatus operates upon a user's voice command.

The voice recognition apparatus 1 is exemplified by the voice recognition apparatus 1 in the following description, but aspects of the present invention are not limited thereto.

Referring to FIG. 33, the voice recognition apparatus 1 according to an embodiment of the present invention, for example, the voice recognition apparatus 1, may receive a user's voice command in S410, and transmit the received voice command to the voice server 1110 in S420.

For example, when a command for changing temperature setting, for example, "Play dance music" is received, the voice recognition apparatus 1 may convert the received voice command into digital voice command in a specific format, such as a wave file, and transmit the digital voice data to the ASR server 1111.

Meanwhile, after receiving a wake up signal including a call word, the voice recognition apparatus 1 may wait for a command and transmit an input voice command to the voice server 1110.

Alternatively, the voice recognition apparatus 1 may receive successive voice inputs including a call word and a voice command. In this case, the voice recognition apparatus 1 may recognize the call word and transmit the voice command to the voice server 1110.

Signals transmitted and received via communication between devices in the system 10 may further include identification information of each of the devices and a session value for a task to be performed, as well as main data transmitted and received between the devices.

The ASR server 1111 may recognize the received voice data and convert the voice data into text data in S431, and transmit the text data to the NLP server 1112 in S433.

The NLP server 1112 may analyze and determine the intent of the user's voice command by performing natural language processing on the received text data in S441.

For example, from a voice "Play dance music", the NLP server 112 may determine a voice command intended to play dance music in the voice recognition apparatus 1.

The NLP server 1112 may transmit a signal corresponding to the determined voice command to the associated service server 1120 in S443.

When the associated service server 1120 request the current state information of the voice recognition apparatus 1 from the home appliance control server 1130 in S451, the home appliance control server 1130 may retrieve the current state information of the voice recognition apparatus 1 in S453 and transmit the current state information of the voice recognition apparatus 1 to the associated service server 1120 in S455.

If the home appliance control server 1130 does not have the current state information of the voice recognition apparatus 1, the home appliance control server 1130 may request and receive the current state information from the voice recognition apparatus 1.

Meanwhile, according to the determined voice command, the associated service server 1120 having received the state information may transmit, to the home appliance control server 1130, a request signal for playing dance music in the voice recognition apparatus 1 in S461.

The home appliance control server 1130 may control the voice recognition apparatus 1 by generating a control signal and transmitting the control signal to the voice recognition apparatus 1 based on the request signal in S463.

In addition, after controlling the voice recognition apparatus 1, the home appliance control server 1130 may receive a response signal from the voice recognition apparatus 1 in response to the control signal, and transmits processing result information for notifying completion of a requested operation to the associated service server 1120 in S465.

The associated service server 1120 may transmit, to the NLP server 1112, a signal corresponding to processing result information, for example, "Dance music starts to play" in S470. The NLP server 1112 may transmit, to the voice recognition apparatus 1, a response signal based on the determined voice command in S481. The response signal based on the determined voice command may include the processing result information.

Meanwhile, the voice recognition apparatus 1 may transmit a signal including a text (an output text) corresponding to the response signal in S483. When receiving the signal, the TTS server 1113 may convert the text included in the received signal into voice data in S485, and transmit the voice data to the voice recognition apparatus 1 in S487.

Based on the received voice data, the home appliance voice recognition apparatus 1 may output an audible guidance message, such as "Dance music start to play" in S490.

FIG. 34 shows a signal flow in the case where a function not supported by a corresponding voice recognition apparatus is requested.

Referring to FIG. 34, the voice recognition apparatus 1 according to an embodiment of the present invention may receive a user's voice command, for example, "Turn on radio", about a radio function not supported by the voice recognition apparatus 1 in S510.

The voice recognition apparatus 1 may transmit the received voice command to the voice server 1110 in S520. The voice recognition apparatus 1 a may convert the received voice command into digital voice data in a specific format, such as a wave file, and transmit the digital voice data to the ASR server 1111.

The ASR server 1111 may recognize the received voice data and convert the voice data into text data in S531, and transmit the text data to the NLP server 1112 in S533.

The NLP server 1112 may perform natural language processing on the received text data to analyze and determine the intent of the voice command in S541.

In addition, the NLP server 1112 may determine whether or not the determined voice command is supported. In this embodiment, the NLP server 1112 may determine that the user has requested a washing function that is not supported by the voice recognition apparatus 1.

Next, the NLP server 1112 may transmit, to the voice recognition apparatus 1, a response signal for notifying that the determined voice command is about a function not supported by the voice recognition apparatus 1 in S543.

Meanwhile, the voice recognition apparatus 1 may transmit a signal including a text (an output text) corresponding to the response signal in S551. When receiving the signal, the TTS server 1113 may convert the text included in the received signal into voice data in S553 and transmit the voice data to the voice recognition apparatus 1 in S555.

Based on the received voice data, the voice recognition apparatus 1 may output an audible guidance message, such as "It is not a supported function", in S560.

FIG. 35 shows a signal flow in the case where a request for a function not supported in the current operation mode of a corresponding voice recognition apparatus is received.

Referring to FIG. 35, the voice recognition apparatus 1 according to an embodiment of the present invention may receive a user's voice command, for example, "Record playing music", indicating a specific mode operation of the voice recognition apparatus 1 in S610.

The voice recognition apparatus 1 may transmit the received voice command to the voice server 1110 in S620. The voice recognition apparatus 1 may convert the received voice command into digital voice data in a specific format, such as a wave file, and transmit the digital voice data to the ASR server 1111.

The ASR server 1111 may recognize the received voice data and convert the voice data into text data in S631, and transmit the text data to the NLP server 1112 in S633.

The NLP server 1112 may analyze and determine the intent of the voice command by performing natural-language processing on the received text data in S641.

For example, from a voice "Record playing music", the NLP server 1112 may determine a voice command intended to record playing music in the voice recognition apparatus.

The NLP server 1112 may transmit a signal corresponding to the determined voice command to the associated service server 1120 in S643.

When the associated service server 1120 requests current state information of the voice recognition apparatus 1 from the home appliance control server 1130 in S651, the home appliance server 1130 may inquire the current state information of the voice recognition apparatus 1 in S653 and transmit the current state information of the voice recognition apparatus 1 to the associated service server 1120 in S655.

If the home appliance control server 1130 does not have the current state information of the voice recognition apparatus 1, the home appliance control server 1130 may request and receive the current state information from the voice recognition apparatus 1.

Meanwhile, the associated service server 1120 having received the current state information may be determined, based on the current state information, whether the determined user command is supported in S657. For example, in the case where the voice recognition apparatus 1 is playing music and a recording function is supported only in a recording mode, the NLP server 1112 may determine that the user has requested recording of playing music, which is not supported in the current state.

Next, the associated service server 1120 may transmit, to the NLP server 1112, a response signal for notifying that the determined voice command is about a function not supported by the voice recognition apparatus 1 in the current state in S660.

In addition, the associated service server 1120 may transmit, to the NLP server 112, a response signal for notifying that the determined voice command is about a function not supported by the voice recognition apparatus 1 in the current state in S671.

Meanwhile, the voice recognition apparatus 1 may transmit a signal including a text (an output text) corresponding to the response signal in S673. When receiving the signal, the TTS server 1113 may convert the text included in the received signal into voice data in S675 and transmit the voice data to the voice recognition apparatus 1 in S677.

Based on the received voice data, the voice recognition apparatus 1 may output an audible guidance message, such as "Recording of playing music is not supported", in S680.

Figure 36:
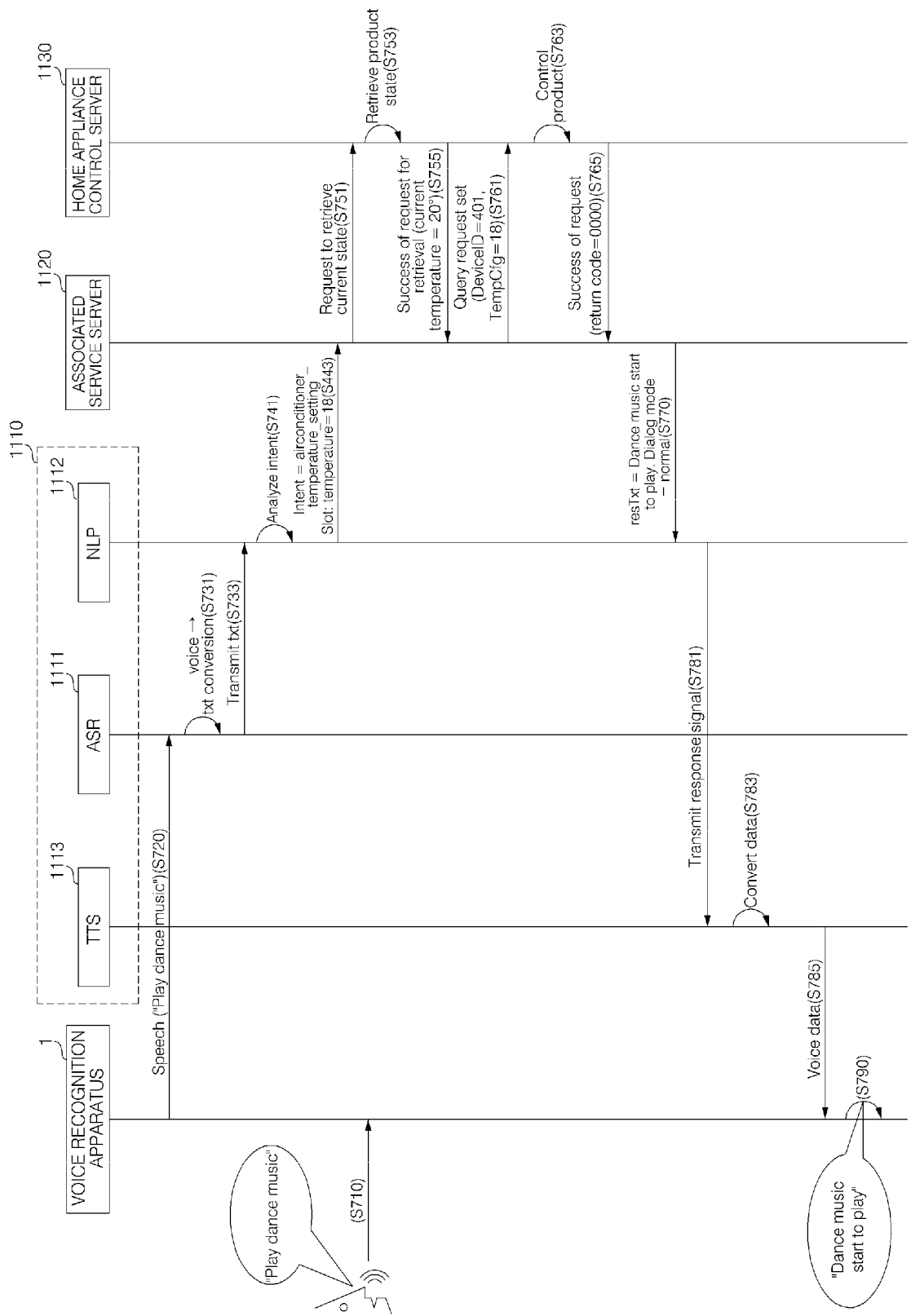
FIGS. 36 to 38 are diagrams illustrating an example of a signal flow in a voice recognition server system according to an embodiment of the present invention.
Figure 37:
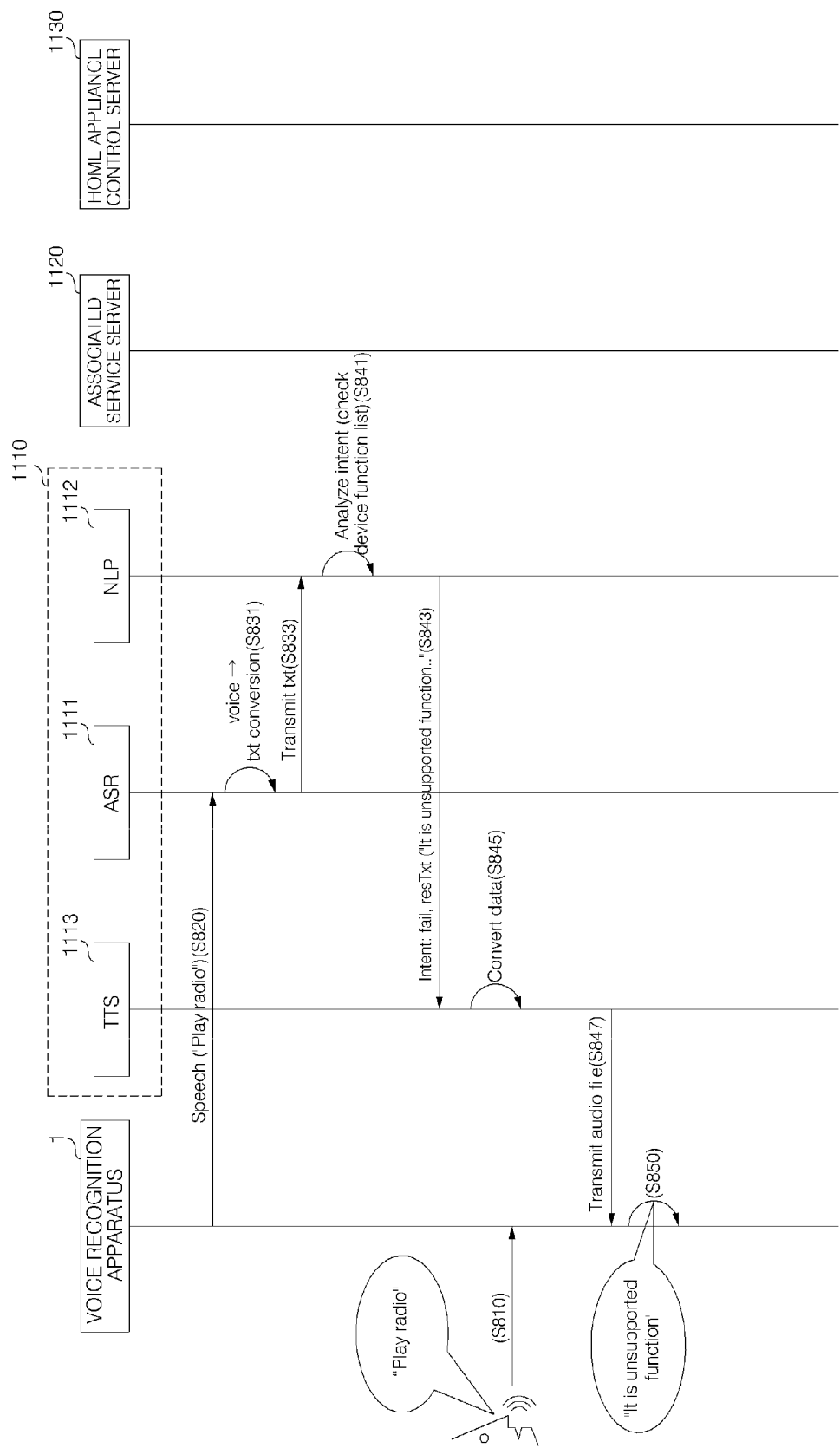
Figure 38:
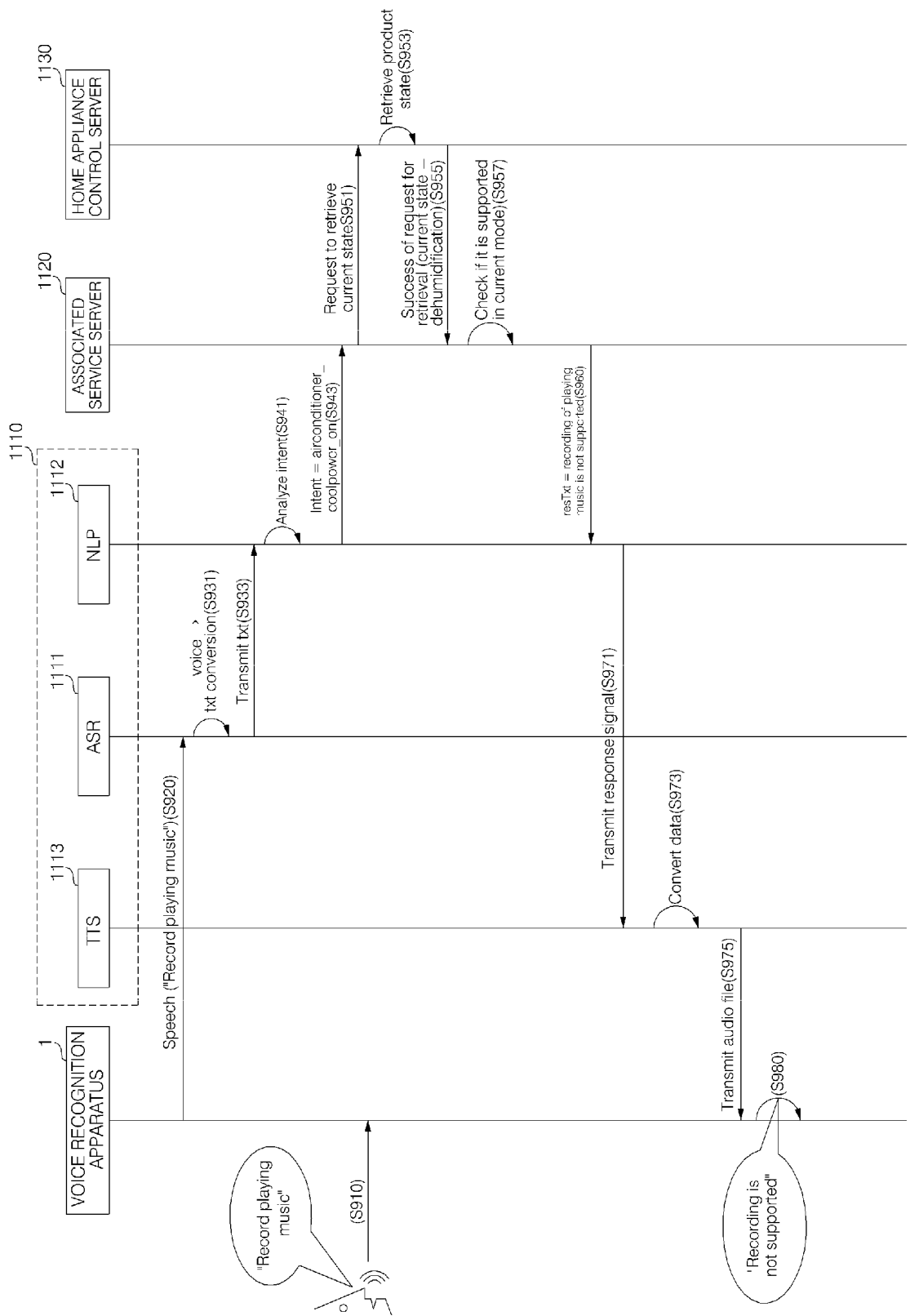

FIGS. 36 to 38 are diagrams illustrating an example of a signal flow in a voice recognition server system according to an embodiment of the present invention, the diagrams which shows a signal flow in the voice recognition server system shown in FIG. 32B.

FIG. 36 shows a signal flow in a general situation in which a voice recognition apparatus operates upon a user's voice command.

Referring to FIG. 36, the voice recognition apparatus 1 according to an embodiment of the present invention, for example, the voice recognition apparatus 1, may receive a user's voice command in S710, and transmit the received voice command to the voice server 1110 in S720.

The ASR server 1111 may recognize the received voice data and convert the voice data into text data in S731, and transmit the text data to the NLP server 1112 in S733.

The NLP server 1112 may analyze and determine the intent of the voice command by performing natural language processing on the received text data in S741.

For example, from a voice "Play dance music", the NLP server 1112 may determine a voice command intended to play dance music in the voice recognition apparatus 1.

The NLP server 1112 may transmit a signal corresponding to the determined voice command to the associated service server 1120 in S743.

When the associated service server 1120 requests current state information of the voice recognition apparatus 1 from the home appliance control server 1130 in S751, the home appliance control server 1130 may inquire the current state information of the voice recognition apparatus 1 in S753, and transmit the current state information of the voice recognition apparatus 1 to the associated service server 1120 in S755.

If the home appliance control server 1130 does not have the current state information of the voice recognition apparatus 1, the home appliance control server 1130 may request and receive the current state information of the voice recognition apparatus 1.

Meanwhile, according to the determined voice command, the associated service server 1120 having received the current state information may transmit a request signal for playing dance music in the voice recognition apparatus 1 to the home appliance control server 1130 in S761.

Based on the request signal, the home appliance control server 1130 may control the voice recognition apparatus 1 by generating a control signal and transmitting the control signal to the voice recognition apparatus 1 in S763.

In addition, after controlling the voice recognition apparatus 1, the home appliance control server 1130 may receive a response signal from the voice recognition apparatus 1 in response to the control signal, and transmit processing result information for notifying completion of a requested operation to the associated service server 1120 in S765.

The associated service server 1120 may transmit a signal corresponding to the processing result information, for example, "Dance music start to play", to the NLP server 1112 in S770.

Meanwhile, the NLP server 1112 may transmit a response signal based on the determined voice command to the TTS server 1113 in S781. The response signal based on the determined voice command may include the processing result information.

Meanwhile, the TTS server 1113 may convert the response signal based on the voice command into voice data in S783, and transmit the voice data to the voice recognition apparatus 1 in S785.

Based on the received voice data, the voice recognition apparatus 1 may output an audible guidance message, such as "Dance music start to play", in S790.

FIG. 38 shows an example of a signal flow in the case where a function not supported by a corresponding voice recognition apparatus is requested.

Referring to FIG. 37, the voice recognition apparatus 1 according to an embodiment of the present invention may receive a user's voice command, for example, "Turn on radio", about a radio function that is not supported by the voice recognition apparatus 1 in S810.

The voice recognition apparatus 1 may transmit the received voice command to the voice server 1110 in S820. The voice recognition apparatus 1 may convert the received voice command into digital voice data in a specific format, such as a wave file, and transmit the digital voice data to the ASR server 1111.

The ASR server 1111 may recognize the received voice data into text data in S831, and transmit the text data to the NLP server 1112 in S833.

The NLP server 1112 may analyze and determine the intent of the voice command by performing natural language processing on the received text data in S841.

In addition, the NLP server 1112 may determine whether or not the determined voice command is supported. In this embodiment, the NLP server 1112 may determine that the user has requested a radio function not supported by the voice recognition apparatus 1.

Next, the NLP server 1112 may transmit, to the TTS server 1113, a response signal for notifying that the determined voice command is about a function not supported by the voice recognition apparatus 1 in S843.

The TTS server 1113 may convert the response signal based on the voice data in S845, and transmit the voice data to the voice recognition apparatus 1 in S847.

Based on the received voice data, the voice recognition apparatus 1 may output an audible guidance message, such as "It is not a supported function", in S850.

FIG. 38 shows an example of a signal flow in the case where a function not supported in the current operation mode of a corresponding voice recognition apparatus is requested.

Referring to FIG. 38, the voice recognition apparatus 1 according to an embodiment of the present invention may receive a user's voice command, for example, "Record playing music", indicating a specific mode operation of the voice recognition apparatus 1 in S910.

The voice recognition apparatus 1 may transmit the received voice command to the voice server 1110 in S920. The voice recognition apparatus 1 may convert the received voice command into digital voice data in a specific file, such as a wave file, and transmit the digital voice data to the ASR server 1111.

The ASR server 1111 may recognize the received voice data and convert the voice data into text data in S931, and transmit the text data to the NLP server 1112 in S933.

The NLP server 1112 may analyze and determine the intent of the voice command by performing natural language processing on the received text data in S941.

For example, from a voice "Record playing music", the NLP server 1112 may determine a voice command intended to record playing music in the voice recognition apparatus 1.

The NLP server 1112 may transmit a signal corresponding to the determined voice command to the associated service server 1120 in S943.

When the associated service server 1120 requests current state information of the voice recognition apparatus 1 from the home appliance control server 1130 in S951, the home appliance control server 1130 may inquire the current state information of the voice recognition apparatus 1 in S953, and transmit the current state information of the voice recognition apparatus 1 to the associated service server 1120 in S955.

If the home appliance control server 1130 does not have the current state information of the voice recognition apparatus 1, the home appliance control server 1130 may request and receive the current state information from the voice recognition apparatus 1.

Meanwhile, based on the received current state information of the voice recognition apparatus 1, the associated service server 1120 may determine whether the determined voice command is supported in S957. For example, in the case where the voice recognition apparatus 1 playing music and a recording function is supported only in a recording mode, the NLP server 1112 may determine that the user has requested the recording mode which is not supported in the current state.

Next, the associated service server 1120 may transmit, to the NLP server 1112, a response signal for notifying that the determined voice command is a function not supported by the voice recognition apparatus 1 in the current state, in S960.

In addition, the NLP server 1112 may transmit, to the TTS server 1113, a response signal indicating that the determined voice command is a function not supported in the current state in S971.

Meanwhile, the TTS server 1113 may convert the response signal based on the voice command into voice data in S973, and transmit the voice data to the voice recognition apparatus 1 in S975.

Based on the received voice data, the voice recognition apparatus 1 may output an audible guidance message, such as "Recording of playing music is not supported" in S980.

According to the present invention, it is possible to implement user experience where an appropriate audible comment is provided when a user's command is failed to be interpreted or the user's command is about an unavailable function.

By providing voice guidance in an appropriate time and situation during command processing, it is possible to minimize user inconvenience.

Figure 39:
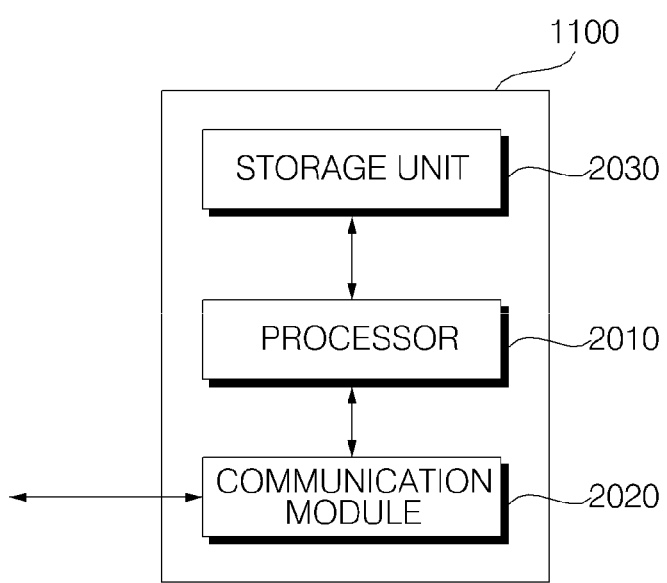
FIG. 39 is an internal block diagram of an example of a server according to an embodiment of the present invention.

FIG. 39 is an internal block diagram of an example of a server according to an embodiment of the present invention, and the server 1100 may be the ASR server 1111, the NLP server 1112, the TTS server 1113, the associated service server 1120, or the home appliance control server 1130.

Referring to FIG. 39, the server may include a communication module 2020, a storage unit 2030, and a processor 2010.

The processor 2010 may control overall operation of the server.

The communication module 2020 may diverse data, such as state information, operation information, manipulation information, voice data, and text data, from the voice recognition apparatus 1 or a different server.

In addition, the communication module 2020 may transmit original or processed data corresponding to the received diverse information corresponding thereto to voice recognition apparatus 1 or a different server.

To this end, the communication module 2020 may include one or more communication modules, such as an Internet module, and a mobile communication module.

The storage unit 2030 may store received information, and have data required for generating result information corresponding to the received information.

The storage unit 2030 may store data required for operation of a corresponding server. For example, the storage unit 2030 may store an automatic voice recognition algorithm in the case of the ASR server 1111, and may store product information and state information of the voice recognition apparatus 1, and information for controlling the home appliance voice recognition apparatus 1 in the case of the home appliance control server 1130.

Meanwhile, the server may be a server administered by a manufacturer of voice recognition apparatus 1, such as an air conditioner, or by a service provide, and the server may be a kind of Cloud server.

Figure 40:
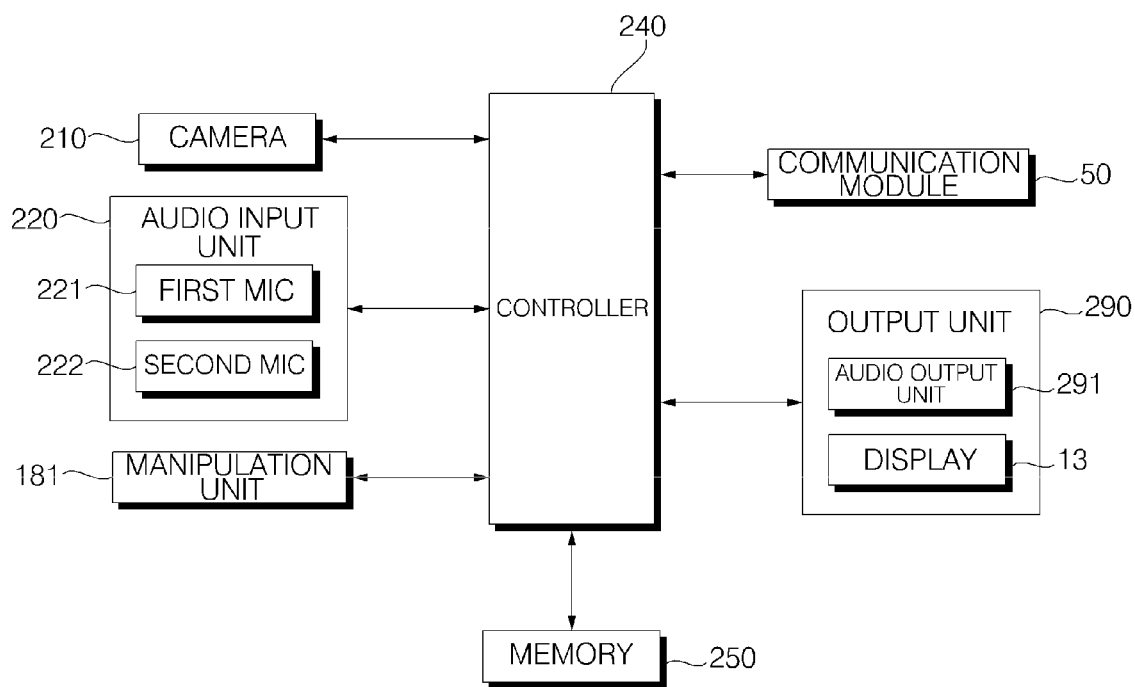
FIG. 40 is an interior block diagram illustrating an example of a voice recognition apparatus according to an embodiment of the present invention.

FIG. 40 is an interior block diagram illustrating an example of a voice recognition apparatus according to an embodiment of the present invention.

Referring to FIG. 40, the voice recognition apparatus 1 according to an embodiment of the present invention may include: an audio input unit 220 configured to receive a user's voice command; a memory 250 configured to store diverse data; a communication module 50 configured to perform wireless communication with another electronic device; an output unit 290 configured to display specific information in the form of an image or sound; and a controller 240 configured to control overall operations.

The audio input unit 220 may receive an external audio signal, such as a user's voice command. To this end, the audio input unit 220 may include one or more microphones (MIC). In addition, to more accurately receive a user's voice command, the audio input unit 220 may include a plurality of microphones 221 and 222. The plurality of microphones 221 and 222 may be spaced apart from each other and configured to acquire an external audio signal and process the external audio signal into an electric signal.

FIG. 40 shows the case where the audio input unit 220 includes two microphones, a first microphone 221 and a second microphone 222, but aspects of the present invention are not limited thereto.

The audio input unit 220 may include or be connected to a processor, which converts analog sound into digital data, so as to convert a user's voice command into data so that the controller 240 or a specific server is able to recognize the user's voice command.

Meanwhile, the audio input unit 220 may utilize various noise removal algorithms for removing noise that occurs in the process of receiving the user's voice command.

In addition, the audio input unit 220 may include components for audio signal processing: for example, a filter for removing noise from an audio signal received by each of the microphones 221 and 222, and an amplifier for amplifying a signal output from the filter and output the amplified signal.

The memory 250 may record diverse information necessary for operation of the voice recognition apparatus 1, and include a volatile or non-volatile recording medium. A recording medium may store microprocessor-readable data, and may include a Hard Disk Drive (HDD), a Solid State Disk (SSD), a Silicon Disk Drive (SDD), a ROM, a RAM, a CD-ROM, a magnetic tape, a floppy disk, an optical data storage device, and the like.

Meanwhile, the memory 250 may store data for voice recognition, and the controller 240 may process a user's voice input signal received via the audio input unit 220, and perform a voice recognition process.

Meanwhile, the simple voice recognition may be performed by the voice recognition apparatus 1, and complicated voice recognition, such as processing a natural language, may be performed by the voice recognition server system 1100.

For example, when a wake up voice signal including a preset call word is received, the voice recognition apparatus 1 may be switched into a state for receiving a voice command. In this case, the voice recognition apparatus 1 may perform voice recognition processes up to determination as to whether a call word voice is input, and other subsequent processes regarding the user's voice input may be performed by the voice recognition server system 1100.

System resources of voice recognition apparatus 1 are limited, and thus, complicated recognition and processing of natural language recognition may be performed by the voice recognition server system 1100.

The memory 250 may store limited data. For example, the memory 250 may store data for recognizing a wake up voice signal including a preset call word. In this case, the controller 240 may recognize the wake-up voice signal including the preset call word from a user's voice input signal received via the audio input unit 220.

Meanwhile, a call word may be set by a manufacturer. For example, a call word may be set to be "LG Hub".

In addition, a call word may be changed by a user.

The controller 240 may perform a control operation so as to transmit a user's voice command, which is input after recognition of a wake up voice signal, to the voice recognition server system 1100 via the communication module 50.

The communication module 50 may include one or more communication modules and transmit and receive various signals through wireless communication with another electronic device. For example, the communication module 50 may communication with electronic devices inside/outside a mart home system 10.

In addition, the communication module 50 may communicate with the AP device 7, and access a wireless Internet network via the AP device 7 to communicate with other devices.

In addition, the controller 240 may transmit state information of the voice recognition apparatus 1 and a user's voice command to the voice recognition server system 1100 via the communication module 50.

Meanwhile, when a control signal is received via the communication module 50, the controller 240 may control the voice recognition apparatus 1 to operate in accordance with the received control signal.

The output unit 290 may include a display 13, which displays information corresponding to a user's command input, a processing result corresponding to the user's command input, an operation mode, an operation state, and an error state in the form of an image.

In some implementations, the display 13 may form an inter-layered structure with a touch pad to implement a touch screen. In this case, the display 13 may be used as an input device through which information can be input upon a user's touch, as well as an output device.

In addition, the output unit may further include an audio output unit 291 configured to output an audio signal. Under the control of the controller 240, the audio output unit 291 may output a warning sound, a operation state, a notification message indicative of an error state, information corresponding to a user's command input, and a processing result corresponding to the user's command input, and the like in the form of sound. The audio output unit 291 may convert an electric signal from the controller 240 into an audio signal, and output the audio signal. To this end, the audio output unit 291 may include a speaker.

Meanwhile, the voice recognition apparatus 1 may further include a manipulation unit 181 for receiving a user's input, and a camera 210 capable of capturing an image of an area within a specific range of the voice recognition apparatus 1.

The manipulation unit 181 may include a plurality of manipulation buttons, and transmit a signal corresponding to a pushed button to the controller 240.

The camera 210 may capture an image of an ambient or surrounding environment of the voice recognition apparatus 1, and a plurality of such cameras may be installed at each part for photographing efficiency.

For example, the camera 210 may include at least one optical lens, an image sensor (e.g., a CMOS image sensor) configured with a plurality of photodiodes (e.g., pixels) on which an image is formed by lights passing through the optical lens, and a Digital Signal Processor (DSP) configured to form an image based on signals output from the photodiodes. The DSP may generate not just a still image, but also a video composed of frames which constitute still images.

Meanwhile, an acquired image captured by the camera 210 may be stored in the memory 250.

Figure 41:
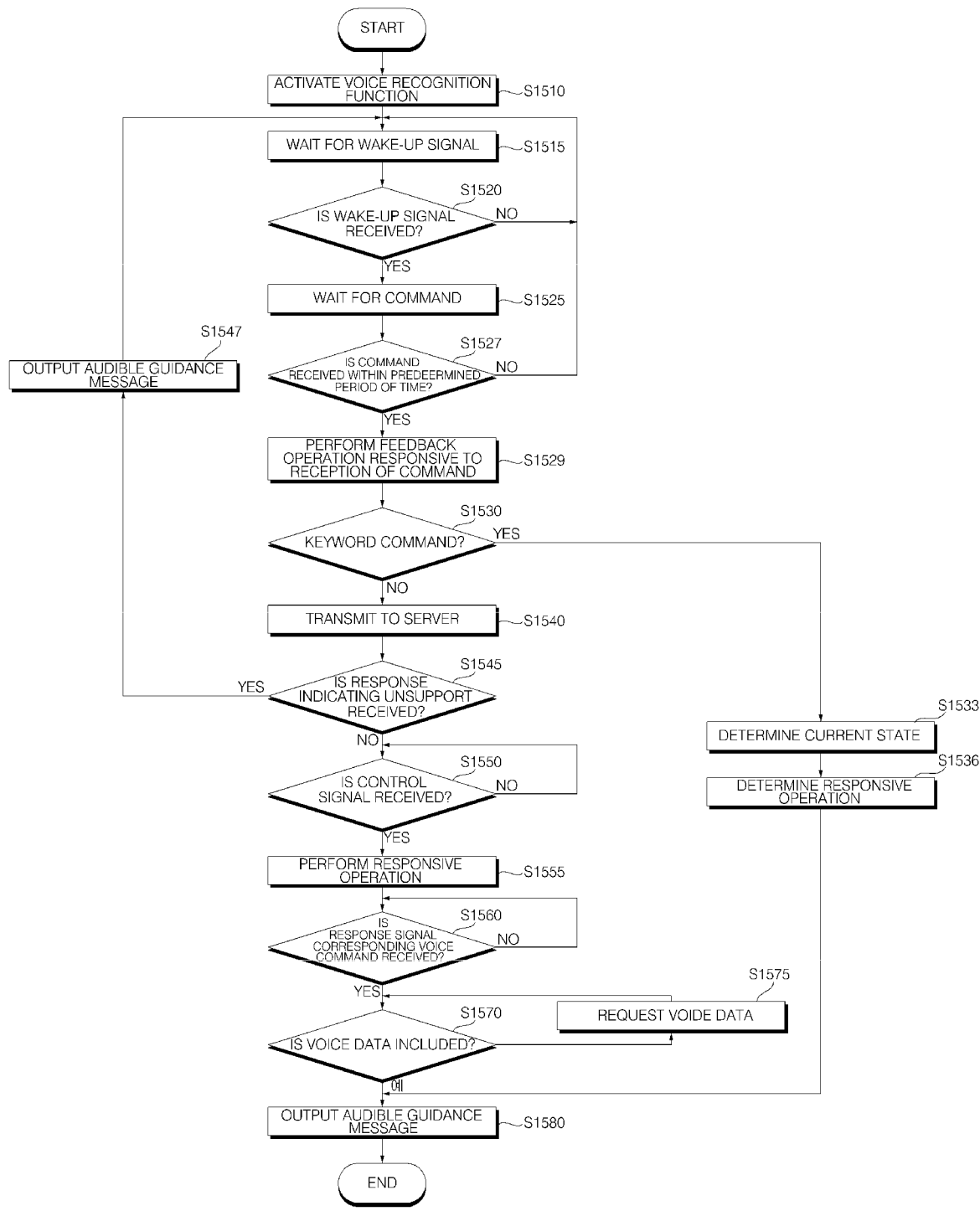
FIG. 41 is a flowchart illustrating a method for operating a home appliance according to an embodiment of the present invention.

FIG. 41 is a flowchart illustrating an operation method of a voice recognition apparatus according to an embodiment of the present invention.

Referring to FIG. 41, the voice recognition apparatus 1 may activate a voice recognition function upon a user input in S1510. Upon the user input, the home appliance of the voice recognition apparatus 1 may activate the microphones 221 and 222.

Alternatively, the voice recognition apparatus 1 may automatically activate a voice recognition function according to setting regarding activation of the voice recognition function.

For example, when power is on, the voice recognition apparatus 1 may automatically activate the microphones 221 and 222 and activate the voice recognition function.

If a user's voice input is received when the microphones 221 and 222 of a voice recognition apparatus are activated, the microphones 221 and 222 may receive an input voice and transmit the received voice to the controller 240.

Meanwhile, the voice recognition apparatus 1 may enter a wake-up signal standby mode for receiving a wake-up voice signal including a preset call word in S1515.

Meanwhile, when a wake-up voice signal including a preset call word is received via the microphone 221 or 222 in s1520, the voice recognition apparatus 1 may switch to a command standby mode for receiving a voice command in S1525.

If the voice recognition apparatus 1 always waits for a natural language command, it may be increased burden on power consumption for the voice recognition function, a CPU occupation rate, and loads on servers of the voice recognition server system.

Thus, the voice recognition apparatus 1 may transmit, to a server, only a voice signal received in the command standby mode.

In addition, the voice recognition apparatus 1 may set a condition for a command waiting time. When a command is received within the set time, the voice recognition apparatus 1 may receive sound until the completion of the command, and transmit the sound to a server.

According to one aspect of the present invention, the voice recognition apparatus 1 may perform a voice recognition process of up to the step of determining whether a call word voice is received, and other subsequent steps for voice recognition of a user's voice input may be performed by voice recognition server system 1100.

Meanwhile, the call word may be set by a manufacturer, or a different call word may be set for each voice recognition apparatus. For example, "LG Hub" may be set as a call word. In addition, the call word may be changed by a user.

Meanwhile, the controller 240 may perform control to transmit a user's voice command, received after recognition of a wake-up voice signal, to the voice recognition server system 1100 via the communication module 50 in S1540.

Meanwhile, waiting for a user's voice command for an unlimited period of time does not fit the intent of the user who does not input any command. Thus, the command standby mode may be set to process only a voice command received within a specific period of time in S1527.

Meanwhile, as described above, the voice recognition apparatus 1 according to an embodiment of the present invention may handle a keyword command including a simple command on its own and may support natural language processing-required voice control through the voice recognition server system 1100. The keyword command may mean a voice command including a specific keyword for controlling the voice recognition apparatus 1.

For example, the keyword command may include a keyword corresponding to a name of an operation, such as "Turn on Energy Saving", "Turn off Energy Saving", "Power off", and "Power on", or an operation content keyword.

In addition, the keyword command may include a command requesting a state information of the voice recognition apparatus 1, such as "consumption of electricity", "current state", and "operation state".

In addition, in some implementations, the keyword may be composed of only keywords corresponding to an exact name of a specific operation mode.

According to an embodiment of the present invention, the controller 240 may determine whether a coinciding command exists in a plurality of keyword commands stored in the memory 250 in S1530.

When a voice command received within a preset period of time corresponds to a prestored keyword command, the controller 240 may perform control to perform an operation corresponding to the keyword command in S1536.

When the keyword command is about a specific operation mode, the controller 240 may perform control to operate in the specific operation mode.

In this case, the controller 240 may determine the current operation state and control the voice recognition apparatus 1 in consideration of the determined current operation state in S1533.

For example, the controller 240 may finish operation of the current operation mode in response to receipt of a keyword command which is about the current operation mode, while controlling to operate in the specific operation mode in response to receipt of a keyword command which is not about the current operation mode.

If a keyword command including a keyword "Play music" is received in a standby mode, the voice recognition apparatus 1 may perform control to terminate the standby mode. That is, if a keyword command is about the current operation mode or function, the voice recognition apparatus 1 may determine that a user wishes to terminate the corresponding mode or function and may terminate the corresponding operation mode or function.

Alternatively, if a keyword command including a keyword "Play music" is received in a standby mode of the voice recognition apparatus 1, the controller 240 may turn on a music playback function and perform control to operate in a music playback mode.

When a user's voice input is received, the voice recognition apparatus 1 according to an embodiment of the present invention checks whether the voice input corresponds to a keyword command. If the keyword command is recognized, the voice recognition apparatus 1 may perform an operation corresponding to the voice command, without transmitting voice data including an audio file to the voice server 1110.

In addition, the controller 240 may control the audio output unit 291 so as to output an audible guidance message according to an operation corresponding to the keyword command in S1580.

To this end, the memory 250 may store an audio file of a guidance message for each keyword command.

Meanwhile, when a voice command received within a predetermined period of time does not correspond to a pre-stored keyword command, the controller 240 may perform control to transmit voice data including the voice command to the voice server 1110 in S1540.

Thus, for a natural language for which keyword command recognition is not possible, a natural-language voice control service may be provided through the voice recognition server system 1100 including the voice server 1110.

Therefore, according to this embodiment, if a user gives a command using a simply keyword, it is possible to respond to the command quickly without going through a server, and thus, the user's inconvenience may be minimized through keyword recognition that enables responding to a command quickly compared to natural-language voice control which takes a relatively long time.

In some implementations, when transmission of the voice data including the voice command to the voice server 1110 fails, the controller 240 may perform control to perform an operation corresponding to a keyword command which is most similar to the voice command.

In this case, an operation not intended by a user may be possibly performed, so, if the most similar keyword command is not deduced, an audible guidance message for notifying failure of transmission of the voice data may be output and a specific operation may not be performed.

In addition, depending on settings, the most similar keyword command is not determined despite failure of transmission, and an audible guidance message for notifying failure of transmission of the voice data is output and then the operation mode may switch to the wake-up signal standby mode or the command standby mode.

Meanwhile, if the voice command is not received within the preset period of time in S1527, the controller 240 may switch to the wake-up signal standby mode again.

In some implementations, when the voice command is received within the preset period of time in S1527, the controller 240 may perform control so that a feedback operation corresponding to receipt of the voice command is performed to notify that the voice recognition apparatus 1 has received the command.

Meanwhile, the voice server 1110 and the voice recognition server system 1100 may recognize and process voice data including a voice command received from the voice recognition apparatus 1, as described above with reference to FIGS. 31 to 29.

Accordingly, when the communication module 50 receives a control signal based on the voice command from the home appliance control server 1130 in S1550, the controller 240 may control the voice recognition apparatus 1 to operate in response to the received control signal in S1555.

In addition, when the communication module 50 receives a response signal based on the voice command from the voice server 1110 in S1560, the controller 240 may control the audio output unit 291 to output an audible guidance message corresponding to the response signal in S1580.

In some implementations, when the response signal does not include voice data in S1570, the controller 240 may perform control to request voice data from the voice server 1110 in S1575 and receive the requested voice data from the voice server 1110.

Meanwhile, according to a voice recognition result, a signal corresponding to voice recognition failure may be received from the voice server 1110 via the communication module 50. In this case, the controller 240 may control the audio output unit 291 to output an audible guidance message for requesting re-inputting of a voice command and to switch the operation mode to the command standby mode.

In addition, depending on a determination as to whether a determined voice command is supported, a signal for notifying that the voice command is about an unsupported function may be received from the voice server 1110 via the communication module 50 in S1545. In this case, the controller 240 may control the audio output unit 291 to output an audible guidance message for notifying that the voice command is about an unsupported function in S1547.

In this case, the controller 240 may perform control to switch to the wake-up signal standby mode.

Alternatively, the controller 240 may perform control to switch to the command standby mode again.

Meanwhile, when a voice command in voice data corresponds to a pre-stored keyword command, the controller 240 of the voice recognition apparatus 1 performs control to perform an operation corresponding to the keyword command. When the voice command in the voice data does not correspond to a pre-stored keyword command, the controller 240 of the voice recognition apparatus 1 may perform control to transmit the voice data including the voice command to a server system.

Meanwhile, when transmission of voice data including a voice command fails, the controller 240 of the voice recognition apparatus 1 may perform control to perform an operation corresponding to a keyword command which is most similar to the voice command.

Meanwhile, when a signal corresponding to voice recognition failure is received from the voice server, the controller 240 of the voice recognition apparatus 1 may perform control to output an audible guidance message for requesting re-inputting of a voice command.

Meanwhile, when a signal notifying that a voice command is about an unsupported function is received from the voice server, the controller 240 of the voice recognition apparatus 1 may perform control to output an audible guidance message for notifying that the voice command is about an unsupported function.

The pre-stored keyword command may be updated based on update data received from the server system 100.

Meanwhile, when an error occurs in any one of the ASR server, the NLP server, and the associated service server within the server system 100, the controller 240 of the voice recognition apparatus 1 may perform control to output a corresponding waiting guidance comment.

According to the present invention, as an audible guidance message suitable for each situation are provided, it is possible to accurately find out which problem disrupts the normal operation at which step of a voice control command process. In addition, it increases freedom of a command for controlling a product, thereby improving usability of the product.

Figure 42:
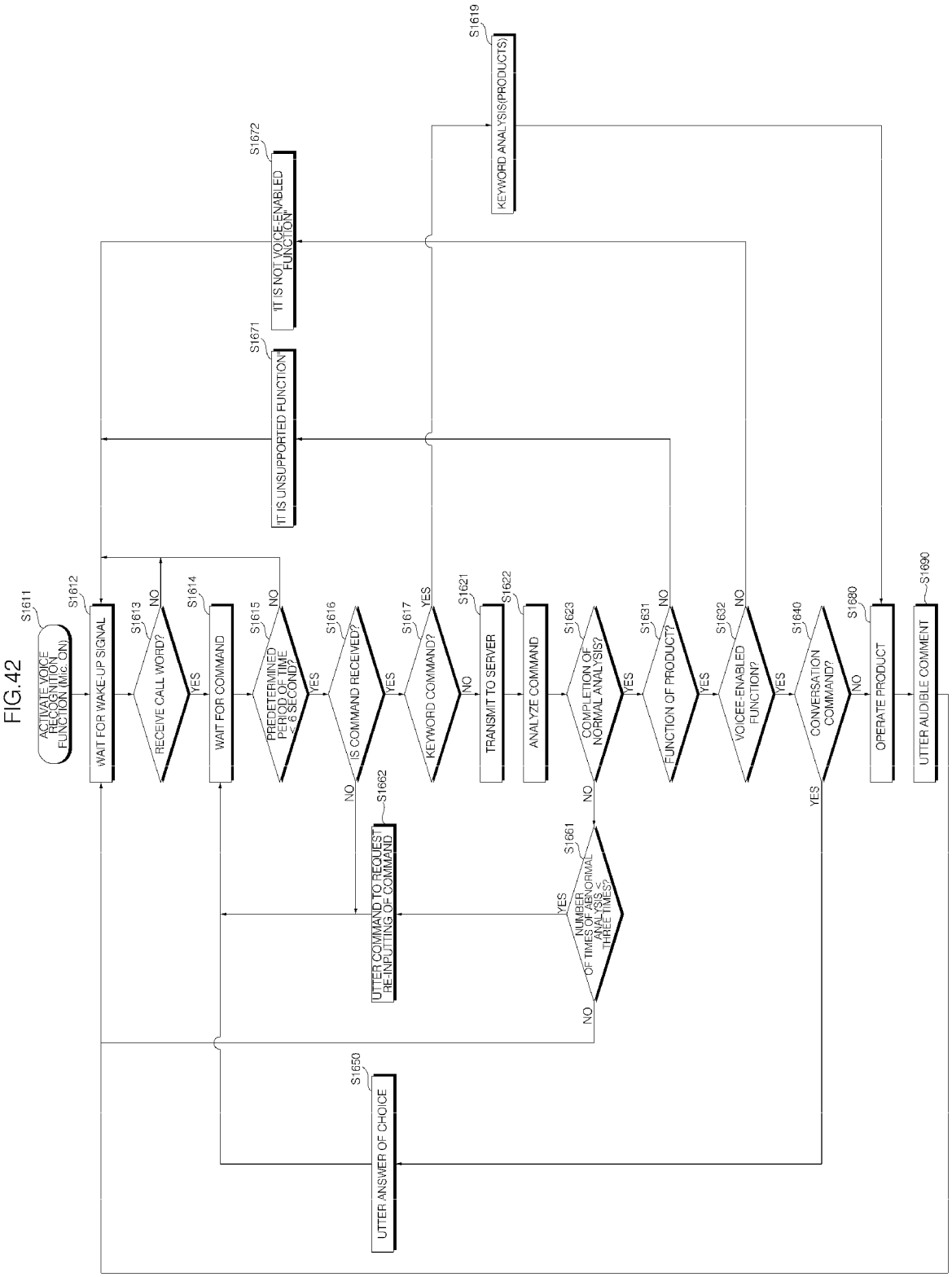
FIG. 42 is a flowchart illustrating a method for operating a smart home system including a voice recognition server system and a voice recognition apparatus according to an embodiment of the present invention.

FIG. 42 is a flowchart illustrating an operation method of a smart home system including a voice recognition server system and a voice recognition apparatus according to an embodiment of the present invention.

Referring to FIG. 42, the voice recognition apparatus 1 may activate a voice recognition function in S1611 to enter the wake-up signal standby mode for receiving a wake-up voice signal including a preset call word in S1612.

When a preset call word, such as "LG Hub", is received via the microphone 221 or 222 in S1613, the voice recognition apparatus 1 may switch to the command standby mode for receiving a voice command in S1614.

Alternatively, if one of the contact switches 181a, 181b, 181c, and 181d is operated, the voice recognition function is activated in S1611 and the voice recognition apparatus 1 may switch to a command standby mode for receiving a voice command in S1614.

The command standby mode may be set to process only a voice command received within a specific period of time in S1615. For example, the specific period of time may be set to six seconds.

The controller 240 may perform control to transmit voice data, including a voice command received within the six seconds, to the voice server 1110 in S1621.

Meanwhile, if the voice command is not received within the preset period of time in S1621, the controller 240 may perform control to switch to the wake-up signal standby mode again.

According to one aspect of the present invention, the voice recognition apparatus 1 may perform a voice recognition process up to the stage of receiving a call word, and other following stages of the voice recognition process with respect to a user's voice input may be performed by the voice recognition server system 1100.

Alternatively, according to one aspect of the present invention, the voice recognition apparatus 1 may perform a voice recognition process for determining whether a call word voice is received and determining whether a voice command corresponds to a keyword command, and the voice recognition server system 1100 may perform other following steps of a voice recognition process with respect to a user's voice input.

In this case, the controller 240 may determine whether there is a coinciding keyword command in a plurality of keywords stored in the memory 250 in S1617.

When a voice command received within a preset period of time corresponds to a pre-stored keyword command, the controller 240 may analyze the keyword command in S1619 and perform control to perform an operation corresponding to the keyword command in S1680.

When the keyword command is about a specific operation mode, the controller 240 may control the voice recognition apparatus 1 to operate in the specific operation mode in S1680.

In addition, the controller 240 may control the audio output unit 291 so as to output an audible guidance message according to an operation corresponding to the keyword command in S1690.

To this end, the memory 250 may store an audio file of an guidance message for each keyword command.

Meanwhile, when voice data including the voice command is received from the voice recognition apparatus 1 in S1621, the voice server 1110 may perform natural-language processing to analyze the voice command and determine the voice command in S1622.

When the voice command is not properly analyzed in S1623, the voice server 1110 may inform the voice recognition apparatus 1 of failure of the voice command analysis, and the voice recognition apparatus 1 may output an audible guidance message including a request for re-inputting of a command in S1662.

In this case, the procedure of, in response to failure of voice command analysis, requesting re-inputting of a command and analyzing a re-input command may be set to be performed by a preset number of times in S1661.

For example, if the normal analysis fails three times or more, the controller 240 does not request re-inputting of a command and instead may perform control to switch to the wake-up signal standby mode again.

Meanwhile, if the voice command is properly analyzed in S1623, the voice server 1110 may transmit a signal corresponding to the determined voice command to the associated service server 1120.

Meanwhile, the associated service server 1120 may determine whether the determined voice command is supported.

For example, the associated service server 1120 may determine whether the determined voice command is about a function supported by the voice recognition apparatus 1 in S1631.

In addition, the associated service server 1120 may determine whether the determined voice command is a function supported by the corresponding voice recognition apparatus 1 in the current state, that is, whether the determined voice command is a function that is enabled responsive to a voice command in S1632.

If the determined voice command is not a supported function, the associated service server 1120 may transmit, via the voice server 1110 to the voice recognition apparatus 1, a response signal indicating that the determined voice command is not a supported function, as described above FIGS. 31 to 39.

Accordingly, the voice recognition apparatus 1 may output an audible guidance message, such as "It is not a supported function" and "This is not a voice-enabled function", in S1671 and 1672.

In addition, the controller 240 may perform control to switch to the wake-up signal standby mode.

Meanwhile, when voice data including a voice command is received from the voice recognition apparatus 1 in S1621, the voice server 1110 may analyze the voice command by performing natural language processing and determine the voice command in S1622.

In this case, when the determined voice command is a conversation command having a plurality of responsive operations in S1640, the voice server 1110 may transmit a specific signal so that the voice recognition apparatus 1 utters a selective answer including a specific question as an audible guidance message in S1650. Accordingly, the voice recognition apparatus 1 may utter the selective answer including the specific question as an audible guidance message in S1650.

The conversation command may mean a command which enables a plurality of responsive operations after recognition of a voice such as "I can't hear clearly" and "Too loud".

For example, in the case of "I can't hear clearly", a plurality of operations, such as increasing set volume and changing music, may be determined to be responsive operations. In addition, in the case of increasing volume, a responsive operation may be performed by setting the set volume to any of various change values.

On the contrary, a command such as "Change volume to second level" has only one responsive operation for changing the set volume to a second level, and thus, this command may be referred to as a general command, not a conversation command.

Meanwhile, when the determined voice is a conversation command in S1640, the voice recognition apparatus 1 may output a question, which induces the user's selection and determination to narrow a range of selection, as an audible guidance message in S1650.

For example, when the user utters a conversation command "I can't hear clearly", the voice recognition apparatus 1 may ask a question such as "Do you want to volume up?" to narrow a range of selection so that the user simply selects either Yes or No.

If the user gives an answer "No" in response to the question "Do you want to volume up?" of the voice recognition apparatus 1, the voice recognition apparatus 1 may ask again a question "Do you want to play dance music?" to further narrow a range of selection.

If the user gives a negative answer "No" in response to the question "Do you want to play dance music?" of the voice recognition apparatus 1, the voice recognition apparatus 1 may ask again a question "Do you want to play ballad music?" that further narrows a range of selection.

By repeating the above procedure, it is possible to more precisely identify the user's natural-language input and thereby perform an exact operation desired by the user.

Meanwhile, If a determined voice command is about the voice recognition apparatus 1, the associated service server 1120 may perform a corresponding operation through communication with the home alliance control server 1130.

Alternatively, if the determined voice command is not about the voice recognition apparatus 1, the associated service server 1120 may perform a corresponding operation by communicating with an external service.

If the determined voice command is to control the voice recognition apparatus 1, the associated service server 1120 may generate a request signal corresponding to the determined voice command and transmit the request signal to the home appliance control server 1130.

The home appliance control server 1130 may receive the request signal from the associated service server 1120 and transmit a control signal based on the request signal to the voice recognition apparatus 1.

Meanwhile, the voice recognition apparatus 1 may perform a corresponding operation in accordance with the control signal received from the home appliance control server 1130 in S1680.

In addition, after performed a requested operation, the voice recognition apparatus 1 may transmit, to the home appliance control server 1130, a signal for notifying that the requested operation has been performed.

In addition, the home appliance control server 1130 may receive a response signal responsive to the control signal from the voice recognition apparatus 1, and transmit processing result information for notifying successful completion of the requested operation to the associated service server 1120.

The associated service server 1120 may transmit a signal corresponding to processing result information to the NLP server 1112. The NLP server 1112 may transmit a response signal based on the determined user command to the voice recognition apparatus 1.

Meanwhile, based on voice data received from the voice server 1110, the voice recognition apparatus 1 may output an audible guidance message including voice guidance in S1690.

FIGS. 43 to 48 are diagram for explaining various operations of a voice recognition server system and a voice recognition apparatus according to an embodiment of the present invention.

FIGS. 43 to 48 shows various examples of operations of an air conditioner in response to a user's keyword voice command and natural-language voice command.

Figure 43:
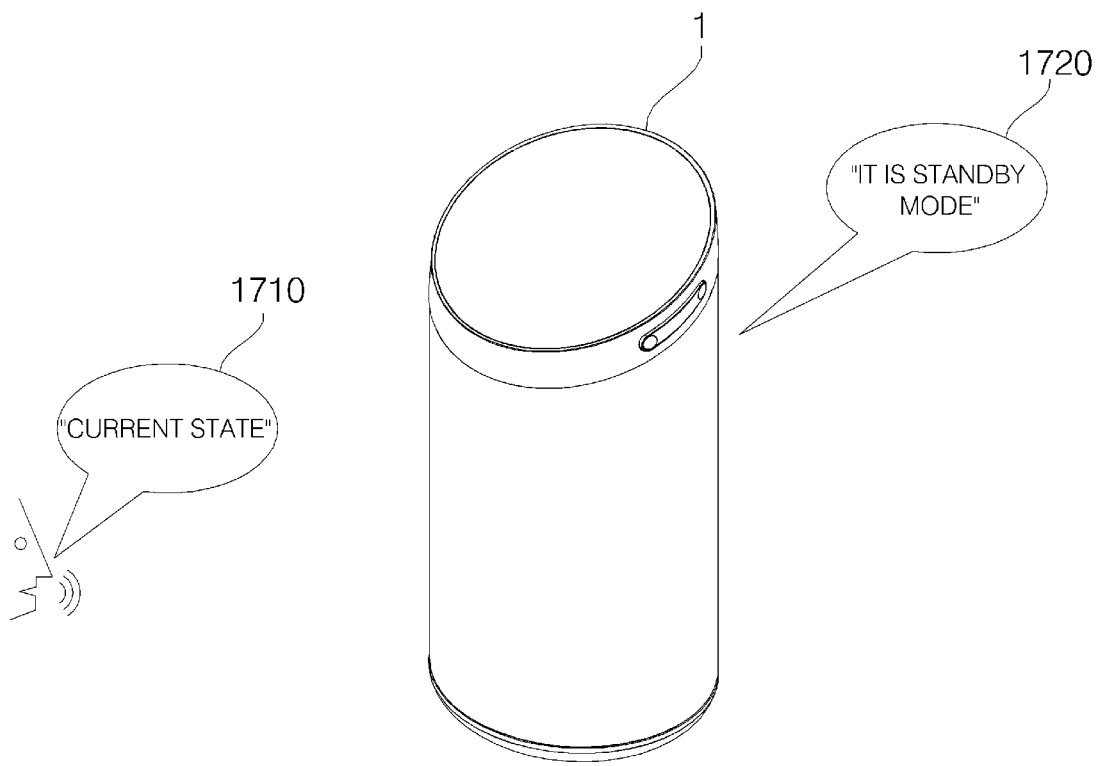
FIGS. 43 to 48 shows various examples of operations of an air conditioner in response to a user's keyword voice command and natural-language voice command.

Referring to FIG. 43, a user may input a voice command 1710 such as "current state". Having received the user's voice command 1710 through the microphone 221 or 222, the voice recognition apparatus 1 may determine whether there is a keyword command corresponding to the voice command 17101

If a command, such as "current state" or "operational state" for requesting state information of the voice recognition apparatus 1 exists in the form of a key word in the memory 250, the voice recognition apparatus 1 may immediately check state information without going through the voice recognition server system 1100 and may output an audible guidance message 1720 including state information, such as "It is standby mode".

Accordingly, it is possible to provide state information of the voice recognition apparatus 1 more quickly than when going through a server.

Figure 44:
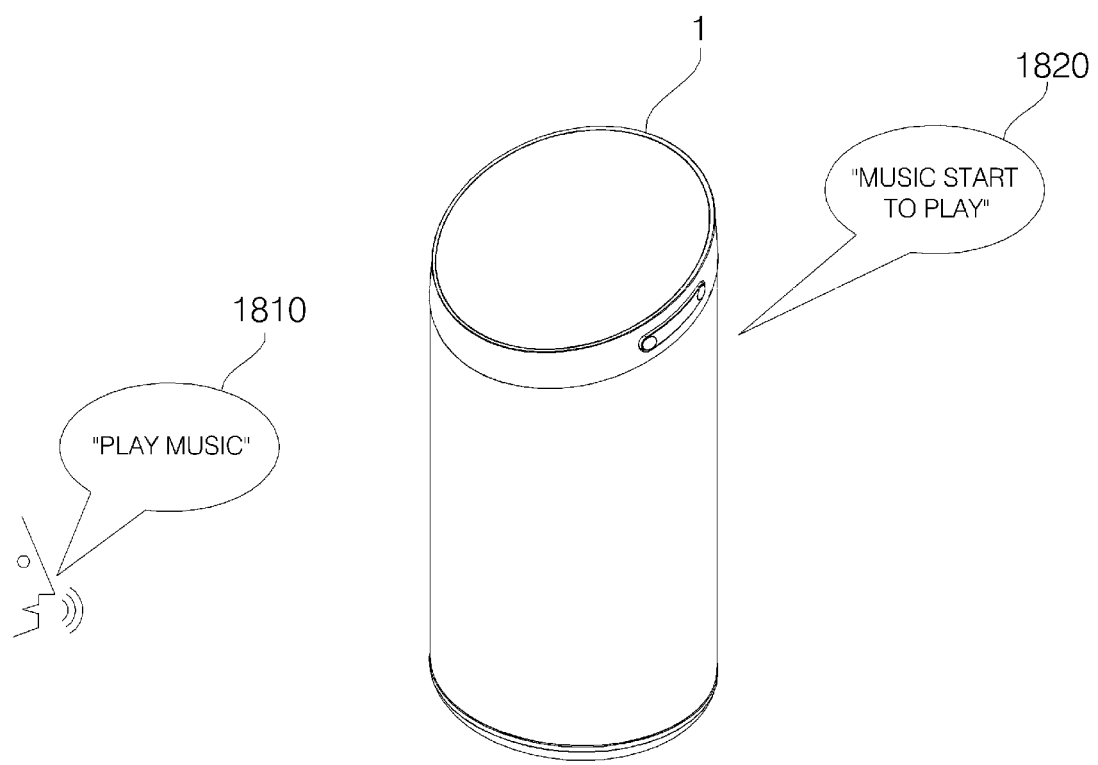

Referring to FIG. 44, a user may input a voice command 1810 including a keyword such as "Play music". Having received the user's voice command 1810 through the microphone 221 or 222, the voice recognition apparatus 1 may determine whether there is a keyword command corresponding to "Play music".

If "Play music" exists in the form of a keyword command in the memory 250, the voice recognition apparatus may immediately execute a music playback function without going through the voice recognition server system 1100 and output an audible guidance message 1820 such as "Music start to play".

Figure 45:
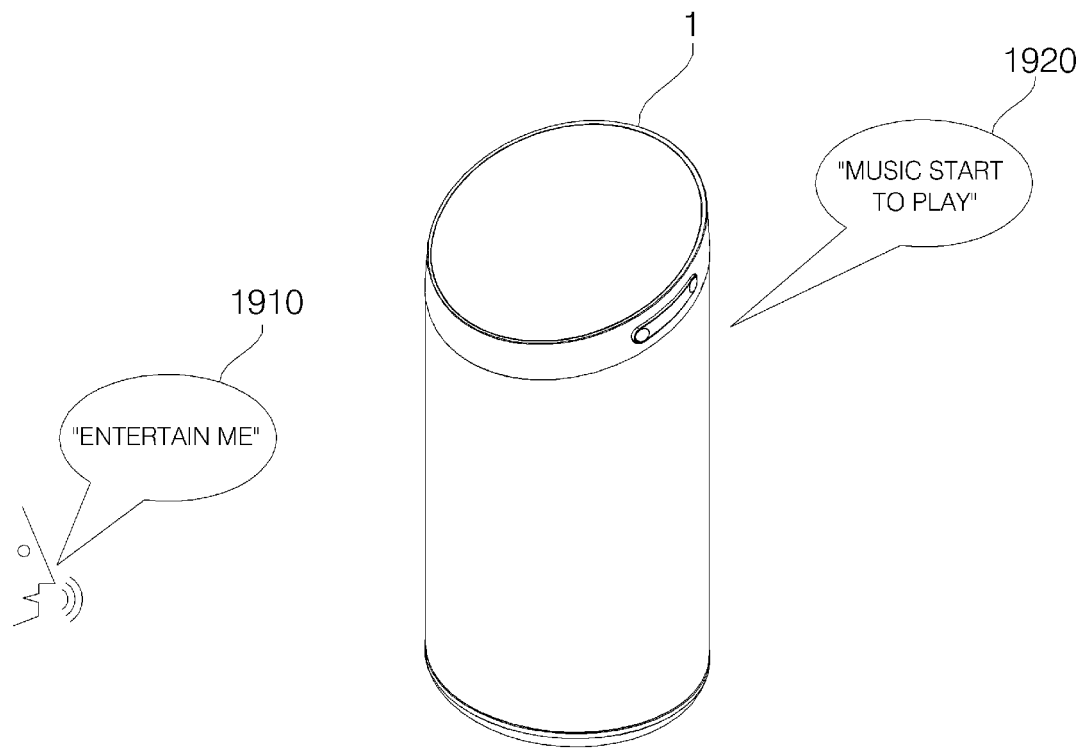

Referring to FIG. 45, a user may input a natural-language voice command 1910 such as "Entertain me". Having received the user's voice command 1910 through the micro phone 221 or 222, the voice recognition apparatus 1 may transmit the voice command 1910 to the voice recognition server system 1100.

The voice recognition server system 1100 may determine the user's intent of playing music, by analyzing the received voice command 1910. Accordingly, the voice recognition server system 1100 may transmit, to the voice recognition apparatus 1, a control signal instructing playing music and a response signal corresponding to the corresponding operation.

Figure 46:
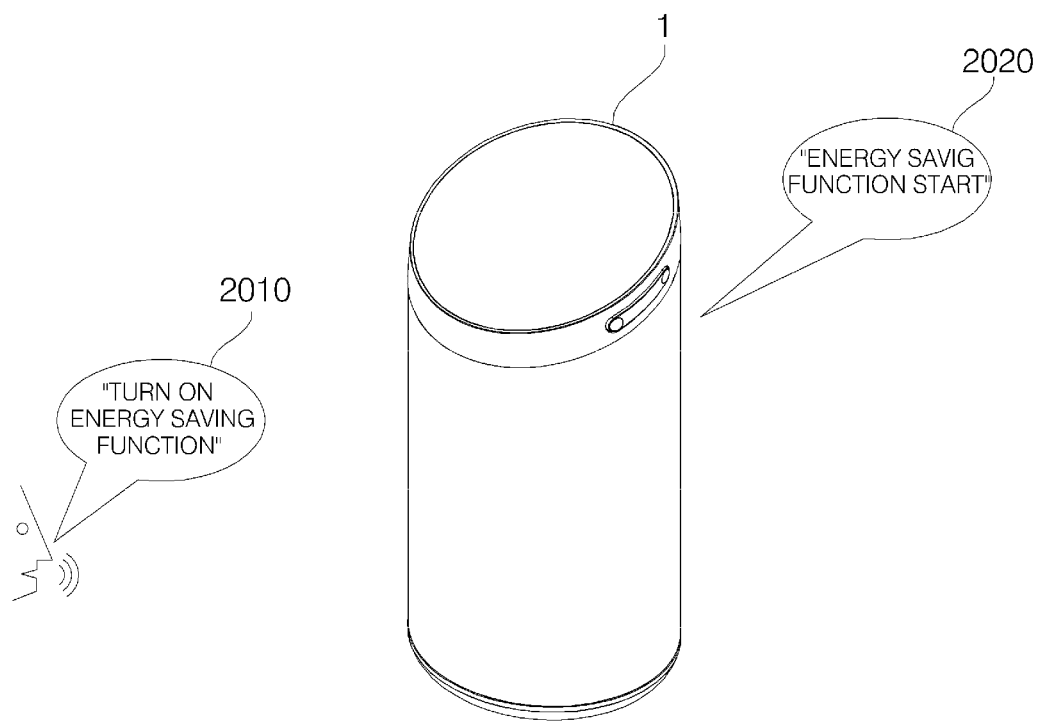

The voice recognition apparatus 1 may execute a music playback function and output an audible guidance Referring to FIG. 46, a user may input a keyword command 2010 including a keyword corresponding to a specific operation, such as "Energy saving function" or "Turn on Energy saving function". Having received the keyword command 2010 through the microphone 221 or 222, the voice recognition apparatus 1 may immediately execute the energy saving function and output an audible guidance message 2020 such as "Energy saving function start".

Figure 47:
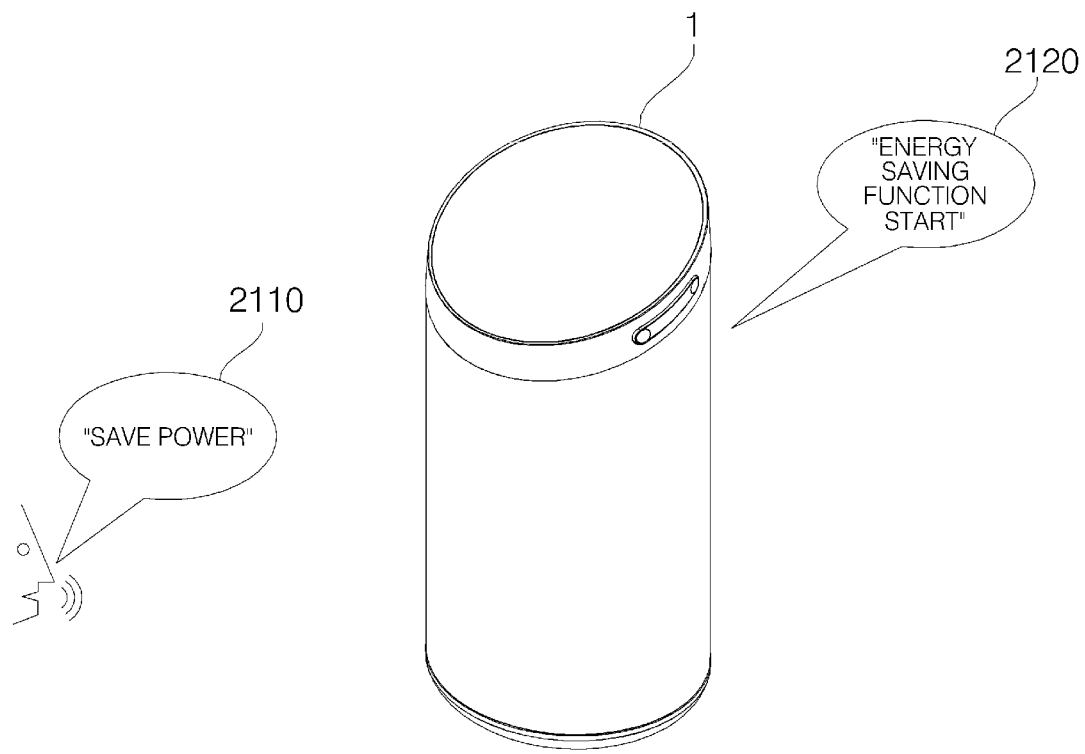

Referring to FIG. 47, a user may input a natural-language voice command 2110 such as "Save power". Having received the user's voice command 2110 through the microphone 221 or 222, the voice recognition apparatus 1 may transmit the voice command 2110 to the voice recognition server system 1100.

The voice recognition server system 1100 may analyze the received voice command 2110 so as to determine the intent of the user who wishes an energy saving function. Accordingly, the voice recognition server system 1100 may transmit, to the voice recognition apparatus 1, a control signal for executing the energy saving function and a response signal corresponding to a corresponding operation.

The voice recognition apparatus 1 may execute the energy saving mode and output an audible guidance message 2120, such as "Energy saving function starts."

Meanwhile, the voice recognition server system 1100 according to an embodiment of the present invention may perform a corresponding operation through communication with an external service 121 when a determined voice command is not related to the voice recognition apparatus 1.

Figure 48:
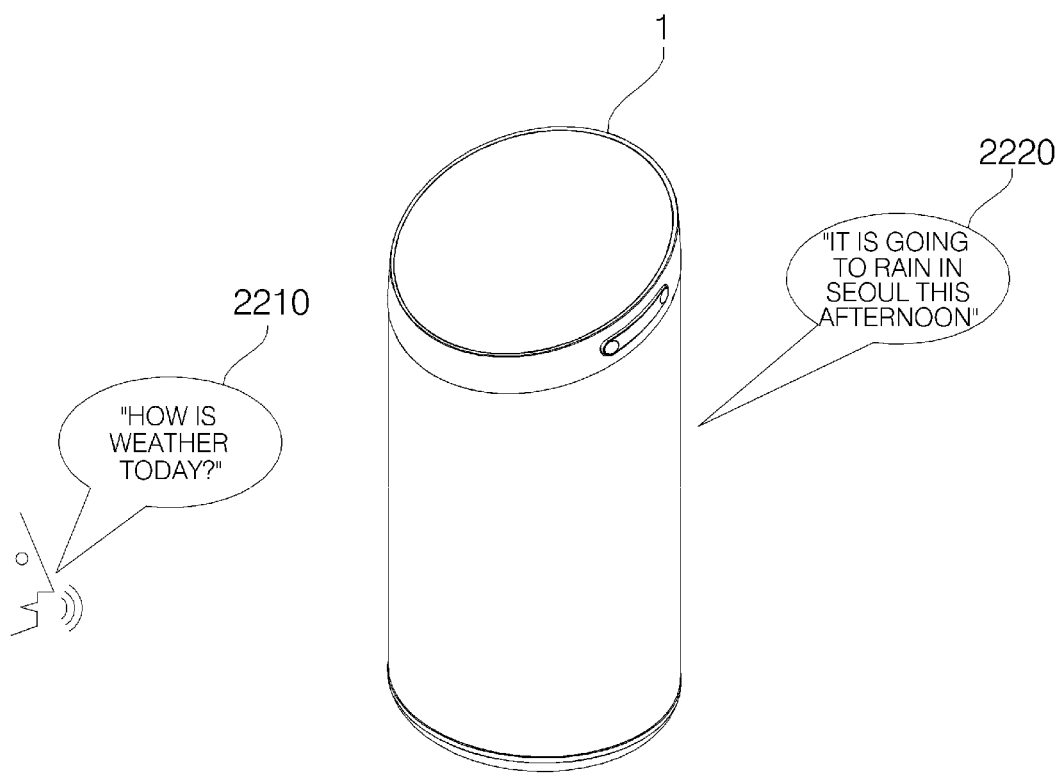

Referring to FIG. 48, a user may input a natural-language voice command 2210 such as "How is weather today?". After receiving the user's voice command 2210 through the microphone 221 or 222, the voice recognition apparatus 1 may transmit the voice command 2210 to the voice recognition server system 1100.

The voice recognition server system 1100 may analyze the received voice command 2210 and determine the user's intent of desiring weather information. Accordingly, the voice recognition server system 1100 may request and receive weather information by accessing an external service or an Internet network which provides the weather information.

In addition, the voice recognition server system 1100 may transmit data based on the received weather information to the voice recognition apparatus 1.

Based on the received data, the voice recognition apparatus 1 may output an audible guidance message 2220 including weather information such as "It is going to rain in Seoul this afternoon".

FIG. 49 is a flowchart illustrating an operation method of a voice recognition apparatus according to another embodiment of the present invention, and FIGS. 50A to 51F are diagrams illustrating the operation method of FIG. 49.

Referring to the drawing, the controller 240 determines whether a voice recognition mode is activated in S2310.

For example, when a voice recognition mode button 231 in the manipulation unit 230 of the voice recognition apparatus 1 is manipulated, the controller 240 of the voice recognition apparatus 1 may perform control to activate the voice recognition mode.

Meanwhile, when the voice recognition mode is activated, the controller 240 may perform control to supply power to the audio input unit 220.

Next, the controller 240 may determine whether a voice input is received within a first period of time in the activated voice recognition mode in S2315.

If a voice input is received, the audio input unit 220 of the voice recognition apparatus 1 may receive the user's voice, and, in turn, the voice may be converted into an electrical signal and voice data may be output.

The voice data may include a call word. For example, the call word may be, for example, "LG Hub".

Meanwhile, the voice data may include a keyword command or a natural-language command after the call word.

Next, the controller 240 of the voice recognition apparatus 1 may determine whether a keyword is included in received voice data in S2320.

If a keyword is included in the received voice data, the controller 240 of the voice recognition apparatus 1 may perform control to output sound corresponding to the keyword in S2350. In addition, when a keyword is included in the received voice data, the controller 240 of the voice recognition apparatus 1 may perform control to operate an operation corresponding to the key word in S2355.

The keyword command is a command corresponding to a voice pre-stored in the memory 250 of the voice recognition apparatus 1. For example, the keyword command may be a command, such as "Power on", "Power off", and "Energy saving operation", which corresponds to the manipulation unit 230 of the voice recognition apparatus 1.

The controller 240 of the voice recognition apparatus 1 may compare voice data received through the audio input unit 220 and with keywords stored in the memory 250. If the voice data coincides with any keyword stored in the memory, the controller 240 may determine that the voice data is a keyword command, determine the voice data, and perform control to perform an operation corresponding to the keyword.

In one example, if a keyword such as "Power on" is included in voice data, the controller 240 of the voice recognition apparatus 1 may turn on power of the voice recognition apparatus 1 in the standby mode. In particular, the controller 240 may perform control to supply power to the audio output unit which requires the greatest power consumption.

In another example, if a keyword such as "Power off" is included in voice data, the controller 240 of the voice recognition apparatus 1 may turn off power of the voice recognition apparatus 1 in the operation mode state.

In yet another example, if a keyword such as "Turn on energy saving function" is included in voice data, the controller of the voice recognition apparatus 1 may control the voice recognition apparatus 1, which is now in the operation mode state, to operate in the energy saving mode state. For example, the controller 240 of the voice recognition apparatus 1 may perform control to reduce an operation time of the audio output unit which requires the greatest power consumption.

If a keyword command is included in voice data, the controller 240 of the voice recognition apparatus 1 may perform control to output sound, corresponding to the keyword command, through the audio output unit 291.

For example, if a keyword command, such as "Power on", "Power off", and "Energy saving operation", is received, the controller 240 of the voice recognition apparatus 1 may perform control to output sound such as "Power will be on", "Power will be off", and "Energy saving operation will start".

Meanwhile, if a keyword is not included in received voice data, the controller 240 of the voice recognition apparatus 1 may determine whether connection with the server system 1100 is unstable in S2325.

If the connection with the server system 1100 is unstable, that is, if communication with the server system 1100 is not smooth, the controller 240 of the voice recognition apparatus 1 may perform control to output a pre-stored waiting guidance message in S2360.

For example, if an error occurs in the ASR server 1111, the NLP server 1112, the associated service server 1120 within the server system 1100, the controller 240 may perform control to output a corresponding waiting guidance message. Detailed description thereof will be provided with reference to FIGS. 51A to 51F.

Meanwhile, if conditions for the steps S2320 and 2325 are all unsatisfied, the controller 240 may transmit voice data to the server system 1100 in S2330.

In this case, the controller 240 may perform control to add data for transmission to the communication module 50 to voice data received from the audio input unit 220.

Next, the controller 240 of the voice recognition apparatus 1 may receive result data corresponding to the transmitted voice data from the server system 1100 in S2335.

The received result data may be voice data for utterance, which is transmitted by the server system 1100 in response to the transmitted voice data.

Meanwhile, in addition to the voice data for utterance transmitted by the server system 1100, the received result data may further include operation data on an operation of the voice recognition apparatus 1 responsive to the voice data for utterance transmitted by the server system 1100.

Accordingly, based on the received result data, the controller 240 of the voice recognition apparatus 1 may perform control to output sound corresponding to the received result data through the audio output unit 291 in S2340.

Accordingly, it is possible to output voice data for utterance, which corresponds to a user's natural-language voice, through the voice recognition apparatus 1, thereby improving convenience for the user.

Meanwhile, when operation data on an operation of the voice recognition apparatus 1 is received as the received result data, the controller 240 of the voice recognition apparatus 1 may control the driving unit 280 to operate based on the operation data on the operation of the voice recognition apparatus 1 in S2345.

Hereinafter, operations performed by a keyword command and a natural-language command will be described in comparison.

Figure 50A:
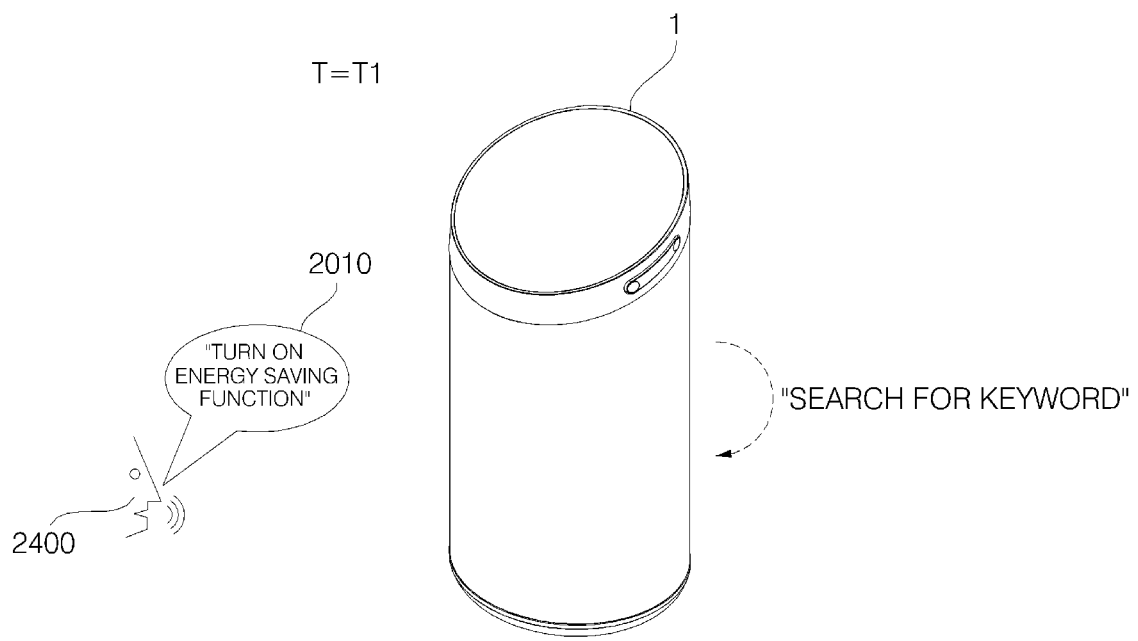
FIGS. 50A to 51F are diagrams illustrating the operation method of FIG. 49.

FIG. 50A shows an example in which a keyword 2010 such as "Turn on energy saving function". Accordingly, the controller 240 of the voice recognition apparatus 1 may search for a pre-stored keyword and match the found keyword with voice data of "Turn on energy saving function".

Upon completion of analysis, the controller 240 of the voice recognition apparatus 1 may perform control to execute an energy saving function. Then, the controller 240 may perform control to output a guidance comment such as "Energy saving function will start"

Meanwhile, in order to perform an energy saving operation, the controller 240 of the voice recognition apparatus 1 may perform control to reduce an operation period of the audio output unit 291.

Figure 50B:
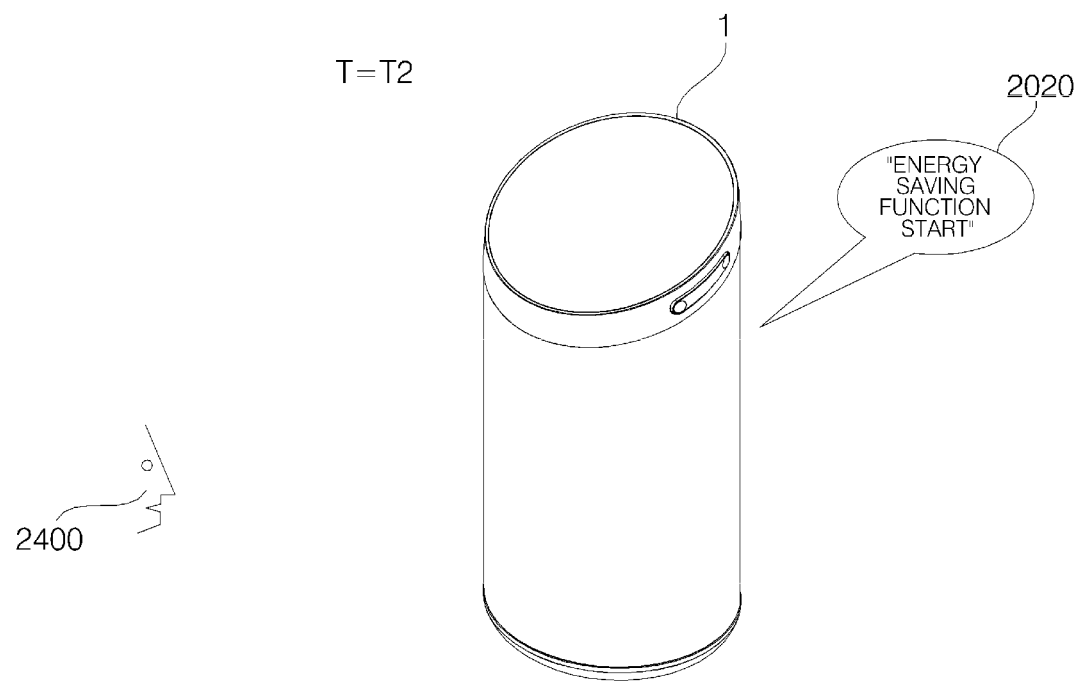
Figure 50C:
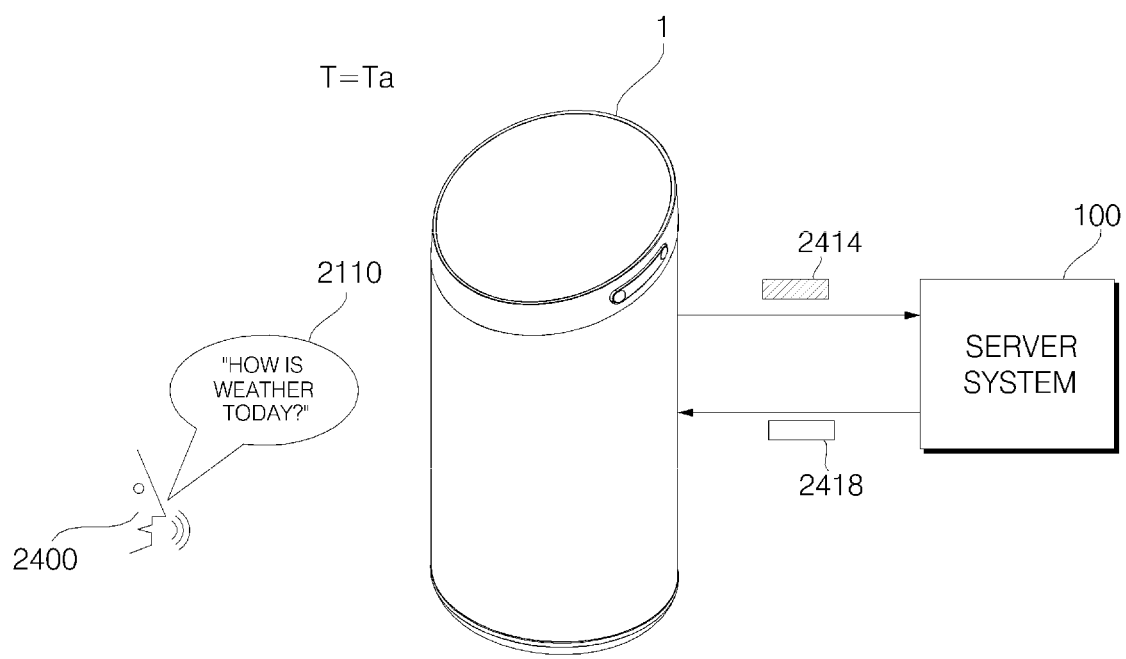

FIG. 50C shows an example in which a natural language 2110 such as "How is weather today?" is uttered.

The controller 240 of the voice recognition apparatus may search for a pre-stored keyword and match the found keyword with voice data of "How is weather today?". If the keyword does not match the voice data, the controller 240 may determine that the voice data is a natural language.

If the voice data is determined to be a natural language, the controller 240 of the voice recognition apparatus 1 may perform control to transmit voice data 2414 corresponding to a natural language 1910 to the server system 1100 for the purpose of voice recognition, as shown in FIG. 50C.

Then, the controller 240 may receive result data 2418 from the server system 1100.

Meanwhile, after the result data is received, the controller 240 of the voice recognition apparatus 1 may perform control to output an audible guidance message 2120 including weather information, such as "It is going to rain in Seoul this afternoon", based on the received data.

Figure 50D:
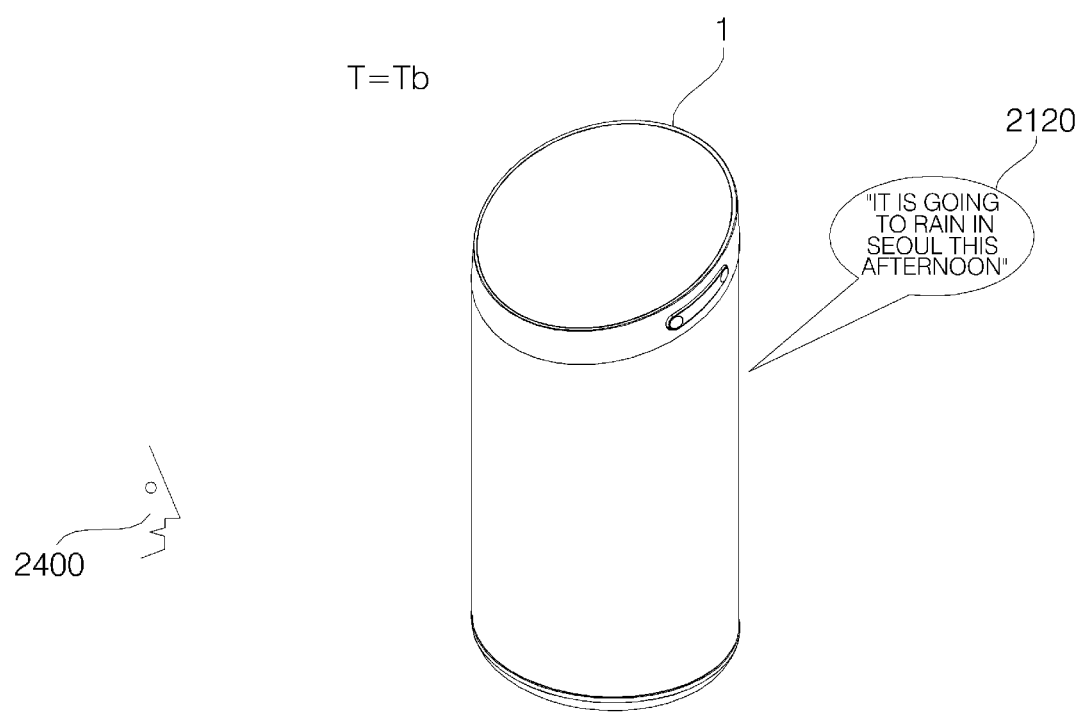
Figure 50E:
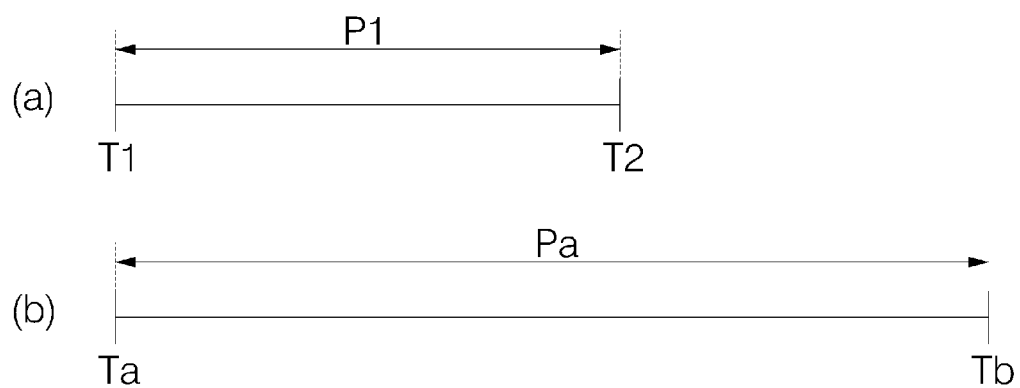

FIG. 50E is a diagram for comparing a first period P1, which is from a time T1 of uttering a keyword until a time T2 of outputting a comment in response to the keyword in FIGS. 50A and 50B, and a second period Pa which is from a time Ta of uttering a natural language until a time Tb of outputting a comment in response to the natural language in FIGS. 50C and 50D.

Referring to the drawings, the keyword recognition period P1 is shorter than the natural language recognition period P2.

As in the present invention, as a simple keyword command is recognized by the voice recognition apparatus 1 on its own, it is possible to perform operation of the voice recognition apparatus 1 quickly. In addition, as a complicated natural language command is recognized through the external server system 1100, it is possible to precisely recognize the natural language as well.

FIGS. 51A to 51F shows examples of comments which is output by a voice recognition apparatus, especially the voice recognition apparatus 1, in the case where result data is not smoothly received from the server system 1100.

Figure 51A:
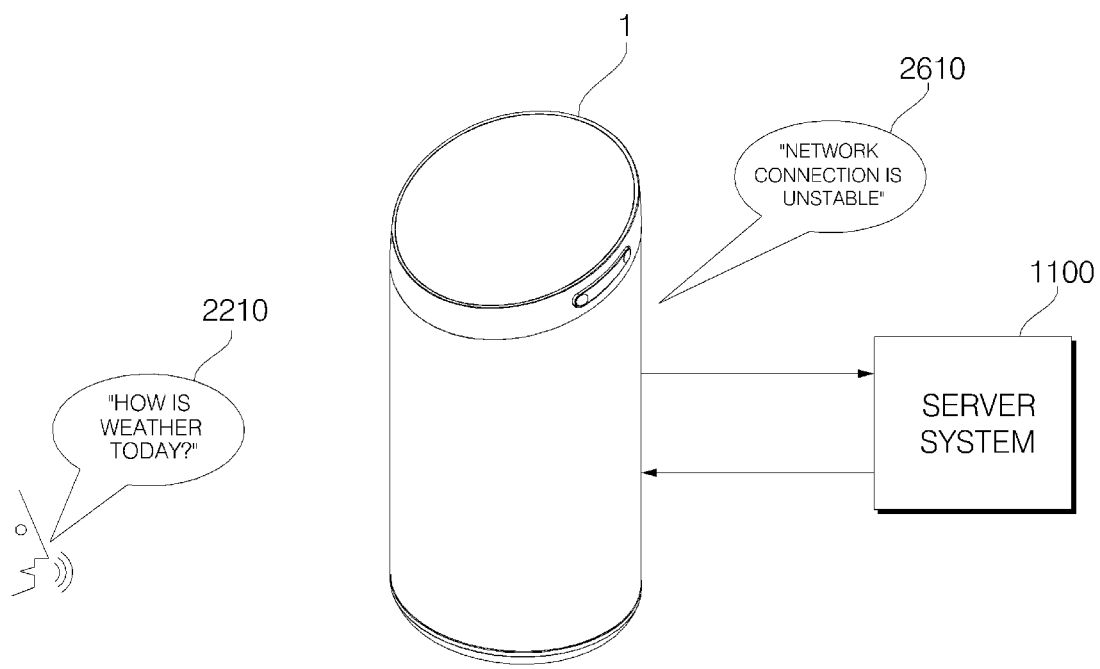

FIG. 51A shows non-established network connection between the voice recognition apparatus 1 and the server system 1100 when transmission of voice data corresponding to a natural language 2210 is attempted.

Accordingly, the controller 240 of the voice recognition apparatus 1 may perform control to output an audible comment 2610 such as "Network connection is unstable".

Figure 51B:
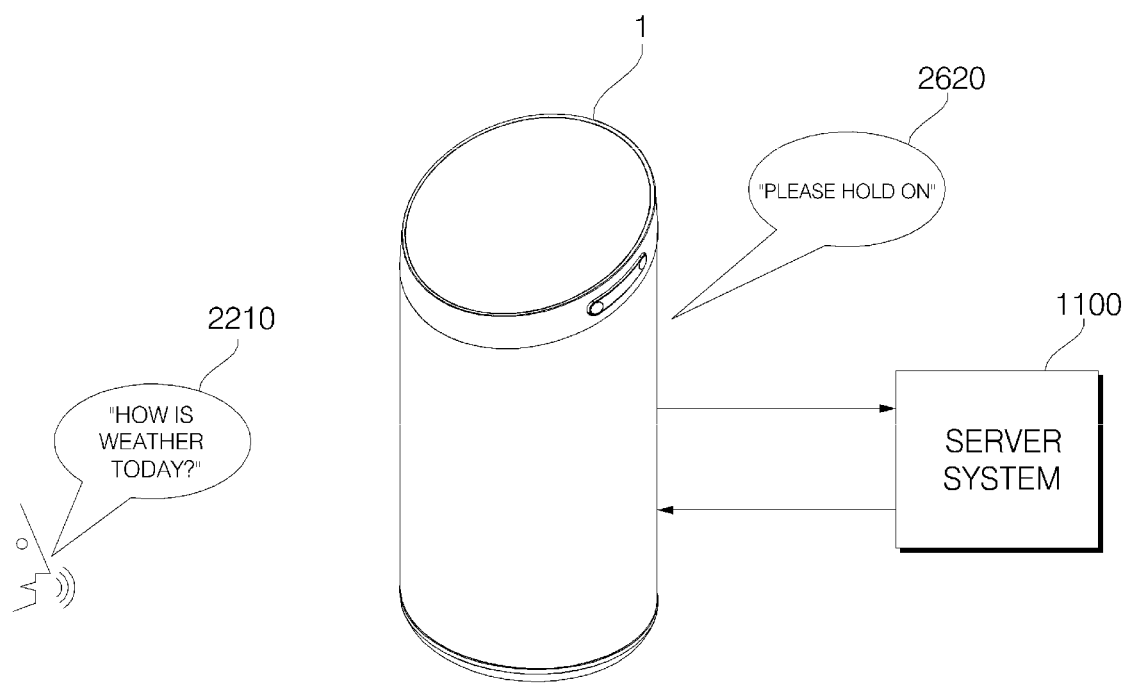

FIG. 51B shows unstable network connection between the voice recognition apparatus 1 and the server system 1100 when transmission of voice data corresponding to a natural language 2210 is attempted.

Accordingly, the controller 240 of the voice recognition apparatus 1 may perform control to output a guidance comment 2620 such as "Please hold on".

Figure 51C:
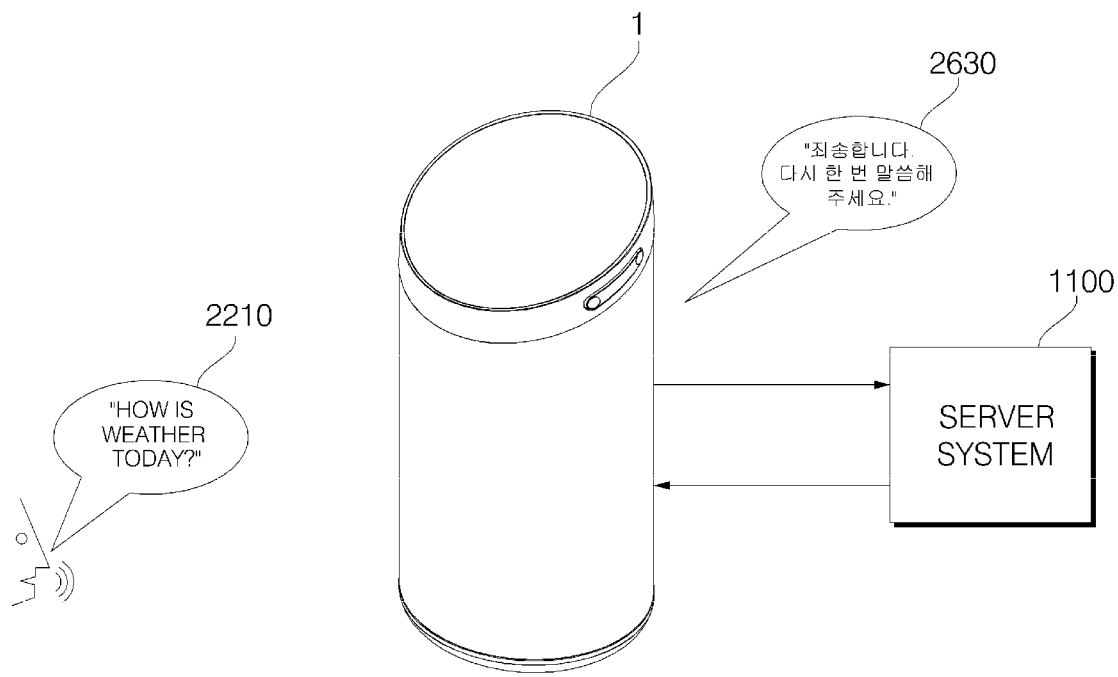

FIG. 51C shows delay status of the ASR server 1111 in the server system 1110 when transmission of voice data corresponding to a natural language 2210 is attempted.

Accordingly, the controller 240 of the voice recognition apparatus 1 may perform control to output a guidance comment 2630 such as "Sorry. Please speak again".

Figure 51D:
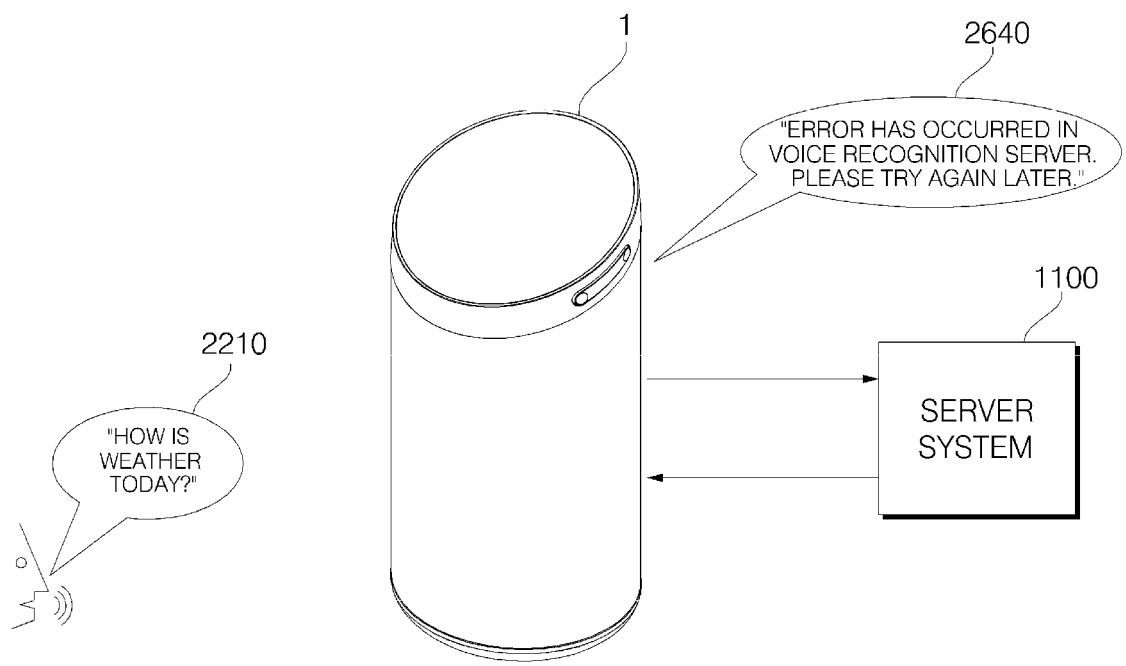

FIG. 51D shows delay status of the NLP server 1112 in the server system 1100 when transmission of voice data corresponding to a natural language 2210 is attempted.

Accordingly, the controller 240 of the voice recognition apparatus 1 may perform control to output a guidance command such as "Error has occurred in the voice recognition server. Pleas try again later."

Figure 51E:
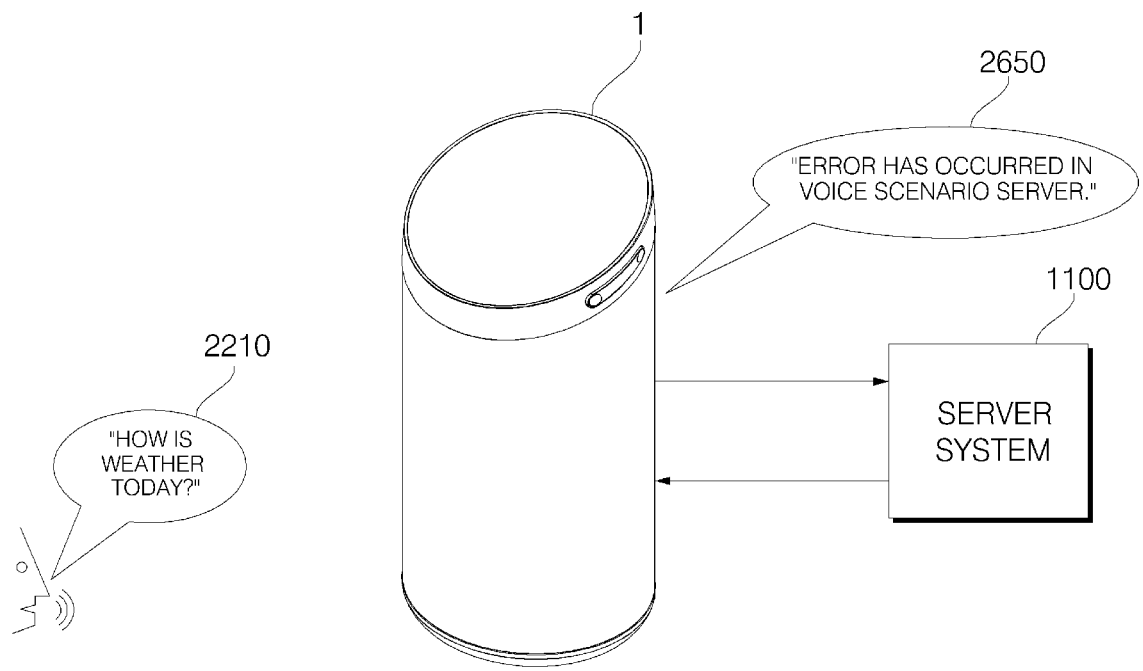

FIG. 51E shows bug status of the associated service server 1120 in the server system 1100 when transmission of voice data corresponding to a natural language 2210 is attempted.

Accordingly, the controller 240 of the voice recognition apparatus 1 may perform control to output a guidance comment 2650 such as "Error has occurred in a voice scenario server".

Figure 51F:
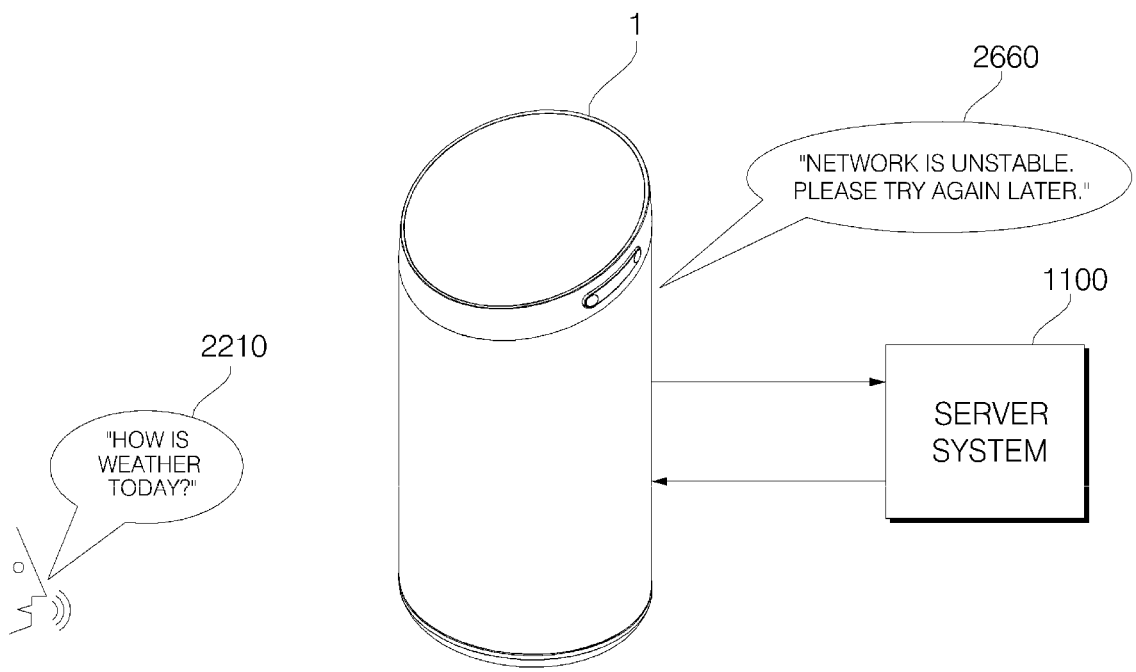

FIG. 51F shows delay status of the associated service server 1120 in the server system 1100 when transmission of voice data corresponding to a natural language 2210 is attempted.

Accordingly, the controller 240 of the voice recognition apparatus 1 may perform control to output a guidance comment 2660 such as "Network is unstable. Please try again later."

As such, a different comment is output depending on a condition, and therefore, a user is able to indirectly check a status of the server system 1100.

Meanwhile, the voice recognition apparatus 1 may receive status data of the server system 1100 in response to an error in the server system 1100, except for when where network connection is not established. Accordingly, various comments shown in FIGS. 51B to 51F may be output.

The voice recognition apparatus and the voice recognition method according to the present invention are not limited to the configurations and methods of the above embodiments, and the embodiments may vary as all or some of the embodiments are selectively combined.

The operation method of the voice recognition apparatus according to the present invention may be implemented as code which is provided in the voice recognition apparatus and which can be written on a computer-readable medium in which a program is recorded and thus read by a computer. The computer-readable medium includes all kinds of recording devices in which data is stored in a computer-readable manner.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A voice recognition apparatus comprising:
a main body;
a cover housing coupled to an upper side of the main body;
a grill provided with a plurality of through-holes, formed in a vertically long cylindrical shape, and to surround the main body;
an audio input device configured to receive a voice;
a communication transceiver disposed in the main body and configured to transmit voice data received from the audio input device to a server system, which performs voice recognition processing, and receive recognition result data on the voice data from the server system;
a controller electrically connected to the audio input device and the communication transceiver, and configured to control the audio input device and the communication transceiver; and
a window provided inside the cover housing and including at least one voice passage hole,
wherein an upper surface of the main body is formed as a slope having a front portion at a low height and a rear portion at a high height, and the slope is disposed parallel to the window,
wherein, when a voice command in the voice data corresponds to a pre-stored keyword command, the controller performs control to perform an operation corresponding to the pre-stored keyword command,
wherein when the voice command in the voice data does not correspond to the pre-stored keyword command, the controller performs control to transmit the voice data including the voice command to the server system,
wherein if result data corresponding to the voice data is not received from the server system, the controller is configured to output a message for requesting re-inputting a command, and
wherein if connection with the server system is unstable or not smooth, the controller is configured to output a pre-stored waiting guidance message.

2. The voice recognition apparatus according to claim 1, wherein, when transmission of the voice data including the voice command to the server system fails, the controller performs control to perform an operation corresponding to a keyword command which is most similar to the voice command.

3. The voice recognition apparatus according to claim 1, wherein, when a signal corresponding voice recognition failure is received from the server system, the controller performs control to output an audible guidance message for requesting re-inputting of a voice command.

4. The voice recognition apparatus according to claim 1, wherein, when a signal notifying that the voice command is about an unsupported function is received from the server system, the controller performs control to output an audible guidance message for notifying that the voice command is about the unsupported function.

5. The voice recognition apparatus according to claim 1, wherein the pre-stored keyword command is updated based on update data received from the server system.

6. The voice recognition apparatus according to claim 1, wherein, when an error has occurred in any one of an Automatic Speech Recognition (ASR) server, a Natural Language Processing (NLP) server, and an association service server within the server system, the controller performs control to output a corresponding waiting guidance comment.

7. A method of operating a voice recognition apparatus, the method comprising:
receiving a voice command through a microphone;
when the received voice command corresponds to a pre-stored keyword command, performing an operation corresponding to the pre-stored keyword command;
when the received voice command does not correspond to the pre-stored keyword command, transmitting voice data including the voice command to a server system;
if result data corresponding to the voice data is not received from the server system, outputting a message for requesting re-inputting a command; and
if connection with the server system is unstable or not smooth, outputting a pre-stored waiting guidance message, wherein the voice recognition apparatus comprises:
a main body;
a cover housing coupled to an upper side of the main body;
a grill provided with a plurality of through-holes, formed in a vertically long cylindrical shape, and to surround the main body;
an audio input device configured to receive a voice;
a communication transceiver disposed in the main body and configured to transmit voice data received from the audio input device to a server system, which performs voice recognition processing, and receive recognition result data on the voice data from the server system;
a controller electrically connected to the audio input device and the communication transceiver, and configured to control the audio input device and the communication transceiver; and
a window provided inside the cover housing and including at least one voice passage hole,
wherein an upper surface of the main body is formed as a slope having a front portion at a low height and a rear portion at a high height, and the slope is disposed parallel to the window.

8. The operation method according to claim 7, wherein the performing of an operation corresponding to the pre-stored keyword command comprises, when the pre-stored keyword command is about a specific operation mode, operating in the specific operation mode.

9. The operation method according to claim 8, further comprising: determining a current operation state,
wherein the performing of an operation corresponding to the pre-stored keyword command comprises:
when the pre-stored keyword command is about a current operation mode, terminating the specific operation mode; and
when the pre-stored keyword command is not about the current operation mode, operating in the specific operation mode.

10. The operation method according to claim 7, further comprising, when the transmitting of the voice data including the voice command to the server system, performing an operation corresponding to a keyword which is most similar to the voice command.

11. The operation method according to claim 7, further comprising:
entering a wake-up signal standby mode for receiving a wake-up voice signal including a preset call word;
receiving a wake-up voice signal through the microphone; and
entering a command standby mode for receiving a user's voice command within a preset period of time.

12. The operation method according to claim 11, further comprising, when the voice command is not received within the preset period of time, switching to the wake-up signal standby mode.

13. The voice recognition apparatus according to claim 11, further comprising:
when a signal corresponding to voice recognition failure is received from the server system, outputting an audible guidance message for requesting re-inputting of a voice command; and
switching to the command standby mode.

14. The operation method according to claim 7, further comprising, when a control signal based on the voice command is received from the server system, operating in response to the received control signal.

15. The operation method according to claim 14, further comprising, when a response signal based on the voice command is received from the server system, outputting an audible guidance message corresponding to the received response signal.

16. The operation method according to claim 15, further comprising:
when the response signal does not include voice data, requesting voice data from the server system; and
receiving the requested voice data from the server system,
wherein the audible guidance message is based on the received voice data.

17. The operation method according to claim 7, further comprising, when a signal notifying that the voice command is about an unsupported function is received from the server system, outputting an audible guidance message for notifying the voice command is about the unsupported function.

* * * * *